US011910374B2

(12) United States Patent
Nam et al.

(10) Patent No.: US 11,910,374 B2
(45) Date of Patent: Feb. 20, 2024

(54) TECHNIQUES FOR ADAPTING SCHEDULING TIMELINE TO PROCESSING GRID

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Ozcan Ozturk, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/127,720

(22) Filed: Dec. 18, 2020

(65) Prior Publication Data

US 2022/0201701 A1   Jun. 23, 2022

(51) Int. Cl.
*H04W 72/12* (2023.01)
*H04W 8/24* (2009.01)
*H04W 72/20* (2023.01)

(52) U.S. Cl.
CPC ............. *H04W 72/12* (2013.01); *H04W 8/24* (2013.01); *H04W 72/20* (2023.01)

(58) Field of Classification Search
CPC ..... H04W 72/23; H04W 72/12; H04W 72/20; H04W 72/04; H04W 8/24
See application file for complete search history.

(56) References Cited

U.S. PATENT DOCUMENTS 9,860,887 B2      1/2018   Yi et al.
2020/0351934 A1*  11/2020  Khoshnevisan ...... H04W 72/23
2022/0030409 A1*  1/2022   Kim .................. H04W 72/0466

FOREIGN PATENT DOCUMENTS

WO    WO-2020091510 A1    5/2020

OTHER PUBLICATIONS

International Search Report and Written Opinion—PCT/US2021/060185—ISA/EPO—dated May 16, 2022 (2100219WO).

(Continued)

*Primary Examiner* — Margaret G Mastrodonato
(74) *Attorney, Agent, or Firm* — Sevan Savsa; Holland & Hart LLP

(57) ABSTRACT

Methods, systems, and devices for wireless communications are described. A user equipment (UE) may be configured to transmit, to a base station, a capability report indicating a capability of the UE to support multi-transmission time interval scheduling. The UE may then receive, from the base station based on the capability report, a first configuration of a first processing mode for the UE that is associated with communications scheduled for a single transmission time interval, and a second configuration of a second processing mode for the UE that is associated with communications scheduled for a scheduling interval spanning a plurality of transmission time intervals. The UE may receive, from the base station, an indication to apply the first processing mode or the second processing mode, and may communicate with the base station based on the indication.

30 Claims, 17 Drawing Sheets

(56) References Cited

OTHER PUBLICATIONS

Huawei: "Feature Lead Summary#3 of HARQ Enhancements for NR-U", 3GPP Draft, R1-1909806, 3GPP TSG RAN WG1 Meeting #98, FL Summary#3 for 72223 NRU HARQ, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Sep. 3, 2019 (Sep. 3, 2019), XP051766398, 29 Pages, Retrieved from the Internet: URL: http://www.3gpp.org/ftp/tsg_ran/WG1_RL1/TSGR1_98/Docs/R1-1909806.zip, [retrieved on Sep. 3, 2019] p. 19, section 3, p. 20, section 3.1.1, p. 28, section 4.1.1.
Partial International Search Report—PCT/US2021/060185—ISA/EPO—dated Mar. 15, 2022 (2100219WO).

* cited by examiner

TECHNIQUES FOR ADAPTING SCHEDULING TIMELINE TO PROCESSING GRID

FIELD OF TECHNOLOGY

The following relates to wireless communications, including techniques for adapting scheduling timelines to processing grids.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support wireless communications in higher frequency bands, such as frequency range FR3 and FR4 (e.g., 52.6 GHz-114.25 GHz). In these higher frequency bands, an orthogonal frequency division multiplexing (OFDM) waveform with a large subcarrier spacing (SCS) may be used to help reduce a phase noise impact. Due to the larger SCS, the slot length may be shorter. For instance, the slot length may decrease by a factor of eight from FR2 to FR4. In order to perform wireless communications with shorter slot lengths, processing delays or timelines at a UE may have to be reduced. However, processing timelines at the UE (e.g., timelines for physical downlink control channel (PDCCH) processing) may not scale with the reduced slot length, and conventional communications systems may be deficient in addressing these issues.

SUMMARY

The described techniques relate to improved methods, systems, devices, and apparatuses that support techniques for adapting scheduling timelines to processing grids. Generally, the described techniques provide for signaling a capability of a user equipment (UE) to support processing modes for both single and multi-slot scheduling intervals. For example, a UE may be configured to transmit a capability report to a base station, where the capability report indicates that the UE may support both single and multi-slot scheduling. The base station may then configure the UE with configurations for single-slot and multi-slot processing based on the capability report. Subsequently, the base station may configure the UE with which processing mode is to be applied, and may communicate with the UE using the selected processing mode (e.g., single-slot processing mode, multi-slot processing mode).

A method for wireless communications at a UE is described. The method may include transmitting, to a base station, a capability report indicating a capability of the UE to support multi-transmission time interval (TTI) scheduling, receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, receiving, from the base station, an indication to apply the first processing mode or the second processing mode, and communicating with the base station based on the indication.

An apparatus for wireless communications at a UE is described. The apparatus may include a processor, memory in electronic communication with the processor, and instructions stored in the memory. The instructions may be executable by the processor to cause the apparatus to transmit, to a base station, a capability report indicating a capability of the UE to support multi-TTI scheduling, receive, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, receive, from the base station, an indication to apply the first processing mode or the second processing mode, and communicate with the base station based on the indication.

Another apparatus for wireless communications at a UE is described. The apparatus may include means for transmitting, to a base station, a capability report indicating a capability of the UE to support multi-TTI scheduling, means for receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, means for receiving, from the base station, an indication to apply the first processing mode or the second processing mode, and means for communicating with the base station based on the indication.

A non-transitory computer-readable medium storing code for wireless communications at a UE is described. The code may include instructions executable by a processor to transmit, to a base station, a capability report indicating a capability of the UE to support multi-TTI scheduling, receive, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, receive, from the base station, an indication to apply the first processing mode or the second processing mode, and communicate with the base station based on the indication.

Some examples of the method, apparatuses, and non-transitory computer-readable medium described herein may further include operations, features, means, or instructions for transmitting, to the base station via the capability report, an indication of a processing capability of the UE associated with one or more subcarrier spacings (SCSs), where receiving the first configuration, the second configuration, or both, may be based on the indication of the processing capability.

In some examples of the method, apparatuses, and non-transitory computer-readable medium described herein, receiving the second configuration may include operations, features, means, or instructions for receiving, from the base station based on the indication of the processing capability, an indication of a SCS, a TTI length, or both, where communicating with the base station may be based on the SCS, the TTI length, or both.

Some examples of the method, apparatuses, and non-transitory computer-readable medium described herein may further include operations, features, means, or instructions for transmitting, to the base station via the capability report, an indication of a quantity of control channel elements (CCEs) for blind decoding within the scheduling interval, a quantity of control channel candidates for blind decoding within the scheduling interval, or both, where the second configuration configures the UE to monitor a first quantity of CCEs in the scheduling interval, a first quantity of control channel candidates in the scheduling interval, or both, based on the indication of the quantity of CCEs for blind decoding, the quantity of control channel candidates for blind decoding, or both.

Some examples of the method, apparatuses, and non-transitory computer-readable medium described herein may further include operations, features, means, or instructions for transmitting, to the base station via the capability report, an indication of a quantity of control channel monitoring occasions within the scheduling interval, where the second configuration configures the UE to monitor a first quantity of control channel monitoring occasions in the scheduling interval based on the indication of the quantity of control channel monitoring occasions within the scheduling interval.

Some examples of the method, apparatuses, and non-transitory computer-readable medium described herein may further include operations, features, means, or instructions for transmitting, to the base station via the capability report, an indication of a search space set periodicity associated with the scheduling interval, where the second configuration configures the UE to monitor a first search space set periodicity corresponding to the scheduling interval based on the indication of the search space set periodicity associated with the scheduling interval.

Some examples of the method, apparatuses, and non-transitory computer-readable medium described herein may further include operations, features, means, or instructions for transmitting, to the base station via the capability report, an indication of a time interval between a first time in which the UE receives a grant and a second time in which the UE may be capable of acting in accordance with the grant, where communicating with the base station may be based on the indication of the time interval.

Some examples of the method, apparatuses, and non-transitory computer-readable medium described herein may further include operations, features, means, or instructions for receiving, from the base station based on the indication of the time interval, a physical downlink control channel (PDCCH) message during a first TTI of the set of multiple TTIs of the scheduling interval that schedules an uplink transmission, a downlink transmission, or both, within one or more TTIs of the set of multiple TTIs of the scheduling interval.

Some examples of the method, apparatuses, and non-transitory computer-readable medium described herein may further include operations, features, means, or instructions for transmitting, to the base station via the capability report, an indication of a capability to perform beam switching at the UE between adjacent scheduling intervals, where the UE communicates with the base station using a first beam during a first scheduling interval and a second beam during a second scheduling interval based on the indication of the capability to perform beam switching.

In some examples of the method, apparatuses, and non-transitory computer-readable medium described herein, communicating with the base station may include operations, features, means, or instructions for communicating with the base station using a first set of hardware characteristics during a first scheduling interval and communicating with the base station using a second set of hardware characteristics during a second scheduling interval, the second set of hardware characteristics different from the first set of hardware characteristics.

Some examples of the method, apparatuses, and non-transitory computer-readable medium described herein may further include operations, features, means, or instructions for modifying one or more hardware characteristics of the first set of hardware characteristics at a boundary of the first scheduling interval and the second scheduling interval, where communicating with the base station using the second set of hardware characteristics during the second scheduling interval may be based on the modifying.

In some examples of the method, apparatuses, and non-transitory computer-readable medium described herein, the first set of hardware characteristics, the second set of hardware characteristics, or both, includes a first characteristic associated with an antenna array of the UE, a second characteristic associated with a baseband component of the UE, a third characteristic associated with a bandwidth part at the UE, a fourth characteristic associated with a transmission timing parameter at the UE, a sixth characteristic associated with a reception timing parameter at the UE, or any combination thereof.

In some examples of the method, apparatuses, and non-transitory computer-readable medium described herein, the first set of hardware characteristics, the second set of hardware characteristics, or both, includes a first characteristic associated with a transmission power metric for transmission performed by the UE, a second characteristic associated with a discontinuous reception (DRX) cycle of the UE, a third characteristic associated with medium access control-control element (MAC-CE) application timing, or any combination thereof.

In some examples of the method, apparatuses, and non-transitory computer-readable medium described herein, receiving the second configuration may include operations, features, means, or instructions for receiving, from the base station based on the capability report, a control message that includes an indication of a quantity of TTIs associated with the scheduling interval, where communicating with the base station using the second processing mode may be based on the indicated quantity of TTIs.

Some examples of the method, apparatuses, and non-transitory computer-readable medium described herein may further include operations, features, means, or instructions for receiving, from the base station, one or more configuration parameter values that may be different for the first processing mode and the second processing mode, the one or more configuration parameter values that may be different including a search space set periodicity, a time domain resource allocation (TDRA) table, a physical uplink control channel (PUCCH) resource, or a combination thereof.

In some examples of the method, apparatuses, and non-transitory computer-readable medium described herein, at least one of the one or more configuration parameter values may be shared between the first processing mode and the second processing mode.

Some examples of the method, apparatuses, and non-transitory computer-readable medium described herein may further include operations, features, means, or instructions for determining one or more configuration parameter values for the second processing mode based on a quantity of TTIs of the set of multiple TTIs associated with the scheduling interval.

Some examples of the method, apparatuses, and non-transitory computer-readable medium described herein may further include operations, features, means, or instructions for transmitting, to the base station, a second indication to transition from the indicated processing mode to a different processing mode and communicating with the base station based on the second indication.

In some examples of the method, apparatuses, and non-transitory computer-readable medium described herein, a TTI includes a slot, a subframe, a symbol group, or any combination thereof.

A method for wireless communications at a base station is described. The method may include receiving, from a UE, a capability report indicating a capability of the UE to support multi-TTI scheduling, transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, transmitting, to the UE, an indication to apply the first processing mode or the second processing mode, and communicating with the UE based on the indication.

An apparatus for wireless communications at a base station is described. The apparatus may include a processor, memory in electronic communication with the processor, and instructions stored in the memory. The instructions may be executable by the processor to cause the apparatus to receive, from a UE, a capability report indicating a capability of the UE to support multi-TTI scheduling, transmit, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, transmit, to the UE, an indication to apply the first processing mode or the second processing mode, and communicate with the UE based on the indication.

Another apparatus for wireless communications at a base station is described. The apparatus may include means for receiving, from a UE, a capability report indicating a capability of the UE to support multi-TTI scheduling, means for transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, means for transmitting, to the UE, an indication to apply the first processing mode or the second processing mode, and means for communicating with the UE based on the indication.

A non-transitory computer-readable medium storing code for wireless communications at a base station is described. The code may include instructions executable by a processor to receive, from a UE, a capability report indicating a capability of the UE to support multi-TTI scheduling, transmit, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, transmit, to the UE, an indication to apply the first processing mode or the second processing mode, and communicate with the UE based on the indication.

Some examples of the method, apparatuses, and non-transitory computer-readable medium described herein may further include operations, features, means, or instructions for receiving, from the UE via the capability report, an indication of a processing capability of the UE associated with one or more SCSs, where transmitting the first configuration, the second configuration, or both, may be based on the indication of the processing capability.

In some examples of the method, apparatuses, and non-transitory computer-readable medium described herein, transmitting the second configuration may include operations, features, means, or instructions for transmitting, to the UE based on the indication of the processing capability, an indication of a SCS, a TTI length, or both, where communicating with the UE may be based on the SCS, the TTI length, or both.

Some examples of the method, apparatuses, and non-transitory computer-readable medium described herein may further include operations, features, means, or instructions for receiving, from the UE via the capability report, an indication of a quantity of CCEs for blind decoding within the scheduling interval, a quantity of control channel candidates for blind decoding within the scheduling interval, or both, where the second configuration configures the UE to monitor a first quantity of CCEs in the scheduling interval, a first quantity of control channel candidates in the scheduling interval, or both, based on the indication of the quantity of CCEs for blind decoding, the quantity of control channel candidates for blind decoding, or both.

Some examples of the method, apparatuses, and non-transitory computer-readable medium described herein may further include operations, features, means, or instructions for receiving, from the UE via the capability report, an indication of a quantity of control channel monitoring occasions within the scheduling interval, where the second configuration configures the UE to monitor a first quantity of control channel monitoring occasions in the scheduling interval based on the indication of the quantity of control channel monitoring occasions within the scheduling interval.

Some examples of the method, apparatuses, and non-transitory computer-readable medium described herein may further include operations, features, means, or instructions for receiving, from the UE via the capability report, an indication of a search space set periodicity associated with the scheduling interval, where the second configuration configures the UE to monitor a first search space set periodicity corresponding to the scheduling interval based on the indication of the search space set periodicity associated with the scheduling interval.

Some examples of the method, apparatuses, and non-transitory computer-readable medium described herein may further include operations, features, means, or instructions for receiving, from the UE via the capability report, an indication of a time interval between a first time in which the UE receives a grant and a second time in which the UE may be capable of acting in accordance with the grant, where communicating with the UE may be based on the indication of the time interval.

Some examples of the method, apparatuses, and non-transitory computer-readable medium described herein may further include operations, features, means, or instructions for transmitting, to the UE based on the indication of the time interval, a PDCCH message during a first TTI of the set of multiple TTIs of the scheduling interval that schedules an uplink transmission, a downlink transmission, or both, within one or more TTIs of the set of multiple TTIs of the scheduling interval.

Some examples of the method, apparatuses, and non-transitory computer-readable medium described herein may further include operations, features, means, or instructions for receiving, from the UE via the capability report, an indication of a capability to perform beam switching at the UE between adjacent scheduling intervals, where the UE communicates with the base station using a first beam during a first scheduling interval and a second beam during a second scheduling interval based on the indication of the capability to perform beam switching.

In some examples of the method, apparatuses, and non-transitory computer-readable medium described herein, communicating with the UE may include operations, features, means, or instructions for communicating with the UE using a first set of hardware characteristics of the UE during a first scheduling interval and communicating with the UE using a second set of hardware characteristics of the UE during a second scheduling interval, the second set of hardware characteristics different from the first set of hardware characteristics.

In some examples of the method, apparatuses, and non-transitory computer-readable medium described herein, the first set of hardware characteristics, the second set of hardware characteristics, or both, includes a first characteristic associated with an antenna array of the UE, a second characteristic associated with a baseband component of the UE, a third characteristic associated with a bandwidth part at the UE, a fourth characteristic associated with a transmission timing parameter at the UE, a sixth characteristic associated with a reception timing parameter at the UE, or any combination thereof.

In some examples of the method, apparatuses, and non-transitory computer-readable medium described herein, the first set of hardware characteristics, the second set of hardware characteristics, or both, includes a first characteristic associated with a transmission power metric for transmission performed by the UE, a second characteristic associated with a DRX cycle of the UE, a third characteristic associated with MAC-CE application timing, or any combination thereof.

In some examples of the method, apparatuses, and non-transitory computer-readable medium described herein, transmitting the second configuration may include operations, features, means, or instructions for transmitting, to the UE based on the capability report, a control message that includes an indication of a quantity of TTIs associated with the scheduling interval, where communicating with the UE using the second processing mode may be based on the indicated quantity of TTIs.

Some examples of the method, apparatuses, and non-transitory computer-readable medium described herein may further include operations, features, means, or instructions for transmitting, to the UE, one or more configuration parameter values that may be different for the first processing mode and the second processing mode, the one or more configuration parameter values that may be different including a search space set periodicity, a TDRA table, a PUCCH resource, or a combination thereof.

In some examples of the method, apparatuses, and non-transitory computer-readable medium described herein, at least one of the one or more configuration parameter values may be shared between the first processing mode and the second processing mode.

Some examples of the method, apparatuses, and non-transitory computer-readable medium described herein may further include operations, features, means, or instructions for determining one or more configuration parameter values for the second processing mode based on a quantity of TTIs of the set of multiple TTIs associated with the scheduling interval.

Some examples of the method, apparatuses, and non-transitory computer-readable medium described herein may further include operations, features, means, or instructions for receiving, from the UE, a second indication to transition from the indicated processing mode to a different processing mode and communicating with the UE based on the second indication.

In some examples of the method, apparatuses, and non-transitory computer-readable medium described herein, a TTI includes a slot, a subframe, a symbol group, or any combination thereof.

DETAILED DESCRIPTION

Figure 1:
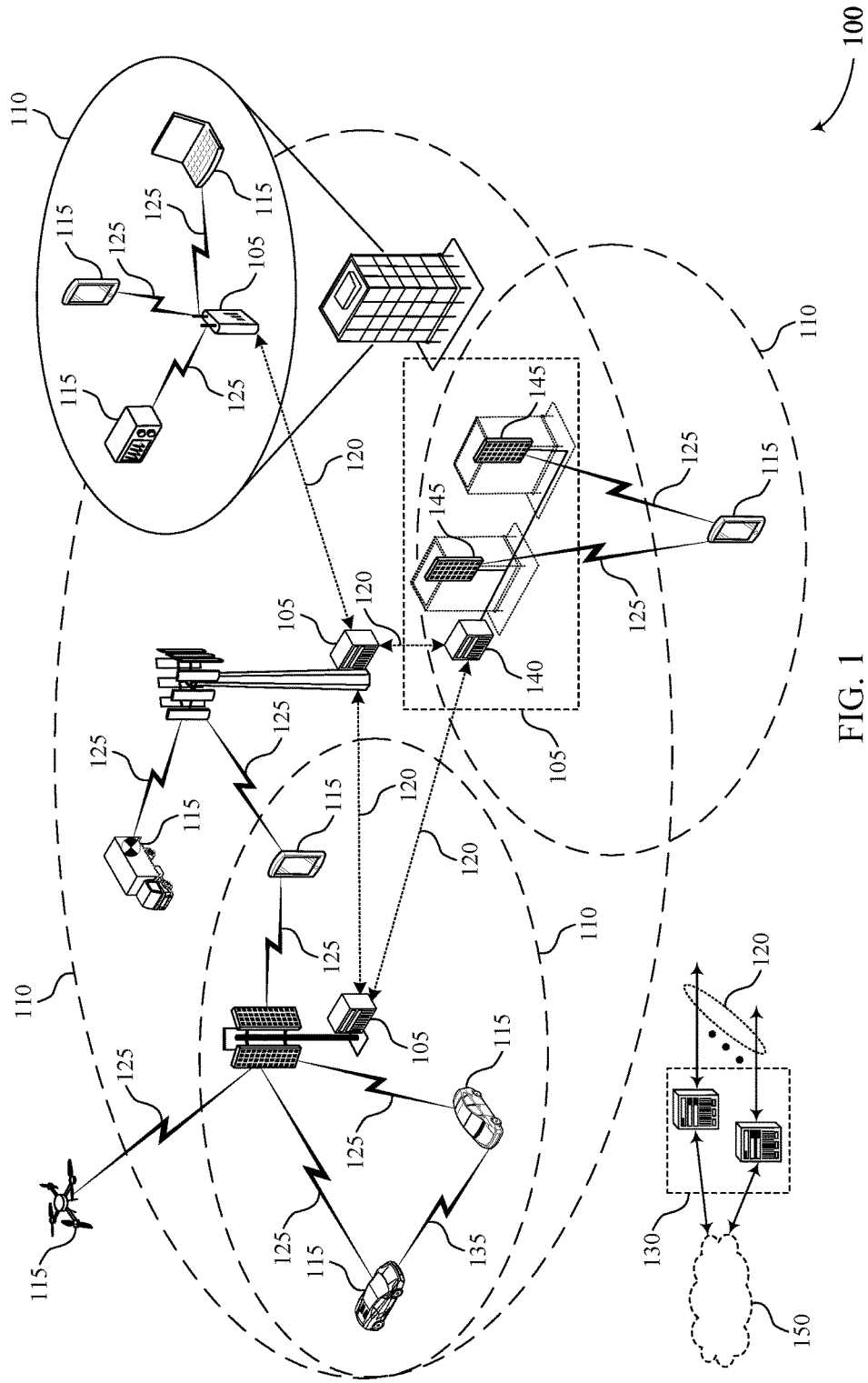
FIG. 1 illustrates an example of a wireless communications system that supports techniques for adapting scheduling timelines to processing grids in accordance with aspects of the present disclosure.

Some wireless communications systems support wireless communications in higher frequency bands, such as FR3 and FR4 (e.g., 52.6 GHz-114.25 GHz). In these higher frequency bands, an orthogonal frequency division multiplexing (OFDM) waveform with a large subcarrier spacing (SCS) may be used to help reduce a phase noise impact, compared to lower frequency bands, such as FR1 and FR2. Due to the larger SCS, the slot length may be shorter. For instance, the slot length may decrease by a factor of eight from FR2 to FR4 in cases where 120 kHz and 960 kHz SCSs are considered for FR2 and FR4, respectively. In order to perform wireless communications with shorter slot lengths, processing delays or timelines at a user equipment (UE) may have to be reduced. However, processing timelines at the UE (e.g., timelines for physical downlink control channel (PDCCH) processing) may not scale with the reduced slot length. For example, in some cases due to decreased slot length, it may take longer than one slot for the UE to process a received PDCCH. Further, beam switching (tuning of radio frequency (RF) circuitry) and time division duplex (TDD) direction changes (e.g., downlink to uplink) may take up more symbols for larger SCSs.

Some wireless devices may be configured to perform wireless communications according to single-slot processing modes, multi-slot processing modes, or both. For example, in a multi-slot scheduling mode (e.g., multi-slot processing mode), a single PDCCH may schedule physical downlink shared channel (PDSCH) and/or physical uplink shared channel (PUSCH) transmissions over multiple slots, rather than a PDCCH scheduling PDSCH/PUSCH transmissions for a single slot, as may be performed in accordance with a single-slot scheduling mode (e.g., single-slot processing mode). However, some wireless communications systems do not support signaling which enable a UE to inform the network that it is capable of supporting support multi-slot scheduling. Therefore, without knowledge of UE capability to support multi-slot scheduling, the network may refrain from implementing multi-slot scheduling, thereby inhibiting the utility of such multi-slot scheduling techniques.

Accordingly, techniques for signaling a capability of a UE to support processing modes for both single-slot and multi-slot scheduling intervals are disclosed. In particular, techniques may enable a UE to indicate whether it supports a first processing mode for single-slot scheduling, a second processing mode for multi-slot scheduling, or both. Subsequently, the base station may be configured to indicate to the UE which processing mode is to be used. For example, a UE may be configured to transmit a capability report to a base station, where the capability report indicates that the UE may support both single-slot and multi-slot scheduling. The base station may then configure the UE with configurations for single-slot and multi-slot processing based on the capability report. Subsequently, the base station may configure the UE with which processing mode is to be applied, and may communicate with the UE using the selected processing mode (e.g., single-slot processing mode, multi-slot processing mode).

In some implementations, a capability report transmitted by a UE may include information regarding parameters associated with multi-slot scheduling at the UE. Information which may be signaled to the base station via the capability report may include processing capabilities of the UE as a function of SCS, a defined (e.g., maximum) quantity of control channel elements (CCEs) and/or control channel candidates (e.g., PDCCH candidates) which may be blindly decoded by the UE, a defined quantity of monitoring occasions for a scheduling interval including multiple slots, a search space periodicity for a scheduling interval (e.g., nominal grid) including multiple slots, or any combination thereof. Additionally or alternatively, the capability report transmitted to the base station may indicate that the UE is configured to adjust hardware characteristics at the UE between adjacent scheduling intervals (e.g., RF characteristics, beam switching, baseband characteristics, transmission/reception times, transmission powers). By indicating to the base station various capabilities and/or parameters associated with a multi-slot processing mode at the UE, techniques described herein may enable improved scheduling of wireless communications at the UE for both single-slot processing modes and multi-slot processing modes.

Aspects of the disclosure are initially described in the context of wireless communications systems. Additional aspects of the disclosure are described in the context of an example communications configuration and an example process flow. Aspects of the disclosure are further illustrated by and described with reference to apparatus diagrams, system diagrams, and flowcharts that relate to techniques for adapting scheduling timelines to processing grids.

FIG. 1 illustrates an example of a wireless communications system 100 that supports techniques for adapting scheduling timelines to processing grids in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., CCEs) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, the wireless communications system 100 may support communications at higher frequency bands, such as mmW band. In some cases, these higher bands may be referred to FR3 or FR4. To support communications at these higher frequency bands, an OFDM waveform with a larger SCS may be used to reduce a phase noise impact. Due to the larger SCS, a slot length or transmission time interval length may be shorter. However, processing timeless, such as control channel processing, beam switching, and TDD direction changes, may not scale with the reduced slot length.

Accordingly, to account for SCS adjustments in higher frequency bands, techniques for adapting scheduling timelines to a processing grid at a UE 115 are described. In some aspects, the UEs 115 and the base stations 105 of the wireless communications system 100 may support techniques for signaling a capability of a UE 115 to support processing modes for both single-slot and multi-slot scheduling intervals. In particular, the wireless communications system 100 may support signaling which enable a UE 115 to indicate whether it supports a first processing mode for single-slot scheduling, a second processing mode for multi-slot processing, or both. Subsequently, the base station 105 may be configured to indicate to the UE 115 which processing mode is to be used, and the UE 115 and the base station 105 may communicate according to the indicated processing mode.

In a single-slot processing mode, a single PDCCH may schedule PDSCH/PUSCH transmissions for a single slot. Conversely, in a multi-slot processing mode, a single PDCCH may schedule PDSCH/PUSCH transmissions over a scheduling interval spanning multiple slots. As such, a multi-slot processing mode may account for PDCCH processing timelines by reducing beam switching and reducing TDD direction changes.

For example, a UE 115 of the wireless communications system 100 may be configured to transmit a capability report to a base station 105, where the capability report indicates that the UE 115 may support a first processing mode associated with communications scheduled for a single transmission time interval (TTI) (e.g., single-slot scheduling), a second processing mode associated with communications scheduled for a scheduling interval spanning multiple TTIs (e.g., multi-slot scheduling), or both. In this example, upon receiving the capability report, the base station 105 may configure the UE 115 with communications configurations for the first processing mode (e.g., single-slot processing mode) and the second processing mode (e.g., multi-slot processing mode) based on the capability report. In this regard, the UE 115 may be configured with information which may be used to perform both the first and second processing modes. Subsequently, the base station 105 may indicate, to the UE 115, which processing mode is to be applied, and may communicate with the UE 115 using the selected processing mode (e.g., single-slot processing mode, multi-slot processing mode).

In some aspects, the term "scheduling interval" for multi-TTI scheduling may additionally or alternatively be referred to as a "nominal grid," where a nominal grid spans multiple TTIs for multi-TTI scheduling. For example, according to multi-TTI scheduling, a single PDCCH may schedule PDSCH/PUSCH transmissions over a nominal grid spanning multiple slots.

In some aspects, the capability report transmitted by the UE 115 may include information regarding parameters associated with multi-slot scheduling at the UE 115. Information which may be signaled to the base station via the capability report may include processing capabilities of the UE 115 as a function of SCS, defined (e.g., maximum) quantities of CCEs and/or control channel candidates (e.g., PDCCH candidates) which may be blindly decoded by the UE, defined quantities of monitoring occasions for a scheduling interval including multiple slots, a search space periodicity for a scheduling interval including multiple slots, or any combination thereof. Additionally or alternatively, the capability report transmitted to the base station 105 may indicate that the UE 115 is configured to adjust hardware characteristics at the UE 115 between adjacent scheduling intervals (e.g., RF characteristics, beam switching, baseband characteristics, transmission/reception times, transmission powers).

Techniques described herein may provide for improved scheduling of wireless communications for both single-TTI scheduling (e.g., single-slot scheduling) and multi-TTI scheduling (e.g., multi-slot scheduling). In particular, by enabling a UE 115 to inform the network (e.g., base station 105) its capability to support a single-slot processing mode and/or a multi-slot processing mode, techniques described herein may enable the network to communicate with the UE 115 using single-slot scheduling and/or multi-slot scheduling depending on the characteristics of the network (e.g., quantity of data traffic, noise) as well as the capabilities of the UE 115. Thus, techniques described herein may enable more widespread use of multi-slot scheduling within the wireless communications system 100, thereby alleviating processing limitations at the UE 115 and allowing for higher-frequency wireless communications (e.g., FR3, FR4).

Figure 2:
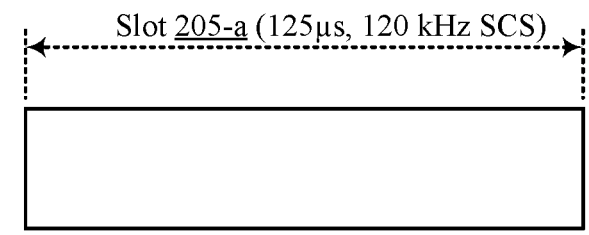
FIG. 2 illustrates an example of a communications configuration that supports techniques for adapting scheduling timelines to processing grids in accordance with aspects of the present disclosure.
Figure 2:
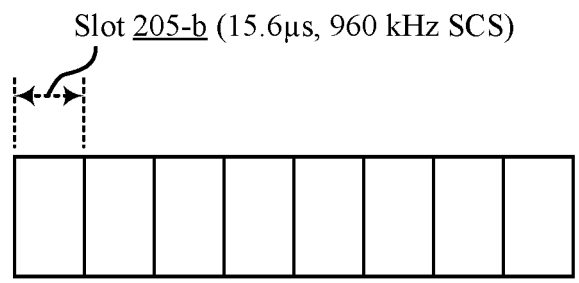
Figure 2:
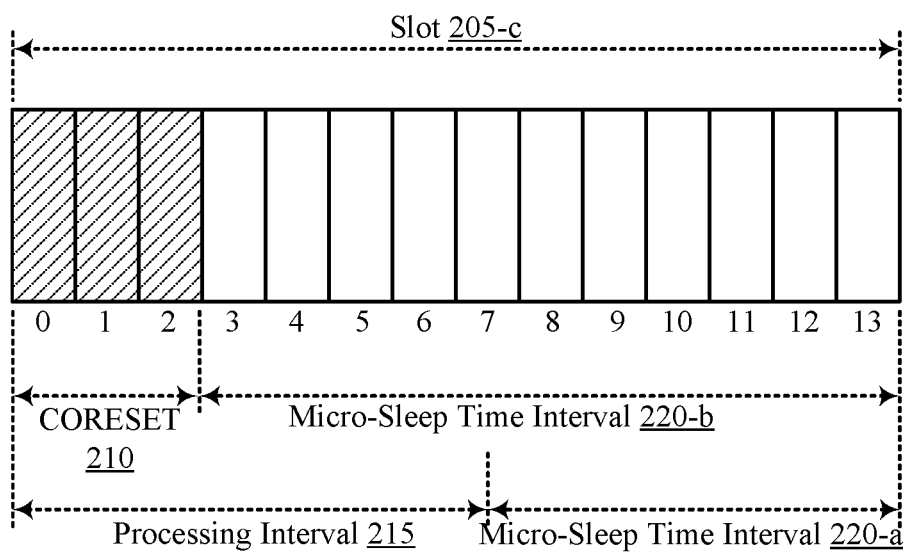

FIG. 2 illustrates an example of a communications configuration 200 that supports techniques for adapting scheduling timelines to processing grids in accordance with aspects of the present disclosure. In some examples, communications configuration 200 may implement, or be implemented by, wireless communications system 100.

In some aspects, the communications configuration 200 illustrates a relationship between a slot length and an SCS of wireless communications. In particular, the communications configuration 200 illustrates an inverse relationship between SCS and slot length, and an effect on processing timelines at a UE 115.

As noted previously herein, some wireless communications systems support wireless communications in higher frequency bands, such as FR3 and FR4 (e.g., 52.6 GHz-114.25 GHz). In these higher frequency bands, an OFDM waveform with a large SCS (e.g., 240 kHz-1.92 MHz) may be required to help reduce a phase noise impact. Due to the larger SCS at higher frequencies, the slot length may become shorter.

For example, FIG. 2 illustrates a slot 205-a and a slot 205-b. In some cases, the slot 205-a may include an example of a slot associated with FR2. For instance, the slot 205-a may be associated with a 120 kHz SCS, and a slot length of 125 μs. Comparatively, the slot 205-b may include an example of a slot associated with FR4. In order to help reduce a phase noise impact in the higher frequency bands of FR4 as compared to FR2, the slot 205-b associated with FR4 may be associated with a larger SCS. In particular, the slot 205-b may be associated with a 960 kHz SCS, and a slot length of 15.6 μs.

As such, due to the increasing SCS from FR2 to FR4, the slot length may decrease by a factor of eight (e.g., length of slot 205-a is eight times larger than length of slot 205-a). In order to perform wireless communications with shorter slot 205 lengths, processing delays or timelines at a wireless devices (e.g., UEs, base stations) may have to be reduced. For example, a PDCCH processing time at a UE 115 may have to be significantly shorter for slot 205-b as compared to slot 205-a due to the reduced slot length. Additionally, the shorter slot lengths at higher frequency bands may require more frequent (and faster) TDD direction switching and/or beam switching.

However, due to implementation complexities, processing timelines at UEs 115 (e.g., PDCCH processing, data processing) may not proportionally scale with the reduced slot length at higher frequencies. This may be shown with reference to slot 205-c illustrated in FIG. 2. As shown in FIG. 2, slot 205-c may include a control resource set (CORESET 210) which spans a first three symbols of the slot 205-c. At higher frequency ranges (e.g., FR4), due to the reduced length of the slot 205-c, the processing interval 215 (e.g., PDCCH processing interval 215) may be longer than the CORESET 210. In this regard, at higher frequency ranges, a UE 115 may process the control channel (e.g., PDCCH) within the CORESET 210 for the processing interval 215 before the UE 115 may perform actions in response to the control channel within the CORESET 210. In effect, the long processing interval 215 relative to the length of the slot 205-c reduces a proportion of the slot which may be used for the control channel transmissions.

Moreover, the UE 115 may be unable to perform micro-sleep procedures until the end of the processing interval 215 during the micro-sleep time interval 220-a. For example, in cases where a UE 115 performs single-slot processing for single-slot scheduling intervals, the UE 115 may monitor the CORESET 210 within every slot. In this example, by monitoring the CORESET 210 in every slot, the UE 115 may also perform control channel processing over the processing interval 215 of every slot, leaving only the micro-sleep time interval 220-a of each slot to perform micro-sleep procedures. Thus, the increased length of the processing interval 215 relative to the length of the slot 205-c at higher frequency bands may reduce an amount of time for each slot 205-c that the UE 115 may perform micro-sleep procedures, thereby reducing a power-saving benefit of micro-sleep procedures as compared to micro-sleep procedures in lower frequency ranges (e.g., FR1, FR2).

Accordingly, techniques for signaling a capability of a UE 115 to support processing modes for both single-slot and multi-slot scheduling intervals are disclosed. In particular, techniques may enable a UE 115 to indicate whether it supports a first processing mode for single-slot scheduling, a second processing mode for multi-slot scheduling, or both. Subsequently, the base station may be configured to indicate to the UE which processing mode is to be used. By indicating to the base station various capabilities and/or parameters associated with a multi-slot processing mode at the UE 115, techniques described herein may enable improved scheduling of wireless communications at the UE for both single-slot processing modes and multi-slot processing modes.

Furthermore, by enabling UEs 115 to be configured with multi-slot processing, techniques described herein may enable UEs 115 to refrain from performing control channel processing in every slot, thereby increasing a duration for micro-sleep procedures and reducing power consumption at the UE 115. For example, referring to slot 205-c, techniques described herein may enable a UE 115 to indicate that it supports a processing mode for multi-slot scheduling, thereby enabling the network to schedule communications at the UE 115 according to multi-slot scheduling. With multi-slot scheduling, communications may be scheduled for a scheduling interval which spans multiple slots. Accordingly, while communicating according to multi-slot scheduling, the UE 115 may refrain from performing control channel processing during the processing interval 215 for every slot within a scheduling interval (e.g., processing interval 215 may not apply for slots 205-c of a scheduling interval in which the UE 115 does not perform control channel processing). In this regard, due to the multi-slot scheduling, the UE 115 may be able to perform micro-sleep procedures during the micro-sleep time interval 220-b for each slot 205-c in which the UE 115-c does not perform control channel processing. As such, multi-slot processing may improve a duration of micro-sleep at the UE 115, thereby reducing power consumption at the UE 115 and improving battery performance.

Figure 3:
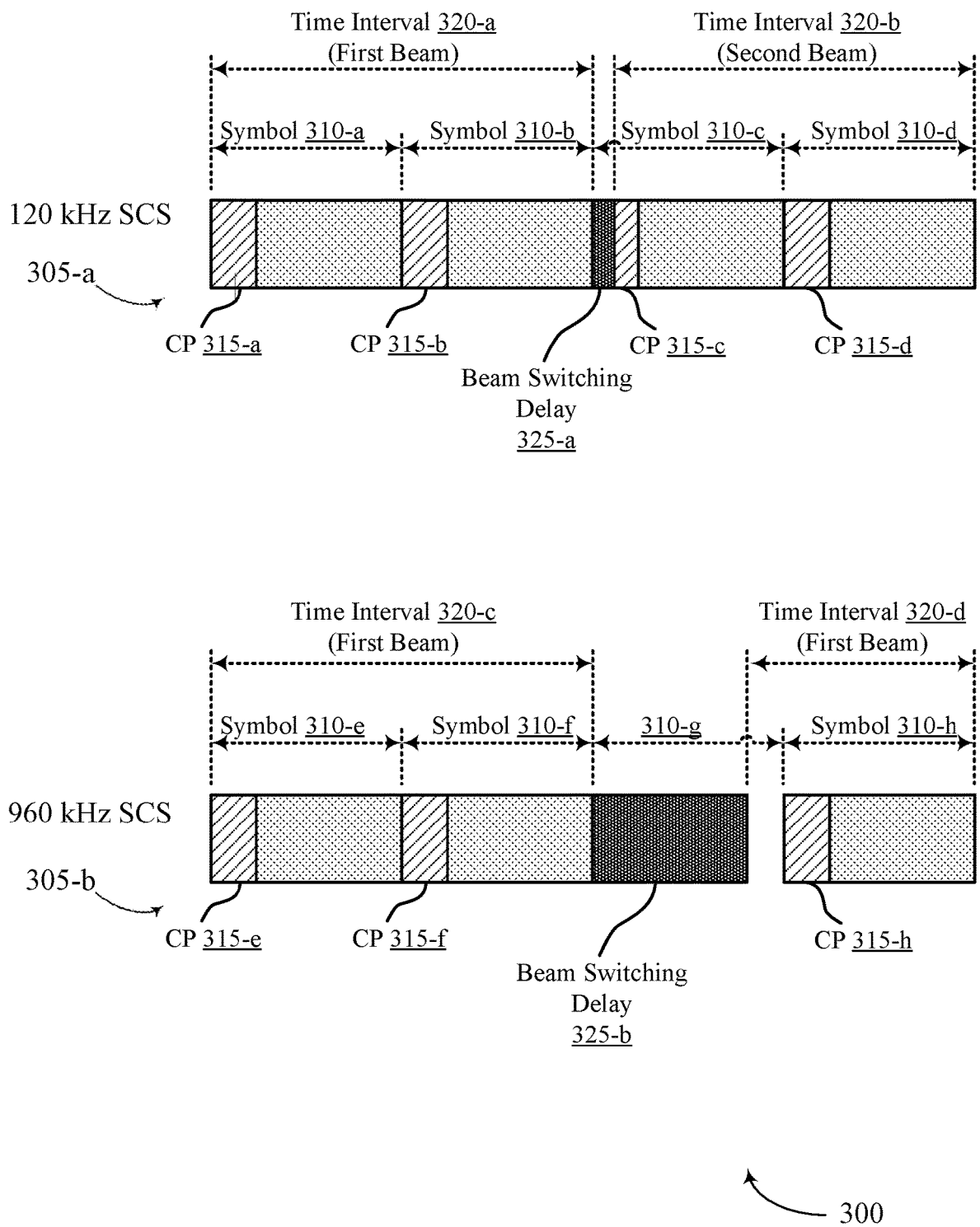
FIG. 3 illustrates an example of a communications configuration that supports techniques for adapting scheduling timelines to processing grids in accordance with aspects of the present disclosure.

FIG. 3 illustrates an example of a communications configuration 300 that supports techniques for adapting scheduling timelines to processing grids in accordance with aspects of the present disclosure. In some examples, communications configuration 300 may implement, or be implemented by, wireless communications system 100, communications configuration 200, or both.

As described with reference to FIG. 2, increasing SCS may result in shorter slot lengths, which may result in processing complexities described in FIG. 2. Additionally, shorter slot lengths may also result in complexities in the context of beam switching and TDD direction switching. In particular, due to the shorter slot lengths at higher frequencies (e.g., FR4), a time duration for beam switching may be comparable to, or longer than, the length of a slot.

For example, communications configuration 300 shown in FIG. 3 illustrates a resource allocation scheme 305-a. The resource allocation scheme 305-a may include an example of a resource allocation scheme associated with FR2 with 120 kHz SCS. The resource allocation scheme 305-a may include a set of symbols 310 (e.g., OFDM symbols). For example, as shown in FIG. 3, the resource allocation scheme 305-a includes a first symbol 310-a, a second symbol 310-b, a third symbol 310-c, and a fourth symbol 310-d. In some aspects, each symbol 310 may include a cyclic prefix 315. In the context of FR2 communications, the duration of each cyclic prefix 315 in the time domain may be approximately 584 ns.

Continuing with reference to resource allocation scheme 305-a, a UE 115 may be configured to communicate according to a first beam (e.g., downlink beam) during time interval 320-a, and may be configured to communicate according to a second beam (e.g., uplink beam) during time interval 320-b. In this regard, the UE 115 may be configured to perform a beam switching procedure following the time interval 320-a in order to switch from the first beam to the second beam. In some other cases, the UE 115 may perform a TDD link direction change from downlink to uplink, from uplink to downlink, or both. The beam switching procedure and TDD link direction change may include retuning of RF components and other communications circuitry, and may result in a beam switching delay 325-a or TDD direction change delay. The beam switching delay 325-a at a UE 115 may be in the range of a few hundred nano-seconds. Accordingly, in the context of FR2 communications illustrated in the resource allocation scheme 305-a, a duration of the beam switching delay 325-a may be less than the length of the cyclic prefixes (e.g., duration of beam switching delay 325-a may be less than 584 ns). In this regard, the beam switching delay 325-a in FR2 communications may be associated with relatively small interruptions of wireless communications (e.g., relatively small re-tuning overhead).

Comparatively, resource allocation scheme 305-b illustrated in FIG. 3 may include an example of a resource allocation scheme associated with FR4 communications with 960 kHz SCS. In this regard, the resource allocation scheme 305-b may illustrate a higher frequency range as compared to resource allocation scheme 305-a. The resource allocation scheme 305-b may include a set of symbols 310

(e.g., OFDM symbols). For example, as shown in FIG. 3, the resource allocation scheme 305-b includes a first symbol 310-e, a second symbol 310-f, a third symbol 310-g, and a fourth symbol 310-h. Due to the higher frequency range and larger SCS of the resource allocation scheme 305-b, the symbols 310-e, 310-f, 310-g, 310-h of the resource allocation scheme 305-b may be shorter than the symbols 310-e, 310-f, 310-g, 310-h of the resource allocation scheme 305-b. For example, each symbol 310 of the resource allocation scheme 305-b may be shorter than each symbol of the resource allocation scheme 305-a by a factor of eight. As such, it is noted herein that the resource allocation schemes 305-a and 305-b are not necessarily illustrated to scale with respect to one another.

In some aspects, each symbol 310 of the resource allocation scheme 305-b may include a cyclic prefix 315. In the context of FR4 communications, the duration of each cyclic prefix 315 in the time domain may be approximately 73 ns. As such, each cyclic prefix 315 of the resource allocation scheme 305-b may be shorter than each cyclic prefix 315 of the resource allocation scheme 305-a by a factor of eight (e.g., 73 ns compared to 584 ns).

Continuing with reference to resource allocation scheme 305-b, a UE 115 may be configured to communicate according to a first beam (e.g., downlink beam) during time interval 320-c, and may be configured to communicate according to a second beam (e.g., uplink beam) during time interval 320-d. In this regard, the UE 115 may be configured to perform a beam switching procedure following the time interval 320-c in order to switch from the first beam to the second beam. In some other cases, the UE 115 may perform a TDD link direction change from downlink to uplink, from uplink to downlink, or both.

As noted previously herein, beam switching procedures and TDD link direction changes may include retuning of RF components and other communications circuitry, and result in a beam switching delay 325-b or TDD direction change delay, respectively. In some cases, the beam switching delay 325-b may be on the order of a few hundred nanoseconds. Accordingly, in the context of FR4 communications illustrated in the resource allocation scheme 305-b, a duration of the beam switching delay 325-b may be greater than a length of a cyclic prefix 315 of the resource allocation scheme 305-b (e.g., duration of beam switching delay 325-a may be greater than 73 ns). In some cases, as shown in FIG. 3, an additional beam switching gap of an integer number of OFDM symbols 310 may be required for a beam switching procedure. Moreover, in some cases at higher frequencies (e.g., FR4), a duration of the beam switching delay 325-b may be comparable to, or longer than, a duration of a symbol 310. For instance, as shown in resource allocation scheme 305-b, a duration of the beam switching delay 325-b may be comparable to a duration of the symbol 310-g.

Comparing resource allocation schemes 305-a and 305-b, the beam switching delay 325-b in FR4 communications illustrated in resource communication scheme 305-b may be significantly longer relative to the length of the symbols 310 of the resource allocation scheme 305-b as compared to the beam switching delay 325-a in FR2 communications, as illustrated in resource allocation scheme 305-a. In this regard, the beam switching delay 325-b and/or a TDD link direction change in FR4 communications may be associated with relatively large interruptions of wireless communications (e.g., relatively large re-tuning overhead) as compared to the beam switching delay 325-a ant TDD link direction change delays in FR2 communications. In particular, for FR2 communications, a TDD link direction change (e.g., TDD link direction changes from uplink to downlink, or downlink to uplink) may be accomplished within two symbols 310. Comparatively, for FR4 communications, a TDD link direction change may take place over the course of larger quantities of symbols 310.

In cases where a UE 115 is configured to operate in a single-slot processing mode (e.g., single-slot scheduling), the UE 115 may be configured to perform frequent beam switching procedures and/or frequent TDD link direction changes. For example, a UE 115 operating according to a single-slot processing mode may perform a beam switching procedure between each slot. These frequent beam switches may not significantly interrupt wireless communications in the context of FR2 communications, as shown in the relatively short beam switching delay 325-a illustrated in the resource allocation scheme 305-a. However, in the context of FR4 communications, performing frequent beam switching procedures (such as during a single-slot processing mode) may result in significant interruptions of wireless communications, as shown in the relatively long beam switching delay 325-b illustrated in the resource allocation scheme 305-b.

Accordingly, techniques for signaling a capability of a UE 115 to support processing modes for both single-slot and multi-slot scheduling intervals are disclosed. In particular, techniques may enable a UE 115 to indicate whether it supports a first processing mode for single-slot scheduling, a second processing mode for multi-slot scheduling, or both. Subsequently, the base station 105 may be configured to indicate to the UE 115 which processing mode is to be used. By indicating to the base station 105 various capabilities and/or parameters associated with a multi-slot processing mode at the UE 115, techniques described herein may enable improved scheduling of wireless communications at the UE 115 for both single-slot processing modes and multi-slot processing modes.

Furthermore, by enabling UEs 115 to be configured with multi-slot processing, techniques described herein may help reduce a frequency or quantity of beam switching procedures and/or TDD link direction changes performed by a UE 115. For example, as compared to a single-slot processing mode in which a beam switching procedure may be performed between each slot, a multi-slot processing mode may enable a UE 115 to perform beam switching procedures between scheduling intervals which span multiple slots, thereby reducing a frequency of beam switching procedures. In this regard, by enabling UEs 115 to communicate a capability to support single-slot and multi-slot processing modes, and to be configured with both single-slot and multi-slot processing modes, techniques described herein may reduce a frequency of beam switching procedures by configuring the UEs 115 for multi-slot scheduling, thereby reducing a quantity and/or frequency of beam switching delays 325. Such reductions in a quantity and/or frequency of beam switching delays 325 may reduce interruptions of wireless communications, particularly in the context of higher frequency ranges, as illustrated in the resource allocation scheme 305-b.

Figure 4:
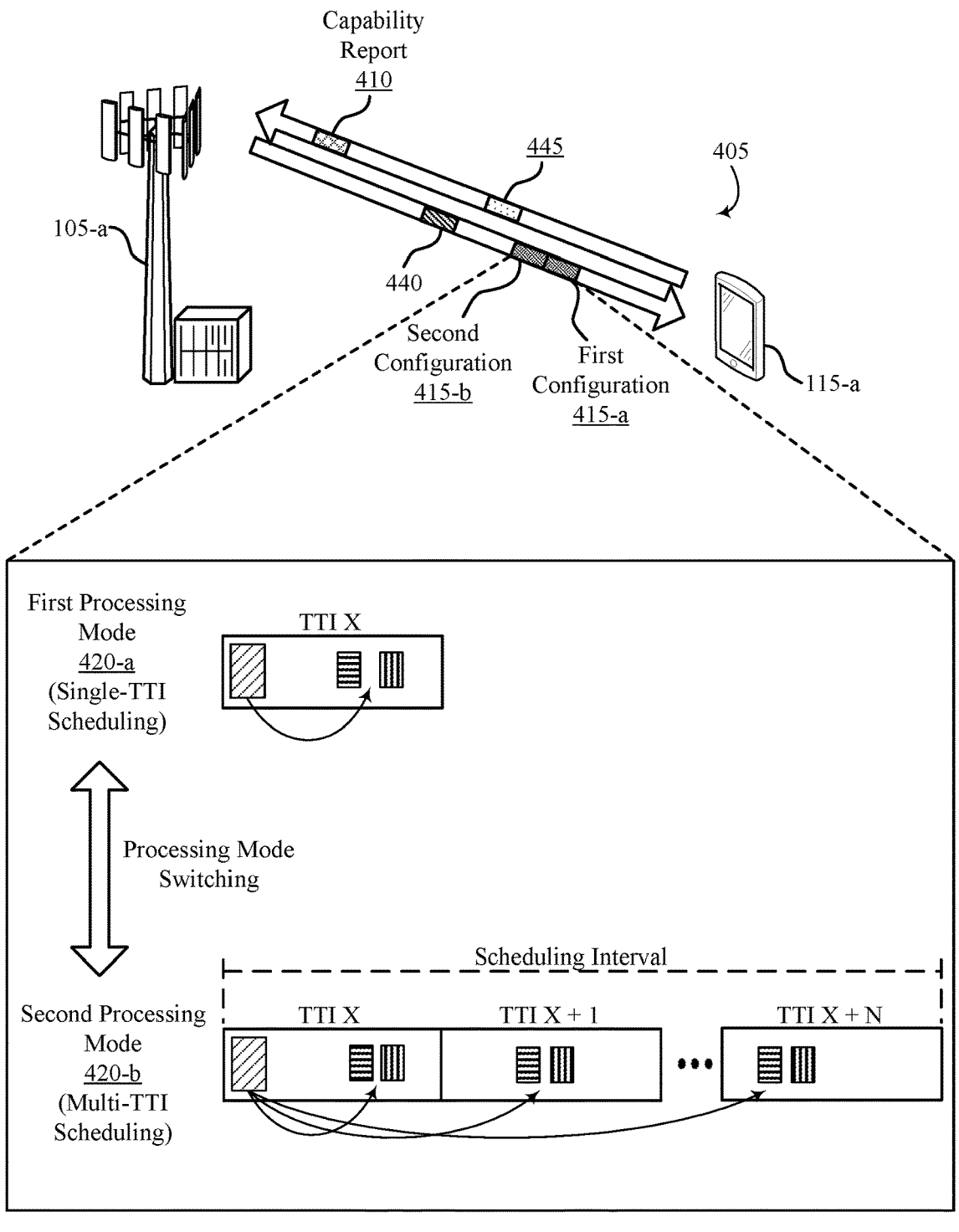
FIG. 4 illustrates an example of wireless communications system that support techniques for adapting scheduling timelines to processing grids in accordance with aspects of the present disclosure.

FIG. 4 illustrates an example of a wireless communications system 400 that supports techniques for adapting scheduling timelines to processing grids in accordance with aspects of the present disclosure. In some examples, wireless communications system 400 may implement, or be implemented by, aspects of wireless communications system 100, communications configuration 200, communications configuration 300, or any combination thereof. For example, wireless communications system 400 may support signaling which enables a UE 115 to indicate a capability to support single-slot processing, multi-slot processing, or both.

The wireless communications system 400 may include a base station 105-*a* and a UE 115-*a*, which may be examples base stations 105 and UEs 115 as described with reference to FIGS. 1-3. The UE 115-*a* may communicate with the base station 105-*a* using a communication link 405, which may be an example of an NR or LTE link between the UE 115-*a* and the base station 105-*a*. In some cases, the communication link 405 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals, to the base station 105-*a* using the communication link 405 and the base station 105-*a* may transmit downlink signals, such as downlink control signals or downlink data signals, to the UE 115-*a* using the communication link 405.

In some aspects, the wireless communications system 400 may support signaling which enables the UE 115-*a* to indicate whether it supports processing modes for single-slot scheduling, multi-slot scheduling, or both. In particular, the wireless communications system 400 may support signaling which enable the UE 115-*a* to indicate whether it supports a first processing mode for single-slot scheduling, a second processing mode for multi-slot processing, or both. Subsequently, the base station 105 may be configured to indicate to the UE 115 which processing mode is to be used, which may enable the UE 115-*a* and the base station 105-*a* to communicate according to the indicated processing mode. By enabling the UE 115-*a* to indicate, to the base station 105-*a*, various capabilities and/or parameters associated with a single-slot and/or multi-slot processing modes supported by the UE 115-*a*, techniques described herein may enable improved scheduling of wireless communications at the UE 115-*a* for both single-slot processing modes and multi-slot processing modes.

For example, the UE 115-*a* may transmit an indication of a UE capability (e.g., capability report 410) to the base station 105-*a*. In some aspects, the capability report 410 may indicate a capability of the UE 115-*a* to support a first processing mode 420-*a* for single-TTI scheduling, a second processing mode 420-*b* for multi-TTI scheduling, or both.

In the context of a first processing mode 420-*a* for single-TTI scheduling, a single control message (e.g., PDCCH transmission 425) received by the UE 115-*a* may schedule transmissions (e.g., PDSCH transmissions 430 or PUSCH transmissions 435) for a single TTI. Comparatively, in the context of the second processing mode 420-*b* for multi-TTI scheduling, a single control message (e.g., PDCCH transmission 425) received by the UE 115-*a* may schedule transmissions (e.g., PDSCH transmissions 430, PUSCH transmissions 435) within (e.g., across) multiple TTIs of a scheduling interval (e.g., nominal grid) for multi-TTI scheduling. For instance, as shown in FIG. 4 illustrating the second processing mode 420-*b* for multi-TTI scheduling, a single control message (e.g., PDCCH transmission 425) may schedule a first PDSCH transmission 430 within a first TTI of a scheduling interval (e.g., first TTI of a nominal grid), a second PDSCH transmission 430 within a second TTI of the scheduling interval (e.g., second TTI of the nominal grid), a third PDSCH transmission 430 in a third TTI of the scheduling interval (e.g., third TTI of the nominal grid), or any combination thereof. By way of another example, a single control message (e.g., PDCCH transmission 425) may schedule a first PUSCH transmission 435 within a first TTI of a scheduling interval (e.g., first TTI of a nominal grid), a second PUSCH transmission 435 within a second TTI of the scheduling interval (e.g., second TTI of the nominal grid), a third PUSCH transmission 435 in a third TTI of the scheduling interval (e.g., third TTI of the nominal grid), or any combination thereof. In the context of single-TTI scheduling and/or multi-TTI scheduling, a TTI may include any time interval including, but not limited to, a slot, a subframe, a symbol group, or any combination thereof.

In some aspects, the capability report 410 may indicate one or more parameters (e.g., configuration parameter values) associated with capabilities of the UE 115-*a*, one or more parameter associated with single-TTI and/or multi-TTI scheduling supported by the UE 115-*a*, or any combination thereof. Configuration parameters which may be indicated within the capability report 410 may include, but are not limited to, a processing capability of the UE 115-*a*, quantities of CCEs and/or control channel candidates (e.g., PDCCH candidates) for blind decoding for multi-TTI scheduling, quantities of control channel monitoring occasions for multi-TTI scheduling, a search space set periodicity for multi-TTI scheduling, time intervals (e.g., processing intervals) for multi-TTI scheduling, beam switching capabilities, beam switching delays, or any combination thereof.

For example, as noted previously herein, as a frequency of wireless communications increases, an SCS associated with the wireless communications may also increase. Moreover, as SCS increases, a slot length of wireless communications decreases, resulting in complexities in the context of processing capabilities of a UE 115. In this regard, a processing capability of the UE 115-*a* may be characterized or defined as a function of SCS. Accordingly, in this example, the capability report 410 may include an indication of a processing capability of the UE 115-*a* associated with one or more SCSs. For instance, the capability report 410 may indicate a first processing capability associated with a first SCS, and a second processing capability associated with a second SCS, where the second processing capability is different from the first processing capability. Processing capabilities may be reported using any metric or unit known in the art including, but not limited to, MHz, GHz, clock speed, and the like.

In some examples, the capability report 410 may include an indication of a defined (e.g., maximum) quantity of CCEs and PDCCH candidates for blind decoding for single-TTI scheduling, for multi-TTI scheduling, or both. In the context of single-TTI scheduling, the quantity of CCEs and PDCCH candidates for blind decoding may be defined per TTI (e.g., defined per slot, per subframe, etc.). In the context of multi-TTI scheduling, quantities of CCEs and PDCCH candidates for blind decoding may be defined per scheduling interval for multi-TTI scheduling. For instance, the capability report 410 may indicate a maximum quantity of CCEs and PDCCH candidates which the UE 115-*a* is able to blindly decode per scheduling interval. In some aspects, the quantity of CCEs for blind decoding may be reported as a function of a quantity of TTIs per scheduling interval. For example, the capability report 410 may indicate that the UE 115-*a* may blindly decode larger quantities of CCEs and PDCCH candidates for longer scheduling intervals (e.g., scheduling intervals spanning larger quantities of TTIs), and may indicate that the UE 115 may blindly decode smaller quantities of CCEs and PDCCH candidates for shorter scheduling intervals (e.g., scheduling intervals spanning fewer quantities of TTIs).

By way of another example, the capability report 410 may include an indication of a quantity of monitoring occasions (e.g., control channel monitoring occasions) for single-TTI scheduling, for multi-TTI scheduling, or both. In the context of single-TTI scheduling, the quantity of monitoring occasions may be defined per TTI or quantities of TTIs (e.g., monitoring occasions per sub-slot, monitoring occasions per slot, monitoring occasions per multiple slots, monitoring occasions per subframe, monitoring occasions per multiple subframes, etc.). For example, the capability report 410 may indicate a first quantity of control channel monitoring occasions per slot, and may monitor a second quantity of control channel monitoring occasions per subframe. In the context of multi-TTI scheduling, the quantity of monitoring occasions (e.g., control channel monitoring occasions) may be defined per scheduling interval for multi-TTI scheduling. For instance, the capability report 410 may indicate a maximum quantity of control channel monitoring occasions which the UE 115-*a* is able to monitor per scheduling interval (e.g., quantity of control channel monitoring occasions within a scheduling interval). As noted previously herein with respect to quantities of CCEs and PDCCH candidates for blind decoding, the quantity of control channel monitoring occasions supported by the UE 115-*a* may be reported as a function of a quantity of TTIs per scheduling interval. In particular, the UE 115-*a* may indicate that it supports larger quantities of control channel monitoring occasions for longer scheduling intervals, and fewer quantities of control channel monitoring occasions for shorter scheduling intervals.

In some examples, the capability report 410 may indicate a defined search space set periodicity (e.g., minimum search space set periodicity) for single-TTI scheduling, for multi-TTI scheduling, or both. In the context of single-TTI scheduling, the search space set periodicity may be defined per TTI (e.g., minimum search space set periodicity of one slot, minimum search space set periodicity of one subframe, etc.). In the context of multi-TTI scheduling, the search space set periodicity may be defined per scheduling interval, sets of scheduling intervals, or both (e.g., minimum search space set periodicity of scheduling interval, minimum search space set periodicity of a set of scheduling intervals, etc.). In some aspects, the search space set periodicity may be a reported as a function of a length of the scheduling interval. For example, the capability report 410 may indicate a first search space set periodicity associated with a first scheduling interval of a first length, and may indicate a second search space set periodicity associated with a second scheduling interval of a second length.

In some aspects, the capability report 410 may indicate a time interval which defines a processing duration between when the UE 115-*a* receives a message (e.g., grant, allocation of resources) from the base station 105-*a* and is able to act in accordance with the message. For example, the capability report 410 may indicate a time interval between a first time in which the UE 115-*a* receives a grant, and a second time in which the UE 115-*a* is capable of acting in accordance with the grant.

In some aspects, time intervals may be indicated via K1 values, K2 values, K3 values, or any combination thereof, where each of the K values defines a timing (e.g., time interval) for transmissions performed at the UE 115-*a*. For instance, the capability report 410 may include an indication of a K0 value associated with PDSCH transmissions, where the K0 value defines a time interval between reception of a transmission scheduling a PDSCH transmission and reception of the PDSCH transmission. By way of another example, the capability report 410 may include a K1 value for HARQ feedback messages (e.g., acknowledgement (ACK), negative acknowledgement (NACK)), where the K1 value defines a time interval between reception of a message and transmission of HARQ feedback responsive to the received message. Similarly, the capability report 410 may include a K2 value for PUSCH transmissions, where the K2 value defines a time interval between reception of a transmission scheduling a PUSCH transmission and transmission of the PUSCH transmission. In this regard, the capability report 410 may indicate one or more scheduling offsets for transmissions which are scheduled at the UE 115-*a*.

Additionally or alternatively, the capability report 410 may indicate configuration parameters or capabilities associated with beam switching procedures performed at the UE 115-*a*. For example, the capability report 410 may indicate one or more beam switching delays associated with one or more beam switching procedures (e.g., uplink beam to downlink beam, downlink beam to uplink beam, beam ID 1 to beam ID 2, beam ID 1 to beam ID 3) which are performed by the UE 115-*a*. By way of another example, the capability report 410 may indicate a capability of the UE 115-*a* to perform beam switching procedures between adjacent TTIs (e.g., between adjacent slots), between adjacent scheduling intervals, or both. For instance, in the context of multi-TTI scheduling, the UE 115-*a* may indicate a capability to perform one or more beam switching procedures between a first scheduling interval including a first set of TTIs and a second, adjacent scheduling interval including a second subset of TTIs. In some cases, capabilities to perform beam switching capabilities may be reported as a function of a size (e.g., length, quantity of TTIs) of the scheduling interval.

Additional configuration parameters which may be indicated via the capability report 410 may include units of PDSCH/PUSCH scheduling, repetition configurations for transmission/reception of signals associated with single-TTI scheduling and/or multi-TTI scheduling, frequency hopping configurations for transmission/reception of signals associated with single-TTI scheduling and/or multi-TTI scheduling, time domain resource allocation (TDRA) tables associated with single TTI scheduling and/or multi-TTI scheduling, frequency domain resource allocation (FDRA) tables associated with single-TTI scheduling and/or multi-TTI scheduling, sets of resources (e.g., time resources, frequency resources, PUSCH resources, physical uplink control channel (PUCCH) resources, PDSCH resources, PDCCH resources) associated with transmissions scheduled via single-TTI scheduling and/or multi-TTI scheduling, or any combination thereof. In some cases, the capability report 410 may include an indication of a configuration for PUSCH repetition Type B transmissions associated with single-TTI scheduling and/or multi-TTI scheduling (e.g., split point for PUSCH repetition Type B), or any combination thereof.

In some aspects, the UE 115-*a* may receive, from the base station 105-*a*, a first configuration 415-*a* of the first processing mode 420-*a* for the UE 115-*a* that is associated with communications scheduled for a single TTI (e.g., configuration for single-TTI scheduling). The first configuration 415-*a* may be indicated via an RRC message, a MAC-CE message, a downlink control information (DCI) message, a system information message, or any combination thereof. In some aspects, the UE 115-*a* may receive the first configuration 415-*a* based on transmitting the capability report 410.

The first configuration 415-*a* of the first processing mode 420-*a* may indicate one more parameters or characteristics for single-TTI scheduling of wireless communications at the UE 115-*a*. In particular, the first configuration 415-*a* may include one or more configuration parameter values for single-TTI scheduling which were indicated in the capability report 410 including, but not limited to, a processing capability associated with one or more SCSs for single-TTI scheduling, a quantity of CCEs and PDCCH candidates for blind decoding for single-TTI scheduling, a quantity of control channel monitoring occasions within a TTI or set of TTIs for single-TTI scheduling, a search space periodicity associated with a TTI or set of TTIs for single-TTI scheduling, a time interval for acting in accordance with grants or other transmissions for single-TTI scheduling, a capability to perform beam switching between adjacent TTIs for single-TTI scheduling, a beam switching delay for single-TTI scheduling, or any combination thereof. In some cases, the capability report 410 may indicate a capability of the UE 115-a to switch between the first processing mode 420-a and the second processing mode 420-b, a delay time for switching between the respective processing modes, and the like. Similar, in some examples, the capability report 410 may indicate a capability of the UE 115-a to selectively modify one or more parameters associated with the first processing mode 420-a and/or the second processing mode 420-b, or both.

Similarly, the UE 115-a may receive, from the base station 105-a, a second configuration 415-b of a second processing mode 420-b for the UE 115-a that is associated with communications scheduled for a scheduling interval (e.g., nominal grid) spanning a set of TTIs (e.g., configuration for multi-TTI scheduling). The second configuration 415-b may be indicated via an RRC message, a MAC-CE message, a DCI message, a system information message, or any combination thereof. In some aspects, the UE 115-a may receive the second configuration 415-b based on transmitting the capability report 410, receiving the first configuration 415-a, or both. Additionally or alternatively, the UE 115-a may receive the first configuration 415-a for the first processing mode 420-a and the second configuration 415-b for the second processing mode 420-b in a single transmission (e.g., RRC message, MAC-CE message, DCI message, system information message).

The second configuration 415-b of the second processing mode 420-b may indicate one more parameters or characteristics multi-TTI scheduling of wireless communications at the UE 115-a. In particular, the first configuration 415-a may include one or more configuration parameter values for multi-TTI scheduling which were indicated in the capability report 410 including, but not limited to, a type of TTI associated with a scheduling interval (e.g., slot, subframe, symbol group), a length of scheduling interval (e.g., quantity of TTIs per scheduling interval), a processing capability associated with one or more SCSs for multi-TTI scheduling, a quantity of CCEs and PDCCH candidates for blind decoding within a scheduling interval for multi-TTI scheduling, a quantity of control channel monitoring occasions within a scheduling interval for multi-TTI scheduling, search space periodicity associated with a scheduling interval for multi-TTI scheduling, a time interval for acting in accordance with grants or other transmissions for multi-TTI scheduling, a capability to perform beam switching between adjacent scheduling intervals for multi-TTI scheduling, a beam switching delay for multi-TTI scheduling, or any combination thereof.

In some aspects, the UE 115-a may receive the first configuration 415-a, the second configuration 415-b, or both, based on (e.g., in accordance with) parameters or characteristics indicated via the capability report 410. For example, in cases where the capability report 410 indicates a processing capability of the UE 115-a associated with one or more SCSs, the UE 115-a may receive the first configuration 415-a and/or the second configuration 415-b based on the indication of the processing capability. For instance, the second configuration 415-b may include an indication of a SCS, a TTI length (e.g., slot length), or both, based on an indication of a processing capability indicated in the capability report 410.

By way of another example, in cases where the capability report 410 indicates a quantity of CCEs and/or PDCCH candidates for blind decoding within a scheduling interval, a quantity of control channel monitoring occasions within a scheduling interval, or both, the UE 115-a may receive the first configuration 415-a and/or the second configuration 415-b based on the quantity of CCEs and/or PDCCH candidates for blind decoding, the quantity of control channel monitoring occasions, or both. For instance, the second configuration 415-b may configure the UE 115-a to monitor a first quantity of CCEs and/or PDCCH candidates in a scheduling interval based on (e.g., in accordance with) the indication of the quantity of CCEs and/or PDCCH candidates for blind decoding. Similarly, the second configuration 415-b may configure the UE 115-a to monitor a first quantity of control channel monitoring occasions in a scheduling interval based on (e.g., in accordance with) the indication of the quantity of control channel monitoring occasions.

By way of another example, in cases where the capability report 410 indicates a search space set periodicity associated with a scheduling interval, the second the second configuration 415-b may configure the UE 115-a to monitor a first search space set periodicity corresponding to a scheduling interval based (e.g., in accordance with) the indication of the search space set periodicity associated with the scheduling interval.

In some aspects, UE 115-a may receive, from the base station 105-a, an indication 440 to apply the first processing mode 420-a or the second processing mode 420-b. In some aspects, the indication 440 may be received via control signaling, including RRC signaling, MAC-CE message, DCI message(s), system information message(s), or any combination thereof. For example, the indication 440 to apply the first processing mode 420-a or the second processing mode 420-b may be indicated via one or more bit field values within a DCI message. In some aspects, the first UE 115-a may receive the indication 440 to apply the first processing mode 420-a or the second processing mode 420-b based on transmitting the capability report 410, receiving the first configuration 415-a, receiving the second configuration 415-b, or any combination thereof.

Additionally or alternatively, the UE 115-a may receive the indication 440 to apply the first processing mode 420-a or the second processing mode 420-b based on (e.g., in response to) a request by the UE 115-a to be configured with the first processing mode 420-a or the second processing mode 420-b. For example, in some cases, the UE 115-a may transmit a request to be configured with communications scheduled according to the first configuration 415-a or the second configuration 415-b (e.g., request for single-TTI scheduling or multi-TTI scheduling). The UE 115-a may transmit the request for the indicated processing mode based on identified characteristics at the UE 115-a (e.g., power consumption, battery level), based on identified characteristics of the wireless communications system (e.g., traffic, noise), or any combination thereof. In this example, the base station 105-a may transmit the indication 440 of the first processing mode 420-a or the second processing mode 420-b in accordance with the request.

In some aspects, the UE 115-a may determine a set of configuration parameter values associated with the first processing mode 420-*a*, the second processing mode 420-*b*, or both. For example, the UE 115-*a* may determine a first set of configuration parameter values associated with the first processing mode 420-*a*, a second set of configuration parameter values associated with the second processing mode 420-*b*, or both. In some aspects, the UE 115-*a* may determine the configuration parameter values based on transmitting the capability report 410, receiving the first configuration 415-*a*, receiving the second configuration 415-*b*, receiving the indication 440 of the first processing mode 420-*a* or the second processing mode 420-*b*, or any combination thereof.

The configuration parameter values for the respective processing modes 420 may include any configuration parameter values associated with the respective processing mode including, but not limited to, a quantity of TTIs within a scheduling interval for multi-TTI scheduling, an indicated SCS, a TTI length, a time interval between a reception time of a grant and a time when the UE 115-*a* may act in accordance with the grant, a processing capability of the UE 115-*a*, quantities of CCEs and PDCCH candidates for blind decoding, quantities of control channel monitoring occasions, search space set periodicities, beam switching capabilities, or any combination thereof.

In some aspects, the first configuration 415-*a* for the first processing mode 420-*a* (e.g., first configuration 415-*a* for single-TTI scheduling) may include same or different configuration parameter values as compared to the second configuration 415-*b* for the second processing mode 420-*b* (e.g., second configuration 415-*b* for multi-TTI scheduling). For example, the first configuration 415-*a* may be associated with a first set of configuration parameter values, and the second configuration 415-*b* may be associated with a second set of configuration parameter values. In some cases, at least one configuration parameter value of the second set of configuration parameter values may be different from the first set of configuration parameter values, and vice versa. In additional or alternative cases, at least one configuration parameter value may be shared across the first and second sets of configuration parameter values. For instance, the UE 115-*a* may receive (e.g., via the first configuration 415-*a* and/or the second configuration 415-*b*) or more configuration parameter values that are different for the first processing mode 420-*a* and the second processing mode 420-*b*, where the one or more configuration parameter values that are different include a search space set periodicity, a TDRA table, a PUCCH resource, or a combination thereof.

In some aspects, the UE 115-*a* may determine a set of hardware characteristics for communicating with the base station 105-*a*. In some aspects, the UE 115-*a* may determine the set of hardware characteristics based on transmitting the capability report 410, receiving the first configuration 415-*a*, receiving the second configuration 415-*b*, receiving the indication 440 of the first processing mode 420-*a* or the second processing mode 420-*b*, determining the set of configuration parameter values, or any combination thereof.

The set of hardware characteristics may include hardware characteristics associated with an antenna array of the UE 115-*a* (e.g., RF component characteristics, phase shift characteristics, low-noise amplifier (LNA) characteristics), characteristics associated with a baseband component of the UE 115-*a*, characteristics associated with a bandwidth part at the UE 115-*a* (e.g., bandwidth part adjustment parameters, center frequency adjustment parameters, bandwidth part switching parameters), characteristics associated with transmission timing parameters at the UE 115-*a*, characteristics associated with reception timing parameters at the UE 115-*a*, characteristics associated with a transmission power metric for transmissions performed by the UE 115-*a* (e.g., phased-locked loop (PLL) parameters, power amplifier gain), characteristics associated with a discontinuous reception (DRX) cycle at the UE 115-*a* (e.g., characteristics associated with power up/power down of hardware blocks), characteristics associated with MAC-CE application timing, or any combination thereof.

In some aspects, the UE 115-*a* may communicate with the base station 105-*a* based on (e.g., in accordance with) the processing mode indicated by indication 440. In some aspects, the UE 115-*a* may communicate with the base station 105-*a* according to the indicated processing mode based on transmitting the capability report 410, receiving the first configuration 415-*a*, receiving the second configuration 415-*b*, receiving the indication 440 of the first processing mode 420-*a* or the second processing mode 420-*b*, determining the set of configuration parameter values for the respective processing modes 420, determining the set of hardware characteristics, or any combination thereof.

For example, in cases where the indication 440 indicates the first processing mode 420-*a*, the UE 115 may communicate with the base station 105-*a* in accordance with the first processing mode 420-*a*. In this example, the base station 105-*a* may schedule transmissions (e.g., PDSCH transmissions 430, PUSCH transmissions 435) between the UE 115-*a* and the base station 105-*a* according to a single-TTI scheduling configuration in which communications are scheduled for a single TTI. For instance, as shown in FIG. 4 and according to the first processing mode 420-*a*, the UE 115-*a* may receive a PDCCH transmission 425 within a TTI (e.g., slot), where the PDCCH transmission 425 schedules PDSCH transmissions 430 or PUSCH transmissions 435, within the TTI.

Conversely, by way of another example, in cases where the indication 440 indicates the second processing mode 420-*b*, the UE 115 may communicate with the base station 105-*a* in accordance with the second processing mode 420-*b*. In this example, the base station 105-*a* may schedule transmissions between the UE 115-*a* and the base station 105-*a* according to a multi-TTI scheduling configuration in which communications are scheduled for a scheduling interval spanning a set of TTIs (e.g., scheduling interval spanning a set of slots). For instance, as shown in FIG. 4 and according to the second processing mode 420-*b*, the UE 115-*a* may receive a PDCCH transmission 425 within a first TTI (e.g., first slot) of a scheduling interval, where the PDCCH transmission 425 schedules PDSCH transmissions 430 (or PUSCH transmissions 435) within the first TTI of the scheduling intervals, within subsequent TTIs of the scheduling interval, or both.

The communications between the UE 115-*a* and the base station 105-*a* may be performed based on (e.g., in accordance with) the parameters (e.g., configuration parameter values) associated with the indicated processing mode 420 including, but not limited to, a quantity of TTIs within a scheduling interval for multi-TTI scheduling, an indicated SCS, a TTI length, a time interval between a reception time of a grant and a time when the UE 115-*a* may act in accordance with the grant, a processing capability of the UE 115-*a*, quantities of CCEs for blind decoding, quantities of control channel monitoring occasions, search space set periodicities, beam switching capabilities, or any combination thereof.

In some examples, the UE 115-*a* may communicate with the base station 105-*a* according to the processing mode 420 indicated via the indication 440 using one or more beams during one or more scheduling intervals. For example, based on receiving the indication 440 indicating the processing mode 420, the UE 115-*a* may communicate with the base station 105-*a* using a first beam during a first scheduling interval.

In some aspects, the UE 115-*a* may receive a downlink transmission (e.g., PDCCH transmission 425) from the base station 105-*a*. In some aspects, the UE 115-*a* may receive the PDCCH transmission 425 during a first TTI of a set of TTIs of a scheduling interval for multi-TTI scheduling. In some examples, the PDCCH transmission 425 may schedule a transmission (e.g., PDSCH transmission 430, PUSCH transmission 435) to be performed at the UE 115-*a*. For example, the PDCCH transmission 425 may schedule an uplink transmission to be transmitted from the UE 115-*a* to the base station 105-*a*, a downlink transmission to be transmitted from the base station 105-*a* to the UE 115-*a*, or both.

In some aspects, the UE 115-*a* may receive the PDCCH transmission 425 based on transmitting the capability report 410, receiving the first configuration 415-*a*, receiving the second configuration 415-*b*, receiving the indication 440 of the first processing mode 420-*a* or the second processing mode 420-*b*, determining the set of configuration parameter values for the respective processing modes 420, determining the set of hardware characteristics, communicating with the base station 105-*a* according to the indicated processing mode 420, or any combination thereof.

For example, in some cases, the capability report 410 may include an indication of a time interval (e.g., processing time interval) between a first time in which the UE 115-*a* receives a grant and a second time in which the UE 115-*a* is capable of acting in accordance with the grant. In this example, the UE 115-*a* may receive the PDCCH transmission 425 which schedules an uplink transmission and/or a downlink transmission based on the indication of the scheduling interval in the capability report 410. In some cases, the PDCCH transmission 425 may be transmitted/received in a first TTI of a scheduling interval, and the transmission scheduled by the PDCCH transmission 425 may be scheduled within one or more TTIs subsequent to the first TTI within the scheduling interval. For instance, the transmission scheduled by the PDCCH transmission 425 may be scheduled based on (e.g., in accordance with) the indicated time interval such that the UE 115-*a* is able to receive the PDCCH transmission 425, process the PDCCH transmission 425, and perform the transmission scheduled by the PDCCH transmission 425. In this regard, the transmission scheduled by the PDCCH transmission 425 may be scheduled at some time after a length of the indicated time interval following reception of the PDCCH transmission 425.

In some aspects, the UE 115-*a* may perform the transmission scheduled by the PDCCH transmission 425. For example, in cases where the PDCCH transmission 425 schedules an uplink transmission from the UE 115-*a* to the base station 105-*a*, the UE 115-*a* may transmit an uplink transmission to the base station at 105-*a*. By way of another example, in cases where the PDCCH transmission 425 schedules a downlink transmission from the base station 105-*a* to the UE 115-*a*, the UE 115-*a* may receive a downlink transmission from the base station at 105-*a*.

As noted previously herein, the UE 115-*a* may perform the communications scheduled by the PDCCH transmission 425 based on a time interval for processing grants/allocations of resources which was indicted in the capability report 410. In particular, the UE 115-*a* may perform the communications scheduled by the PDCCH transmission 425 at some time after a termination of the time interval which is initiated upon receipt of the PDCCH transmission 425 scheduling the communications.

In some examples, the UE 115-*a* may selectively modify one or more hardware characteristics used for communicating with the base station 105-*a*. In some aspects, the UE 115-*a* may modify one or more hardware characteristics at a boundary of a TTI (e.g., at a boundary of a slot, between slots), at a boundary of a scheduling interval (e.g., at a boundary of a scheduling interval, between scheduling intervals). In this regard, the UE 115-*a* may selectively modify one or more hardware characteristics while communicating in accordance with the indicated processing mode 420. The UE 115-*a* may selectively modify the one or more hardware characteristics based on transmitting the capability report 410, receiving the first configuration 415-*a*, receiving the second configuration 415-*b*, receiving the indication 440 of the first processing mode 420-*a* or the second processing mode 420-*b*, determining the set of configuration parameter values for the respective processing modes 420, determining the set of hardware characteristics, communicating with the base station 105-*a* according to the indicated processing mode 420, or any combination thereof.

For example, the UE 115-*a* may determine a first set of hardware characteristics for communicating with the base station 105-*a*, and may communicate with the base station 105-*a* using the first set of hardware characteristics during a first scheduling interval. In this example, the UE 115-*a* may modify one or more hardware characteristics of the first set of hardware characteristics to generate a second set of hardware characteristics. In some aspects, the UE 115-*a* may modify the one or more hardware characteristics of the first set of hardware characteristics at a boundary of the first scheduling interval and a second scheduling interval (e.g., between the first scheduling interval and the second scheduling interval). In some cases, modifying hardware characteristics at a boundary of scheduling intervals may enable phase continuity to be maintained across the scheduling intervals (e.g., no status change), which may enable DMRS-based channel estimation to be performed and combined within the respective scheduling intervals.

Upon modifying the hardware characteristics, the UE 115-*a* may communicate with the base station 105-*a* based on (e.g., in accordance with) the indicated processing mode 420, the modified hardware characteristics, or both. In this regard, the UE 115-*a* may communicate with the base station 105-*a* based on transmitting the capability report 410, receiving the first configuration 415-*a*, receiving the second configuration 415-*b*, receiving the indication 440 of the first processing mode 420-*a* or the second processing mode 420-*b*, determining the set of configuration parameter values for the respective processing modes 420, determining the set of hardware characteristics, communicating in accordance with the indicated processing mode 420, modifying one or more hardware characteristics, or any combination thereof.

For instance, continuing with the example above, the UE 115-*a* may communicate with the base station 105-*a* using the first set of hardware characteristics during a first scheduling interval, and may modify the one or more hardware characteristics of the first set of hardware characteristics at a boundary of the first scheduling interval and a second scheduling interval. In this example, the UE 115-*a* may communicate with the base station 105-*a* using a second set of hardware characteristics (e.g., modified set of hardware characteristics) during a second scheduling interval.

In some examples, the UE 115-*a* may communicate with the base station 105-*a* using one or more beams during one or more TTIs and/or scheduling intervals. In particular, the UE 115-*a* may communicate with the base station 105-*a* during a second scheduling interval and/or second TTI which are the same or different as a beam used to communicate during a first scheduling interval and/or first TTI. For example, as noted previously herein, the capability report 410 may include an indication that the UE 115-*a* may perform beam switching at the UE 115-*a* between adjacent scheduling intervals. In this example, the UE 115-*a* may communicate with the base station 105-*a* using a first beam during a first scheduling interval, and may communicate with the base station 105-*a* using a second beam during a second scheduling interval based on the indication of the capability to perform beam switching. In some cases, the UE 115-*a* may perform a beam switching procedure to switch from the first beam to the second beam at a boundary between the first scheduling interval and the second scheduling interval.

In some aspects, the UE 115-*a* may transmit, to the base station 105-*a*, a request or indication 445 (hereinafter "indication 445") to transition from the processing mode 420 indicated via the indication 440 to a different processing mode 420. For example, in cases where the indication 440 indicates for the UE 115-*a* to communicate using the first processing mode 420-*a*, the indication 445 may indicate that the UE 115-*a* is to transition to the second processing mode 420-*b*. By way of another example, in cases where the indication 440 indicates for the UE 115-*a* to communicate using the second processing mode 420-*b*, the indication 445 may indicate that the UE 115-*a* is to transition to the first processing mode 420-*a*.

In some aspects, the UE 115-*a* may transmit the indication 445 to switch processing modes 420 based on one or more characteristics of the UE 115-*a* (e.g., power level, battery level, power consumption), the wireless communications system (e.g., noise, traffic), or both. For example, as noted previously herein with respect to FIG. 3, multi-TTI scheduling techniques described herein may enable the UE 115-*a* to refrain from performing control channel monitoring for every TTI (e.g., every slot). In particular, multi-TTI scheduling techniques may enable the UE 115-*a* to perform control channel monitoring for a subset of TTIs within a scheduling interval, which may increase times which the UE 115-*a* is able to perform micro-sleep procedures to reduce power consumption and conserve battery power. Accordingly, in this example, the UE 115-*a* may transmit the indication 445 to transition from the first processing mode 420-*a* (e.g., single-TTI scheduling) to the second processing mode 420-*b* (e.g., multi-TTI scheduling) upon identifying a low power state and/or a high power consumption at the UE 115-*a*.

Upon transmitting the indication 445 to switch processing modes 420, the UE 115-*a* may communicate with the base station 105-*a* based on (e.g., in accordance with) the indication 445. In this regard, the UE 115-*a* may communicate with the base station 105-*a* using the first processing mode 420-*a* or the second processing mode 420-*b* which is signaled via the indication 445.

Techniques described herein may provide for improved scheduling of wireless communications for both single-TTI scheduling (e.g., single-slot scheduling) and multi-TTI scheduling (e.g., multi-slot scheduling). In particular, by enabling the UE 115-*a* to inform the network (e.g., base station 105-*a*) its capability to support a single-slot processing mode and/or a multi-slot processing mode, techniques described herein may enable the base station 105-*a* to communicate with the UE 115-*a* using single-slot scheduling and/or multi-slot scheduling depending on the characteristics of the network (e.g., quantity of data traffic, noise) as well as the capabilities of the UE 115-*a*. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115-*a* may be reduced, leading to improved battery performance and battery life.

Figure 5:
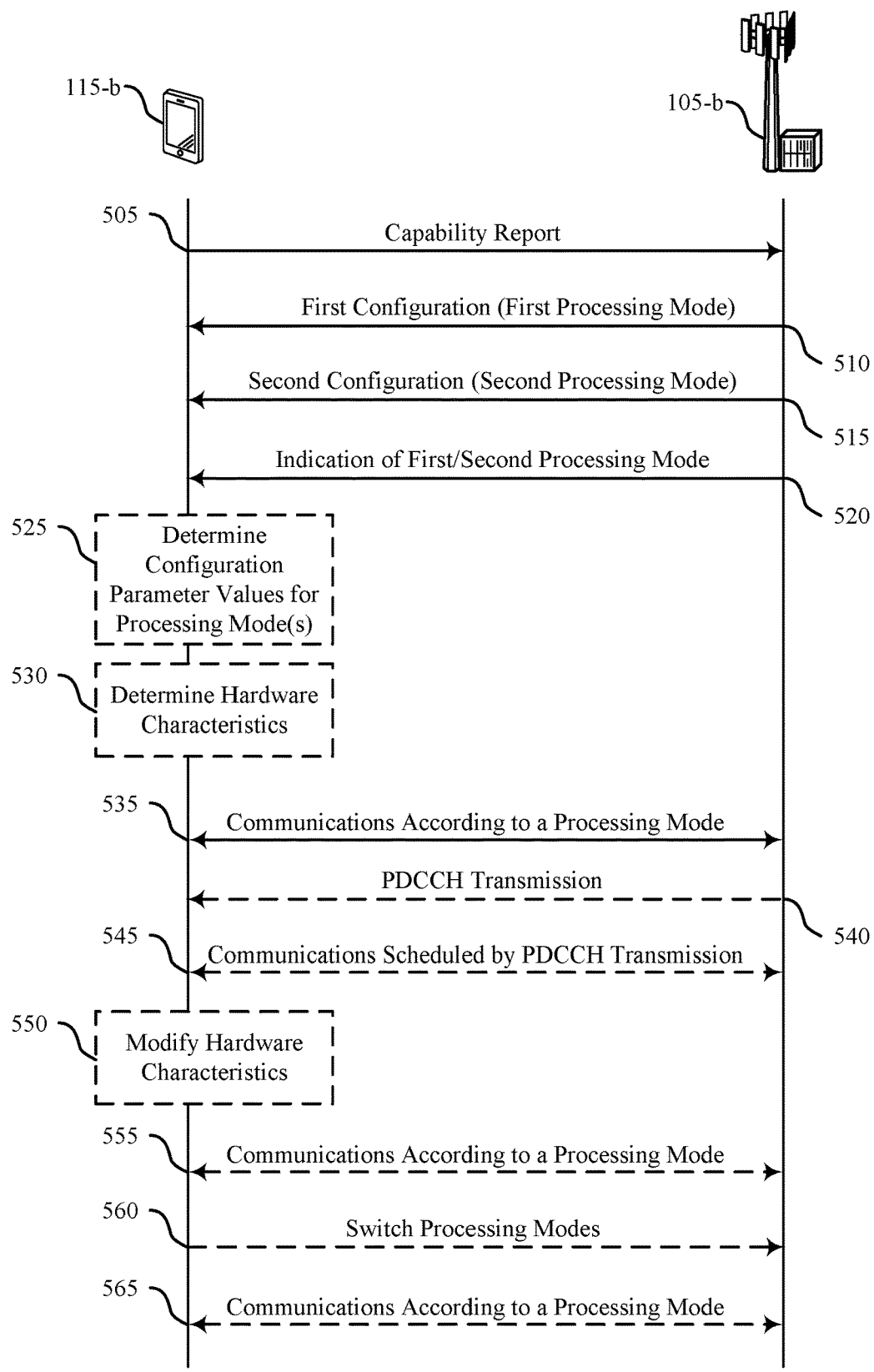
FIG. 5 illustrates an example of a process flow that supports techniques for adapting scheduling timelines to processing grids in accordance with aspects of the present disclosure.

FIG. 5 illustrates an example of a process flow 500 that supports techniques for adapting scheduling timelines to processing grids in accordance with aspects of the present disclosure. In some examples, process flow 500 may implement, or be implemented by, aspects of wireless communications systems 100, communications configuration 200, communications configuration 300, wireless communications system 400, or any combination thereof. For example, the process flow 500 may illustrate a UE 115-*b* transmitting a capability report indicating a capability of the UE 115-*b* to support multi-TTI scheduling, receiving configurations for a first processing mode for single-slot scheduling and/or a second processing mode for multi-slot scheduling, receiving an indication of a processing mode which is to be used, and communicating according to the indicated processing mode, as described with reference to FIGS. 1-4.

In some cases, process flow 500 may include a UE 115-*a*, and a base station 105-*b*, which may be examples of corresponding devices as described herein. In particular, the UE 115-*b* and the base station 105-*b* illustrated in FIG. 5 may include examples of the UE 115-*a* and the base station 105-*a* illustrated in FIG. 4.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-*a* may transmit an indication of a UE capability (e.g., capability report) to the base station 105-*b*. In some aspects, the capability report may indicate a capability of the UE 115-*a* to support single-TTI scheduling, multi-TTI scheduling, or both. For single-TTI scheduling, a single control message (e.g., PDCCH transmission) received by the UE 115-*b* may schedule transmissions (e.g., PDSCH transmissions, PUSCH transmissions) for a single TTI. Comparatively, for multi-TTI scheduling, a single control message received by the UE 115-*b* may schedule transmissions within (e.g., across) multiple TTIs of a scheduling interval for multi-TTI scheduling. For instance, with multi-TTI scheduling, a single control message may schedule a first transmission within a first TTI of a scheduling interval, and a second transmission within a second TTI of the scheduling interval. In the context of single-TTI scheduling and/or multi-TTI scheduling, a TTI may include any time interval including, but not limited to, a slot, a subframe, a symbol group, or any combination thereof.

In some aspects, the capability report transmitted at 505 may indicate one or more parameters (e.g., configuration parameter values) associated with capabilities of the UE 115-*a*, one or more parameter associated with single-TTI and/or multi-TTI scheduling supported by the UE 115-*b*, or any combination thereof. Configuration parameters which may be indicated within the capability report may include, but are not limited to, a processing capability of the UE 115-b, quantities of CCEs and/or PDCCH candidates for blind decoding for multi-TTI scheduling, quantities of control channel monitoring occasions for multi-TTI scheduling, a search space set periodicity for multi-TTI scheduling, time intervals (e.g., processing intervals) for multi-TTI scheduling, beam switching capabilities, beam switching delays, or any combination thereof.

For example, as noted previously herein, as a frequency of wireless communications increases, an associated SCS increases. Moreover, as SCS increases, a slot length of wireless communications decreases, resulting in complexities in the context of processing capabilities of a UE 115. In this regard, a processing capability of the UE 115-b may be characterized or defined as a function of SCS. Accordingly, in this example, the capability report may include an indication of a processing capability of the UE 115-b associated with one or more SCS. For instance, the capability report may indicate a first processing capability associated with a first SCS, and a second processing capability associated with a second SCS, where the second processing capability is different from the first processing capability. Processing capabilities may be reported using any metric or unit known in the art including, but not limited to, MHz, GHz, clock speed, and the like.

In some examples, the capability report may include an indication of a quantity of CCEs and/or PDCCH candidates for blind decoding for single-TTI scheduling, for multi-TTI scheduling, or both. In the context of single-TTI scheduling, the quantity of CCEs for blind decoding may be defined per TTI (e.g., defined per slot, per subframe, etc.). In the context of multi-TTI scheduling, quantities of CCEs for blind decoding may be defined per scheduling interval for multi-TTI scheduling. For instance, the capability report may indicate a maximum quantity of CCEs and/or maximum quantity of PDCCH candidates which the UE 115-b is able to blindly decode per scheduling interval. In some aspects, the quantity of CCEs and/or PDCCH candidates for blind decoding may be reported as a function of a quantity of TTIs per scheduling interval. For example, the capability report may indicate that the UE 115-b may blindly decode larger quantities of CCEs and PDCCH candidates for longer scheduling intervals (e.g., scheduling intervals spanning larger quantities of TTIs), and may indicate that the UE 115 may blindly decode smaller quantities of CCEs and PDCCH candidates for shorter scheduling intervals (e.g., scheduling intervals spanning fewer quantities of TTIs).

By way of another example, the capability report may include an indication of a quantity of monitoring occasions (e.g., control channel monitoring occasions) for single-TTI scheduling, for multi-TTI scheduling, or both. In the context of single-TTI scheduling, the quantity of monitoring occasions may be defined per TTI or quantities of TTIs (e.g., control channel monitoring occasions per slot, control channel monitoring occasions per multiple slots, control channel monitoring occasions per subframe, control channel monitoring occasions per multiple subframes, etc.). In the context of multi-TTI scheduling, the quantity of monitoring occasions (e.g., control channel monitoring occasions) may be defined per scheduling interval for multi-TTI scheduling. For instance, the capability report may indicate a maximum quantity of control channel monitoring occasions which the UE 115-b is able to monitor per scheduling interval (e.g., quantity of control channel monitoring occasions within a scheduling interval). As noted previously herein with respect to quantities of CCEs for blind decoding, the quantity of control channel monitoring occasions supported by the UE 115-b may be reported as a function of a quantity of TTIs per scheduling interval. In particular, the UE 115-b may indicate that it supports larger quantities of control channel monitoring occasions for longer scheduling intervals, and fewer quantities of control channel monitoring occasions for shorter scheduling intervals.

In some examples, the capability report may indicate a search space set periodicity for single-TTI scheduling, for multi-TTI scheduling, or both. In the context of single-TTI scheduling, the search space set periodicity may be defined per TTI (e.g., search space set per slot, search space set per subframe, etc.). In the context of multi-TTI scheduling, multi-TTI scheduling. In some aspects, the search space set periodicity may be a reported as a function of a length of the scheduling interval. For example, the capability report may indicate a first search space set periodicity associated with a first scheduling interval (e.g., first nominal grid) of a first length, and may indicate a second search space set periodicity associated with a second scheduling interval (e.g., second nominal grid) of a second length. Additionally or alternatively, the capability report may define the search space set periodicity across multiple scheduling intervals (e.g., across multiple grids). For example, the capability report may indicate a first search space set periodicity for a set of two scheduling intervals (e.g., set of two nominal grids), and may indicate a second search space set periodicity for a set of three scheduling intervals (e.g., set of three nominal grids).

In some aspects, the capability report may indicate a time interval which defines a processing duration between when the UE 115-b receives a message (e.g., grant, allocation of resources) from the base station 105-b and is able to act in accordance with the message. For example, the capability report may indicate a time interval between a first time in which the UE 115-a receives a grant, and a second time in which the UE 115-b is capable of acting in accordance with the grant. For instance, the capability report may include an indication of a K0 values for PDSCH transmissions, a K1 value for HARQ feedback messages (e.g., ACK, NACK), a K2 value for PUSCH transmissions, or any combination thereof. In this regard, the capability report may indicate one or more scheduling offsets for transmissions which are scheduled at the UE 115-b.

Additionally or alternatively, the capability report may indicate configuration parameters or capabilities associated with beam switching procedures performed at the UE 115-b. For example, the capability report may indicate one or more beam switching delays associated with one or more beam switching procedures (e.g., uplink beam to downlink beam, downlink beam to uplink beam, beam ID 1 to beam ID 2, beam ID 1 to beam ID 3) which are performed by the UE 115-b. By way of another example, the capability report may indicate a capability of the UE 115-b to perform beam switching procedures between adjacent TTIs (e.g., between adjacent slots), between adjacent scheduling intervals, or both. For instance, in the context of multi-TTI scheduling, the UE 115-b may indicate a capability to perform one or more beam switching procedures between a first scheduling interval including a first set of TTIs and a second, adjacent scheduling interval including a second subset of TTIs. In some cases, capabilities to perform beam switching capabilities may be reported as a function of a size (e.g., length, quantity of TTIs) of the scheduling interval.

Additional configuration parameters which may be indicated via the capability report may include units of PDSCH/PUSCH scheduling, repetition configurations for transmission/reception of signals associated with single-TTI scheduling and/or multi-TTI scheduling, frequency hopping configurations for transmission/reception of signals associated with single-TTI scheduling and/or multi-TTI scheduling, TDRA tables associated with single TTI scheduling and/or multi-TTI scheduling, FDRA tables associated with single-TTI scheduling and/or multi-TTI scheduling, sets of resources (e.g., time resources, frequency resources, PUSCH resources, PUCCH resources, PDSCH resources, PDCCH resources) associated with transmissions scheduled via single-TTI scheduling and/or multi-TTI scheduling, or any combination thereof. In some cases, the capability report may include an indication of a configuration for PUSCH repetition Type B transmissions associated with single-TTI scheduling and/or multi-TTI scheduling (e.g., split point for PUSCH repetition Type B), or any combination thereof.

At 510, the UE 115-b may receive, from the base station 105-b, a first configuration of a first processing mode for the UE 115-b that is associated with communications scheduled for a single TTI (e.g., configuration for single-TTI scheduling). The first configuration may be indicated via an RRC message, a DCI message, a system information message, or any combination thereof. In some aspects, the UE 115-b may receive the first configuration at 510 based on transmitting the capability report at 505.

The first configuration of the first processing mode may indicate one more parameters or characteristics for single-TTI scheduling of wireless communications at the UE 115-b. In particular, the first configuration may include one or more configuration parameter values for single-TTI scheduling which were indicated in the capability report including, but not limited to, a processing capability associated with one or more SCSs for single-TTI scheduling, a quantity of CCEs and/or PDCCH candidates for blind decoding for single-TTI scheduling, a quantity of control channel monitoring occasions within a TTI or set of TTIs for single-TTI scheduling, a search space periodicity associated with a TTI or set of TTIs for single-TTI scheduling, a time interval for acting in accordance with grants or other transmissions for single-TTI scheduling, a capability to perform beam switching between adjacent TTIs for single-TTI scheduling, a beam switching delay for single-TTI scheduling, or any combination thereof. In some cases, the capability report may indicate a capability of the UE 115-b to switch between the first processing mode and the second processing mode, a delay time for switching between the respective processing modes, and the like. Similar, in some examples, the capability report may indicate a capability of the UE 115-b to selectively modify one or more parameters associated with the first processing mode and/or the second processing mode, or both.

At 515 the UE 115-b may receive, from the base station 105-b, a second configuration of a second processing mode for the UE 115-b that is associated with communications scheduled for a scheduling interval spanning a set of TTIs (e.g., configuration for multi-TTI scheduling). The second configuration may be indicated via an RRC message, a DCI message, a system information message, or any combination thereof. In some aspects, the UE 115-b may receive the second configuration at 515 based on transmitting the capability report at 505, receiving the first configuration at 510, or both. Additionally or alternatively, the UE 115-b may receive the first configuration for the first processing mode and the second configuration for the second processing mode in a single transmission (e.g., RRC message, DCI message, system information message).

The second configuration of the second processing mode may indicate one more parameters or characteristics multi-TTI scheduling of wireless communications at the UE 115-b. In particular, the first configuration may include one or more configuration parameter values for multi-TTI scheduling which were indicated in the capability report including, but not limited to, a type of TTI associated with a scheduling interval (e.g., slot, subframe, symbol group), a length of scheduling interval (e.g., quantity of TTIs per scheduling interval), a processing capability associated with one or more SCSs for multi-TTI scheduling, a quantity of CCEs and/or PDCCH candidates for blind decoding within a scheduling interval for multi-TTI scheduling, a quantity of control channel monitoring occasions within a scheduling interval for multi-TTI scheduling, search space periodicity associated with a scheduling interval for multi-TTI scheduling, a time interval for acting in accordance with grants or other transmissions for multi-TTI scheduling, a capability to perform beam switching between adjacent scheduling intervals for multi-TTI scheduling, a beam switching delay for multi-TTI scheduling, or any combination thereof.

In some aspects, the UE 115-b may receive the first configuration at 510, the second configuration at 520, or both, based on (e.g., in accordance with) parameters or characteristics indicated via the capability report transmitted at 505. For example, in cases where the capability report indicates a processing capability of the UE 115-b associated with one or more SCSs, the UE 115-b may receive the first configuration and/or the second configuration based on the indication of the processing capability. For instance, the second configuration may include an indication of a SCS, a TTI length (e.g., slot length), or both, based on an indication of a processing capability indicated in the capability report.

By way of another example, in cases where the capability report indicates a quantity of CCEs for blind decoding within a scheduling interval, a quantity of control channel monitoring occasions within a scheduling interval, or both, the UE 115-b may receive the first configuration and/or the second configuration based on the quantity of CCEs and/or control channel candidates (e.g., PDCCH candidates) for blind decoding, the quantity of control channel monitoring occasions, or both. For instance, the second configuration may configure the UE 115-b to monitor a first quantity of CCEs in a scheduling interval based on (e.g., in accordance with) the indication of the quantity of CCEs for blind decoding. Similarly, the second configuration may configure the UE 115-b to monitor a first quantity of control channel monitoring occasions in a scheduling interval based on (e.g., in accordance with) the indication of the quantity of control channel monitoring occasions.

By way of another example, in cases where the capability report indicates a search space set periodicity associated with a scheduling interval, the second the second configuration may configure the UE 115-b to monitor a first search space set periodicity corresponding to a scheduling interval based (e.g., in accordance with) the indication of the search space set periodicity associated with the scheduling interval.

At 520, the UE 115-b may receive, from the base station 105-b, an indication to apply the first processing mode or the second processing mode. In some aspects, the indication at 520 may be received via control signaling, including RRC signaling, DCI message(s), system information message(s), or any combination thereof. For example, the indication to apply the first processing mode or the second processing mode may be indicated via one or more bit field values within a DCI message. In some aspects, the first UE 115-b may receive the indication to apply the first processing mode or the second processing mode based on transmitting the capability report at 505, receiving the first configuration at 510, receiving the second configuration at 515, or any combination thereof.

Additionally or alternatively, the UE 115-*b* may receive the indication to apply the first processing mode or the second processing mode based on (e.g., in response to) a request by the UE 115-*b* to be configured with the first processing mode or the second processing mode. For example, in some cases, the UE 115-*b* may transmit a request to be configured with communications scheduled according to the first configuration or the second configuration (e.g., request for single-TTI scheduling or multi-TTI scheduling). The UE 115-*b* may transmit the request for the indicated processing mode based on identified characteristics at the UE 115-*b* (e.g., power consumption, battery level), based on identified characteristics of the wireless communications system (e.g., traffic, noise), or any combination thereof. In this example, the base station 105-*b* may transmit the indication of the first processing mode or the second processing mode in accordance with the request.

At 525, the UE 115-*b* may determine a set of configuration parameter values associated with the first processing mode, the second processing mode, or both. For example, the UE 115-*b* may determine a first set of configuration parameter values associated with the first processing mode, a second set of configuration parameter values associated with the second processing mode, or both. In some aspects, the UE 115-*b* may determine the configuration parameter values at 525 based on transmitting the capability report at 505, receiving the first configuration at 510, receiving the second configuration at 515, receiving the indication of the first processing mode or the second processing mode at 520, or any combination thereof.

The configuration parameter values determined at 525 may include any configuration parameter values associated with the respective processing mode including, but not limited to, a quantity of TTIs within a scheduling interval for multi-TTI scheduling, an indicated SCS, a TTI length, a time interval between a reception time of a grant and a time when the UE 115-*b* may act in accordance with the grant, a processing capability of the UE 115-*b*, quantities of CCEs and/or PDCCH candidates for blind decoding, quantities of control channel monitoring occasions, search space set periodicities, beam switching capabilities, or any combination thereof.

In some aspects, the first configuration for the first processing mode (e.g., first configuration for single-TTI scheduling) may include same or different configuration parameter values as compared to the second configuration for the second processing mode (e.g., second configuration for multi-TTI scheduling). For example, the first configuration received at 510 may be associated with a first set of configuration parameter values, and the second configuration received at 515 may be associated with a second set of configuration parameter values. In some cases, at least one configuration parameter value of the second set of configuration parameter values may different from the first set of configuration parameter values, and vice versa. In additional or alternative cases, at least one configuration parameter value may be shared across the first and second sets of configuration parameter values. For instance, the UE 115-*b* may receive (e.g., via the first configuration and/or the second configuration) or more configuration parameter values that are different for the first processing mode and the second processing mode, where the one or more configuration parameter values that are different include a search space set periodicity, a TDRA table, a PUCCH resource, or a combination thereof.

At 530, the UE 115-*b* may determine a set of hardware characteristics for communicating with the base station 105-*b*. In some aspects, the UE 115-*b* may determine the set of hardware characteristics at 525 based on transmitting the capability report at 505, receiving the first configuration at 510, receiving the second configuration at 515, receiving the indication of the first processing mode or the second processing mode at 520, determining the set of configuration parameter values at 525, or any combination thereof.

The set of hardware characteristics may include hardware characteristics associated with an antenna array of the UE 115-*b* (e.g., RF component characteristics, phase shifter characteristics, LNA characteristics), characteristics associated with a baseband component of the UE 115-*b*, characteristics associated with a bandwidth part at the UE 115-*b* (e.g., bandwidth part adjustment parameters, center frequency adjustment parameters, bandwidth part switching parameters), characteristics associated with transmission timing parameters at the UE 115-*b*, characteristics associated with reception timing parameters at the UE 115-*b*, characteristics associated with a transmission power metric for transmissions performed by the UE 115-*b* (e.g., PLL parameters, power amplifier gain), characteristics associated with a DRX cycle at the UE 115-*b* (e.g., characteristics associated with power up/power down of hardware blocks), characteristics associated with MAC-CE application timing, or any combination thereof.

At 535, the UE 115-*b* may communicate with the base station 105-*b* based on (e.g., in accordance with) the indicated processing mode. In some aspects, the UE 115-*b* may communicate with the base station 105-*b* based on transmitting the capability report at 505, receiving the first configuration at 510, receiving the second configuration at 515, receiving the indication of the first processing mode or the second processing mode at 520, determining the set of configuration parameter values at 525, determining the set of hardware characteristics at 530, or any combination thereof.

For example, in cases where the indication received at 520 indicates the first processing mode, the UE 115 may communicate with the base station 105-*b* in accordance with the first processing mode. In this example, the base station 105-*b* may schedule transmissions between the UE 115-*b* and the base station 105-*b* according to a single-TTI scheduling configuration in which communications are scheduled for a single TTI. Conversely, by way of another example, in cases where the indication received at 520 indicates the second processing mode, the UE 115 may communicate with the base station 105-*b* in accordance with the second processing mode. In this example, the base station 105-*b* may schedule transmissions between the UE 115-*b* and the base station 105-*b* according to a multi-TTI scheduling configuration in which communications are scheduled for a scheduling interval spanning a set of TTIs (e.g., scheduling interval spanning a set of slots).

The communications between the UE 115-*b* and the base station 105-*b* at 530 may be performed based on (e.g., in accordance with) the parameters (e.g., configuration parameter values) associated with the indicated processing mode including, but not limited to, a quantity of TTIs within a scheduling interval for multi-TTI scheduling, an indicated SCS, a TTI length, a time interval between a reception time of a grant and a time when the UE 115-*b* may act in accordance with the grant, a processing capability of the UE 115-*b*, quantities of CCEs for blind decoding, quantities of control channel monitoring occasions, search space set periodicities, beam switching capabilities, or any combination thereof.

In some examples, the UE 115-*b* may communicate with the base station 105-*b* at 535 using one or more beams during one or more scheduling intervals. For example, at 535, the UE 115-*b* may communicate with the base station 105-*b* using a first beam during a first scheduling interval.

At 540, the UE 115-*b* may receive a downlink transmission (e.g., PDCCH transmission) from the base station 105-*b*. In some aspects, the UE 115-*b* may receive the PDCCH transmission during a first TTI of a set of TTIs of a scheduling interval for multi-TTI scheduling. In some examples, the PDCCH transmission may schedule a transmission to be performed at the UE 115-*b*. For example, the PDCCH transmission may schedule an uplink transmission to be transmitted from the UE 115-*b* to the base station 105-*b*, a downlink transmission to be transmitted from the base station 105-*b* to the UE 115-*b*, or both.

In some aspects, the UE 115-*b* may receive the PDCCH transmission at 540 based on transmitting the capability report at 505, receiving the first configuration at 510, receiving the second configuration at 515, receiving the indication of the first processing mode or the second processing mode at 520, determining the set of configuration parameter values at 525, determining the set of hardware characteristics at 530, communicating with the base station 105-*b* according to the indicated processing mode at 540, or any combination thereof.

For example, in some cases, the capability report transmitted at 505 may include an indication of a time interval (e.g., processing time interval) between a first time in which the UE 115-*b* receives a grant and a second time in which the UE 115-*b* is capable of acting in accordance with the grant. In this example, the UE 115-*b* may receive the PDCCH transmission at 545 which schedules an uplink transmission and/or a downlink transmission based on the indication of the scheduling interval in the capability report. In some cases, the PDCCH transmission may be transmitted/received in a first TTI of a scheduling interval, and the transmission scheduled by the PDCCH transmission may be scheduled within one or more TTIs subsequent to the first TTI. For instance, the transmission scheduled by the PDCCH transmission may be scheduled based on (e.g., in accordance with) the indicated time interval such that the UE 115-*b* is able to receive the PDCCH transmission, process the PDCCH transmission and perform the transmission scheduled by the PDCCH transmission. In this regard, the transmission scheduled by the PDCCH transmission may be scheduled at some time after a length of the indicated time interval following reception of the PDCCH transmission.

At 545, the UE 115-*b* may perform the transmission scheduled by the PDCCH transmission at 540. For example, in cases where the PDCCH transmission schedules an uplink transmission from the UE 115-*b* to the base station 105-*b*, the UE 115-*b* may transmit an uplink transmission to the base station at 105-*b*. By way of another example, in cases where the PDCCH transmission schedules a downlink transmission from the base station 105-*b* to the UE 115-*b*, the UE 115-*b* may receive a downlink transmission from the base station at 105-*b*.

As noted previously herein, the UE 115-*b* may perform the communications scheduled by the PDCCH transmission based on a time interval for processing grants/allocations of resources which was indicted in the capability report. In particular, the UE 115-*b* may perform the communications scheduled by the PDCCH transmission at some time after a termination of the time interval which is initiated upon receipt of the PDCCH transmission scheduling the communications.

At 550, the UE 115-*b* may selectively modify one or more hardware characteristics used for communicating with the base station 105-*b*. In some aspects, the UE 115-*b* may modify one or more hardware characteristics at a boundary of a TTI (e.g., at a boundary of a slot, between slots), at a boundary of a scheduling interval (e.g., at a boundary of a scheduling interval, between scheduling intervals). In this regard, the UE 115-*b* may selectively modify one or more hardware characteristics while communicating in accordance with the indicated processing mode. The UE 115-*b* may selectively modify the one or more hardware characteristics based on transmitting the capability report at 505, receiving the first configuration at 510, receiving the second configuration at 515, receiving the indication of the first processing mode or the second processing mode at 520, determining the set of configuration parameter values at 525, determining the set of hardware characteristics at 530, communicating with the base station according to the indicated processing mode at 535, receiving the PDCCH transmission at 540, performing the communications scheduled by the PDCCH transmission at 545, or any combination thereof.

For example, at 530, the UE 115-*b* may determine a first set of hardware characteristics for communicating with the base station 105-*b*, and may communicate with the base station 105-*b* using the first set of hardware characteristics during a first scheduling interval at 535. In this example, the UE 115-*b* may modify one or more hardware characteristics of the first set of hardware characteristics to generate a second set of hardware characteristics. In some aspects, the UE 115-*b* may modify the one or more hardware characteristics of the first set of hardware characteristics at a boundary of the first scheduling interval and a second scheduling interval (e.g., between the first scheduling interval and the second scheduling interval).

At 555, the UE 115-*b* may communicate with the base station 105-*b* based on (e.g., in accordance with) the indicated processing mode, the modified hardware characteristics, or both. In this regard, the UE 115-*b* may communicate with the base station 105-*b* based on transmitting the capability report at 505, receiving the first configuration at 510, receiving the second configuration at 515, receiving the indication of the first processing mode or the second processing mode at 520, determining the set of configuration parameter values at 525, determining the set of hardware characteristics at 530, communicating in accordance with the indicated processing mode at 535, receiving the PDCCH transmission at 540, performing the communications scheduled by the PDCCH transmission at 545, modifying one or more hardware characteristics at 550, or any combination thereof.

For instance, continuing with the example above, the UE 115-*b* may communicate with the base station 105-*b* using the first set of hardware characteristics during a first scheduling interval at 535, and may modify the one or more hardware characteristics of the first set of hardware characteristics at a boundary of the first scheduling interval and a second scheduling interval at 555. In this example, the UE 115-*b* may communicate with the base station 105-*b* at 555 using a second set of hardware characteristics (e.g., modified set of hardware characteristics) during a second scheduling interval.

In some examples, the UE 115-*b* may communicate with the base station 105-*b* at 555 using one or more beams during one or more TTIs and/or scheduling intervals. In particular, the UE 115-*b* may communicate with the base station 105-*b* at 555 during a second scheduling interval and/or second TTI which are the same or different as a beam used to communicate during a first scheduling interval and/or first TTI. For example, as noted previously herein, the capability report transmitted at 505 may include an indication that the UE 115-*b* may perform beam switching at the UE 115-*b* between adjacent scheduling intervals. In this example, the UE 115-*b* may communicate with the base station 105-*b* at 535 using a first beam during a first scheduling interval, and may communicate with the base station 105-*b* at 555 using a second beam during a second scheduling interval based on the indication of the capability to perform beam switching. In some cases, the UE 115-*b* may perform a beam switching procedure to switch from the first beam to the second beam at a boundary between the first scheduling interval and the second scheduling interval.

At 560, the UE 115-*b* may transmit, to the base station 105-*b*, a request or indication to transition from the processing mode indicated at 520 to a different processing mode. For example, in cases where the indication received at 520 indicates for the UE 115-*b* to communicate using the first processing mode, the request/indication transmitted at 560 may indicate that the UE 115-*b* is to transition to the second processing mode. By way of another example, in cases where the indication received at 520 indicates for the UE 115-*b* to communicate using the second processing mode, the request/indication transmitted at 560 may indicate that the UE 115-*b* is to transition to the first processing mode.

In some aspects, the UE 115-*b* may transmit the indication/request to switch processing modes at 560 based on one or more characteristics of the UE 115-*b* (e.g., power level, battery level, power consumption), the wireless communications system (e.g., noise, traffic), or both. For example, as noted previously herein with respect to FIG. 3, multi-TTI scheduling techniques described herein may enable the UE 115-*b* to refrain from performing control channel monitoring for every TTI (e.g., every slot). In particular, multi-TTI scheduling techniques may enable the UE 115-*b* to perform control channel monitoring for a subset of TTIs within a scheduling interval, which may increase times which the UE 115-*b* is able to perform micro-sleep procedures to reduce power consumption and conserve battery power. Accordingly, in this example, the UE 115-*b* may transmit a request/indication to transition from the first processing mode (e.g., single-TTI scheduling) to the second processing mode (e.g., multi-TTI scheduling) upon identifying a low power state and/or a high power consumption at the UE 115-*b*.

At 565, the UE 115-*b* may communicate with the base station 105-*b* based on (e.g., in accordance with) the indication/request transmitted at 565. In this regard, the UE 115-*b* may communicate with the base station 105-*b* at 565 using the first processing mode or the second processing mode indicated at 560.

Techniques described herein may provide for improved scheduling of wireless communications for both single-TTI scheduling (e.g., single-slot scheduling) and multi-TTI scheduling (e.g., multi-slot scheduling). In particular, by enabling the UE 115-*b* to inform the network (e.g., base station 105-*b*) its capability to support a single-slot processing mode and/or a multi-slot processing mode, techniques described herein may enable the base station 105-*b* to communicate with the UE 115-*b* using single-slot scheduling and/or multi-slot scheduling depending on the characteristics of the network (e.g., quantity of data traffic, noise) as well as the capabilities of the UE 115-*b*. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115-*b* may be reduced, leading to improved battery performance and battery life.

Figure 6:
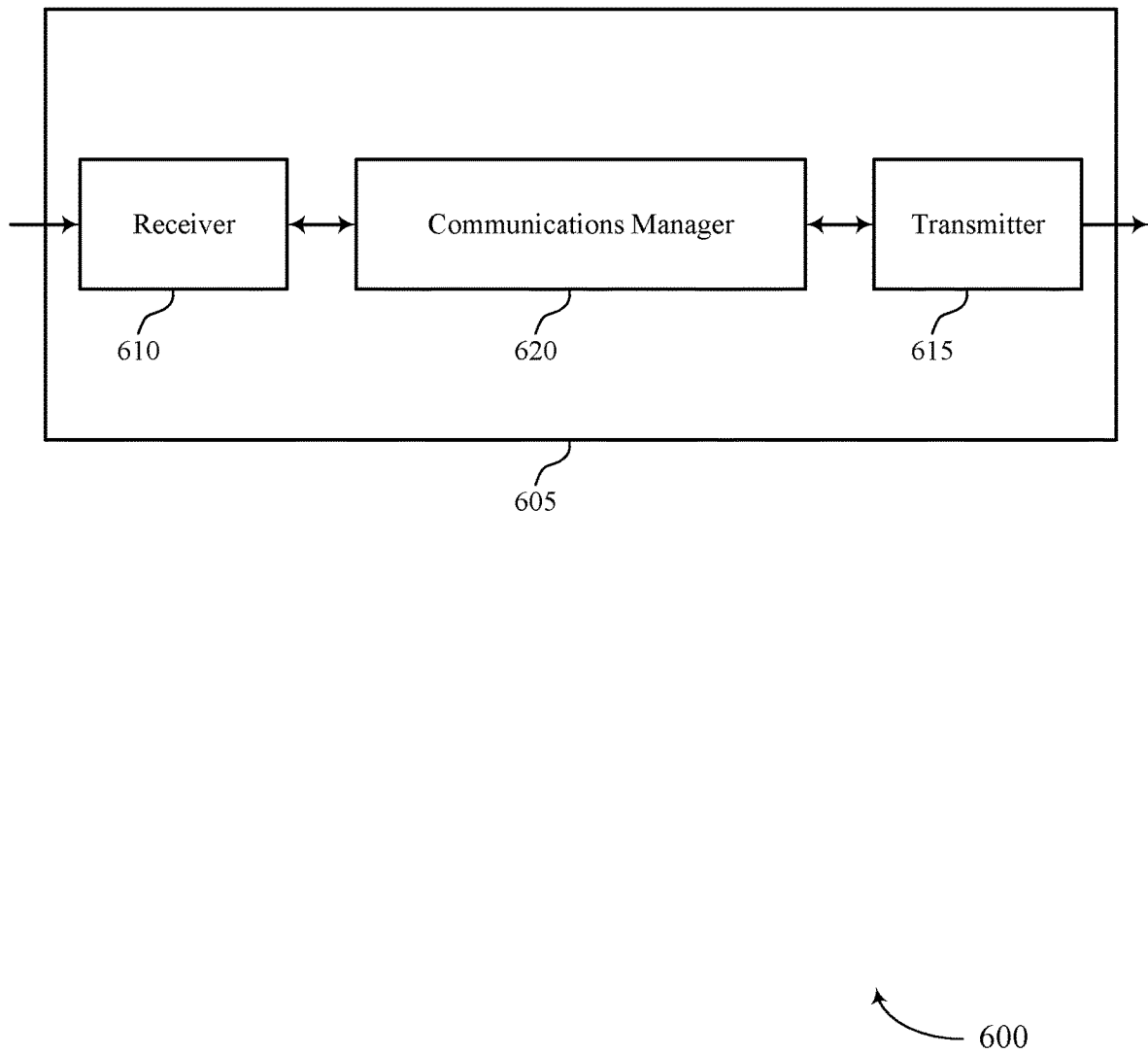
FIGS. 6 and 7 show block diagrams of devices that support techniques for adapting scheduling timelines to processing grids in accordance with aspects of the present disclosure.

FIG. 6 shows a block diagram 600 of a device 605 that supports techniques for adapting scheduling timelines to processing grids in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adapting scheduling timelines to processing grids). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adapting scheduling timelines to processing grids). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for adapting scheduling timelines to processing grids as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for transmitting, to a base station, a capability report indicating a capability of the UE to support multi-TTI scheduling. The communications manager 620 may be configured as or otherwise support a means for receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The communications manager 620 may be configured as or otherwise support a means for receiving, from the base station, an indication to apply the first processing mode or the second processing mode. The communications manager 620 may be configured as or otherwise support a means for communicating with the base station based on the indication.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved scheduling of wireless communications for both single-TTI scheduling (e.g., single-slot scheduling) and multi-TTI scheduling (e.g., multi-slot scheduling). In particular, by enabling a UE 115 to inform the network (e.g., base station 105) its capability to support a single-slot processing mode and/or a multi-slot processing mode, techniques described herein may enable the network to communicate with the UE 115 using single-slot scheduling and/or multi-slot scheduling depending on the characteristics of the network (e.g., quantity of data traffic, noise) as well as the capabilities of the UE 115. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115 may be reduced, leading to improved battery performance and battery life.

Figure 7:
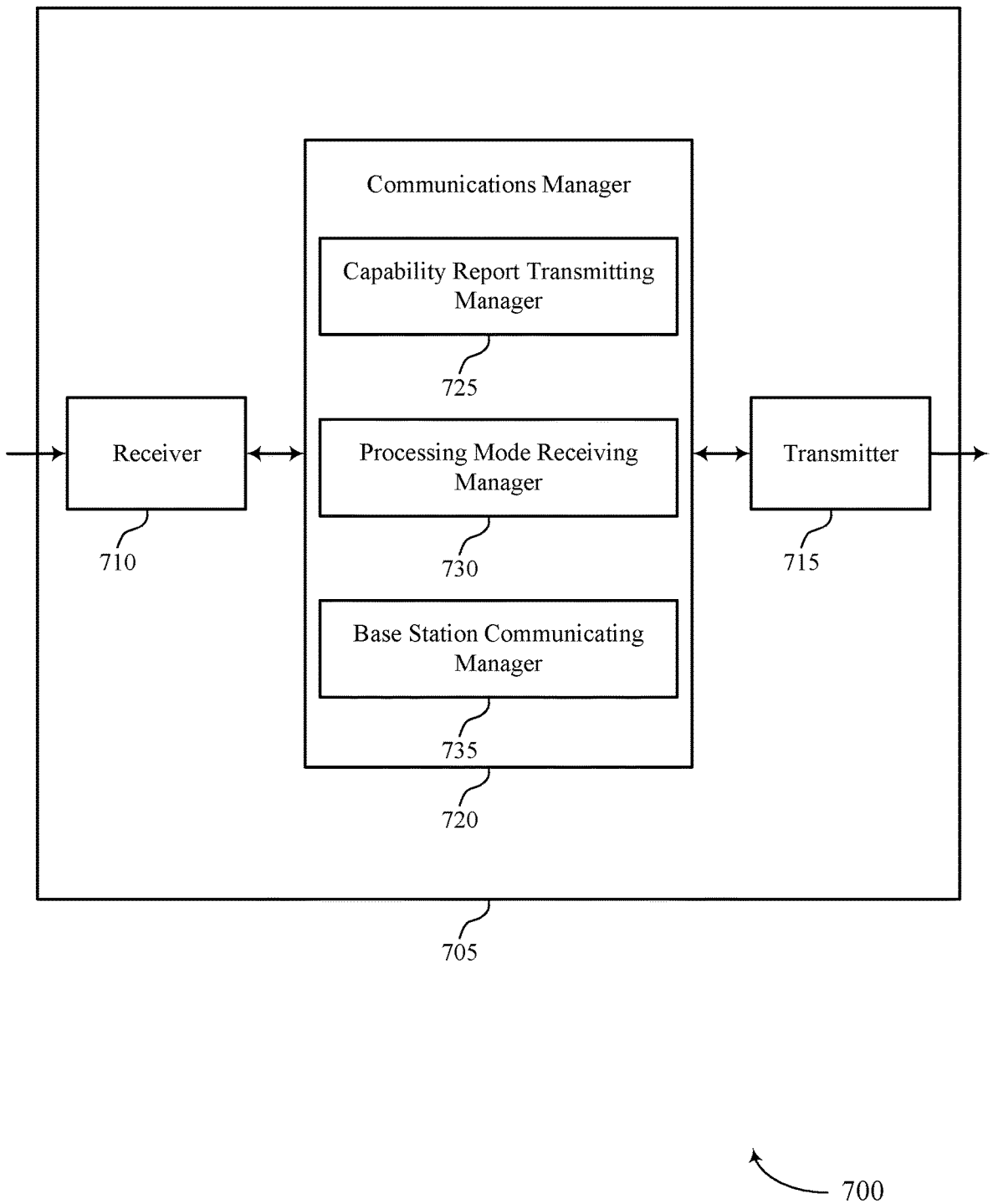

FIG. 7 shows a block diagram 700 of a device 705 that supports techniques for adapting scheduling timelines to processing grids in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for adapting scheduling timelines to processing grids). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for adapting scheduling timelines to processing grids). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for adapting scheduling timelines to processing grids as described herein. For example, the communications manager 720 may include a capability report transmitting manager 725, a processing mode receiving manager 730, a base station communicating manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The capability report transmitting manager 725 may be configured as or otherwise support a means for transmitting, to a base station, a capability report indicating a capability of the UE to support multi-TTI scheduling. The processing mode receiving manager 730 may be configured as or otherwise support a means for receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The processing mode receiving manager 730 may be configured as or otherwise support a means for receiving, from the base station, an indication to apply the first processing mode or the second processing mode. The base station communicating manager 735 may be configured as or otherwise support a means for communicating with the base station based on the indication.

Figure 8:
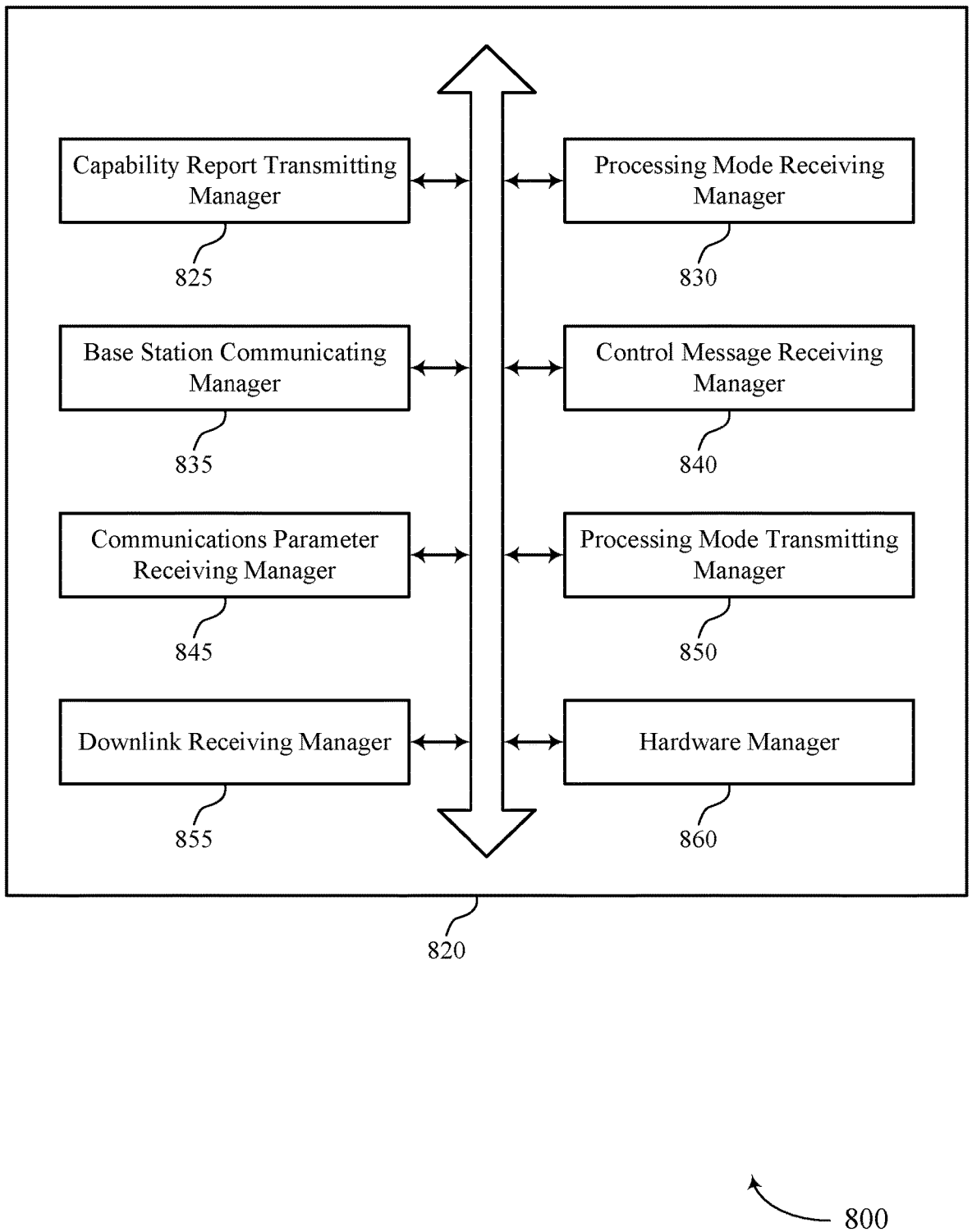
FIG. 8 shows a block diagram of a communications manager that supports techniques for adapting scheduling timelines to processing grids in accordance with aspects of the present disclosure.

FIG. 8 shows a block diagram 800 of a communications manager 820 that supports techniques for adapting scheduling timelines to processing grids in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for adapting scheduling timelines to processing grids as described herein. For example, the communications manager 820 may include a capability report transmitting manager 825, a processing mode receiving manager 830, a base station communicating manager 835, a control message receiving manager 840, a communications parameter receiving manager 845, a processing mode transmitting manager 850, a downlink receiving manager 855, a hardware manager 860, or any combination thereof. Each of these components may communicate, directly or indirectly, with one another (e.g., via one or more buses).

The communications manager 820 may support wireless communications at a UE in accordance with examples as disclosed herein. The capability report transmitting manager 825 may be configured as or otherwise support a means for transmitting, to a base station, a capability report indicating a capability of the UE to support multi-TTI scheduling. The processing mode receiving manager 830 may be configured as or otherwise support a means for receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. In some examples, the processing mode receiving manager 830 may be configured as or otherwise support a means for receiving, from the base station, an indication to apply the first processing mode or the second processing mode. The base station communicating manager 835 may be configured as or otherwise support a means for communicating with the base station based on the indication.

In some examples, the capability report transmitting manager 825 may be configured as or otherwise support a means for transmitting, to the base station via the capability report, an indication of a processing capability of the UE associated with one or more subcarrier spacings, where receiving the first configuration, the second configuration, or both, is based on the indication of the processing capability.

In some examples, to support receiving the second configuration, the communications parameter receiving manager 845 may be configured as or otherwise support a means for receiving, from the base station based on the indication of the processing capability, an indication of a subcarrier spacing, a TTI length, or both, where communicating with the base station is based on the subcarrier spacing, the TTI length, or both.

In some examples, the capability report transmitting manager 825 may be configured as or otherwise support a means for transmitting, to the base station via the capability report, an indication of a quantity of CCEs and/or control channel candidates (e.g., PDCCH candidates) for blind decoding within the scheduling interval, where the second configuration configures the UE to monitor a first number of CCEs and/or control channel candidates in the scheduling interval based on the indication of the quantity of CCEs and/or control channel candidates for blind decoding.

In some examples, the capability report transmitting manager 825 may be configured as or otherwise support a means for transmitting, to the base station via the capability report, an indication of a quantity of control channel monitoring occasions within the scheduling interval, where the second configuration configures the UE to monitor a first quantity of control channel monitoring occasions in the scheduling interval based on the indication of the quantity of control channel monitoring occasions within the scheduling interval.

In some examples, the capability report transmitting manager 825 may be configured as or otherwise support a means for transmitting, to the base station via the capability report, an indication of a search space set periodicity associated with the scheduling interval, where the second configuration configures the UE to monitor a first search space set periodicity corresponding to the scheduling interval based on the indication of the search space set periodicity associated with the scheduling interval.

In some examples, the capability report transmitting manager 825 may be configured as or otherwise support a means for transmitting, to the base station via the capability report, an indication of a time interval between a first time in which the UE receives a grant and a second time in which the UE is capable of acting in accordance with the grant, where communicating with the base station is based on the indication of the time interval.

In some examples, the downlink receiving manager 855 may be configured as or otherwise support a means for receiving, from the base station based on the indication of the time interval, a physical downlink control channel message during a first TTI of the set of multiple TTIs of the scheduling interval that schedules an uplink transmission, a downlink transmission, or both, within one or more TTIs of the set of multiple TTIs of the scheduling interval.

In some examples, the capability report transmitting manager 825 may be configured as or otherwise support a means for transmitting, to the base station via the capability report, an indication of a capability to perform beam switching at the UE between adjacent scheduling intervals, where the UE communicates with the base station using a first beam during a first scheduling interval and a second beam during a second scheduling interval based on the indication of the capability to perform beam switching.

In some examples, to support communicating with the base station, the base station communicating manager 835 may be configured as or otherwise support a means for communicating with the base station using a first set of hardware characteristics during a first scheduling interval. In some examples, to support communicating with the base station, the base station communicating manager 835 may be configured as or otherwise support a means for communicating with the base station using a second set of hardware characteristics during a second scheduling interval, the second set of hardware characteristics different from the first set of hardware characteristics.

In some examples, the hardware manager 860 may be configured as or otherwise support a means for modifying one or more hardware characteristics of the first set of hardware characteristics at a boundary of the first scheduling interval and the second scheduling interval, where communicating with the base station using the second set of hardware characteristics during the second scheduling interval is based on the modifying.

In some examples, the first set of hardware characteristics, the second set of hardware characteristics, or both, includes a first characteristic associated with an antenna array of the UE, a second characteristic associated with a baseband component of the UE, a third characteristic associated with a BWP at the UE, a fourth characteristic associated with a transmission timing parameter at the UE, a sixth characteristic associated with a reception timing parameter at the UE, or any combination thereof.

In some examples, the first set of hardware characteristics, the second set of hardware characteristics, or both, includes a first characteristic associated with a transmission power metric for transmission performed by the UE, a second characteristic associated with a DRX cycle of the UE, a third characteristic associated with MAC-CE application timing, or any combination thereof.

In some examples, to support receiving the second configuration, the control message receiving manager 840 may be configured as or otherwise support a means for receiving, from the base station based on the capability report, a control message that includes an indication of a quantity of TTIs associated with the scheduling interval, where communicating with the base station using the second processing mode is based on the indicated quantity of TTIs.

In some examples, receiving, from the base station, one or more configuration parameter values that are different for the first processing mode and the second processing mode, the one or more configuration parameter values that are different including a search space set periodicity, a TDRA table, a PUCCH resource, or a combination thereof.

In some examples, at least one of the one or more configuration parameter values are shared between the first processing mode and the second processing mode.

In some examples, the base station communicating manager 835 may be configured as or otherwise support a means for determining one or more configuration parameter values for the second processing mode based on a quantity of TTIs of the set of multiple TTIs associated with the scheduling interval.

In some examples, the processing mode transmitting manager 850 may be configured as or otherwise support a means for transmitting, to the base station, a second indication to transition from the indicated processing mode to a different processing mode. In some examples, the base station communicating manager 835 may be configured as or otherwise support a means for communicating with the base station based on the second indication.

In some examples, a TTI includes a slot, a subframe, a symbol group, or any combination thereof.

Figure 9:
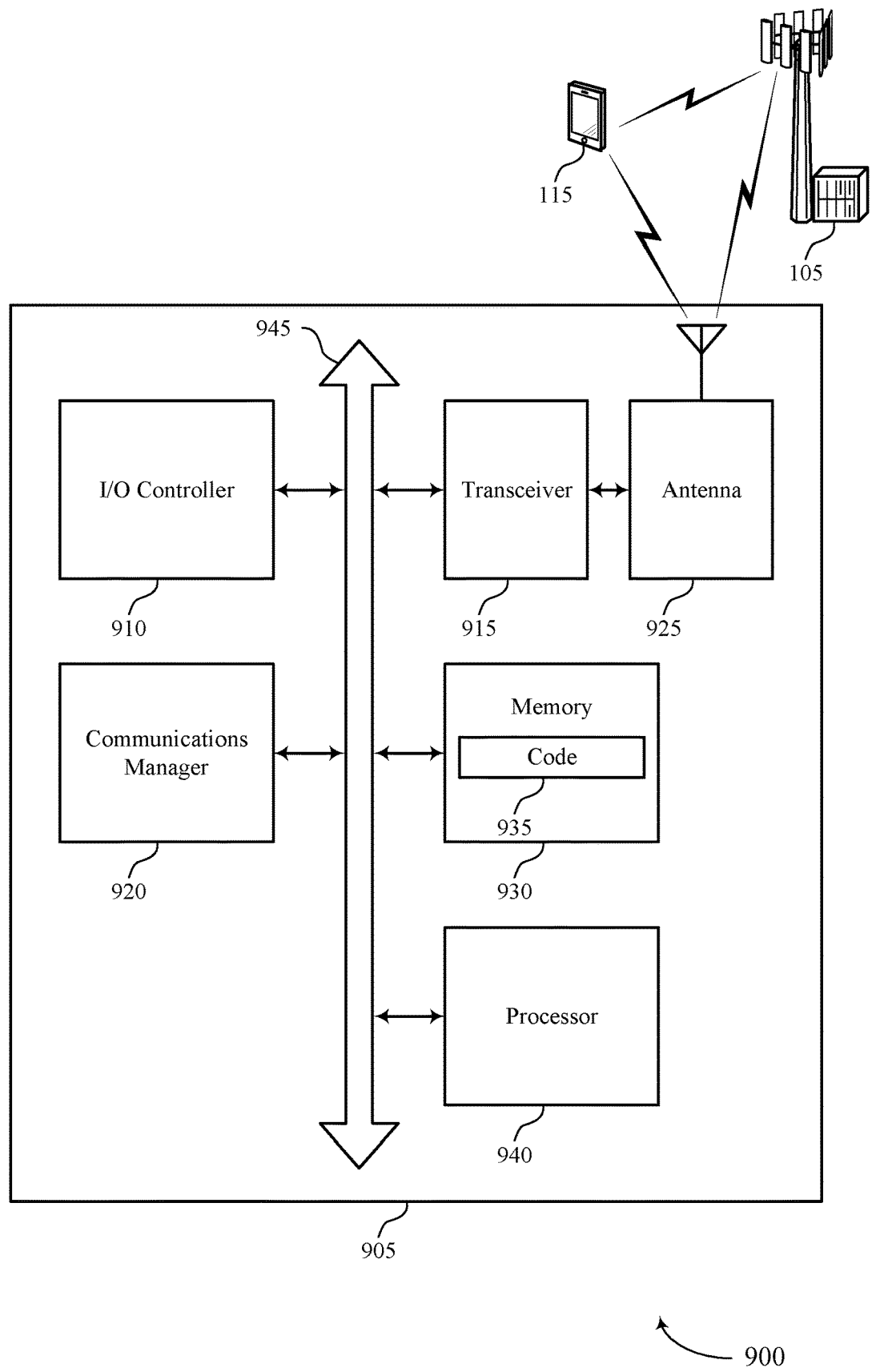
FIG. 9 shows a diagram of a system including a device that supports techniques for adapting scheduling timelines to processing grids in accordance with aspects of the present disclosure.

FIG. 9 shows a diagram of a system 900 including a device 905 that supports techniques for adapting scheduling timelines to processing grids in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for adapting scheduling timelines to processing grids). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting, to a base station, a capability report indicating a capability of the UE to support multi-TTI scheduling. The communications manager 920 may be configured as or otherwise support a means for receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The communications manager 920 may be configured as or otherwise support a means for receiving, from the base station, an indication to apply the first processing mode or the second processing mode. The communications manager 920 may be configured as or otherwise support a means for communicating with the base station based on the indication.

By including or configuring the communications manager 920 in accordance with examples as described herein, the device 905 may support techniques for improved scheduling of wireless communications for both single-TTI scheduling (e.g., single-slot scheduling) and multi-TTI scheduling (e.g., multi-slot scheduling). In particular, by enabling a UE 115 to inform the network (e.g., base station 105) its capability to support a single-slot processing mode and/or a multi-slot processing mode, techniques described herein may enable the network to communicate with the UE 115 using single-slot scheduling and/or multi-slot scheduling depending on the characteristics of the network (e.g., quantity of data traffic, noise) as well as the capabilities of the UE 115. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115 may be reduced, leading to improved battery performance and battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for adapting scheduling timelines to processing grids as described herein, or the processor 940 and the memory 930 may be otherwise configured to perform or support such operations.

Figure 10:
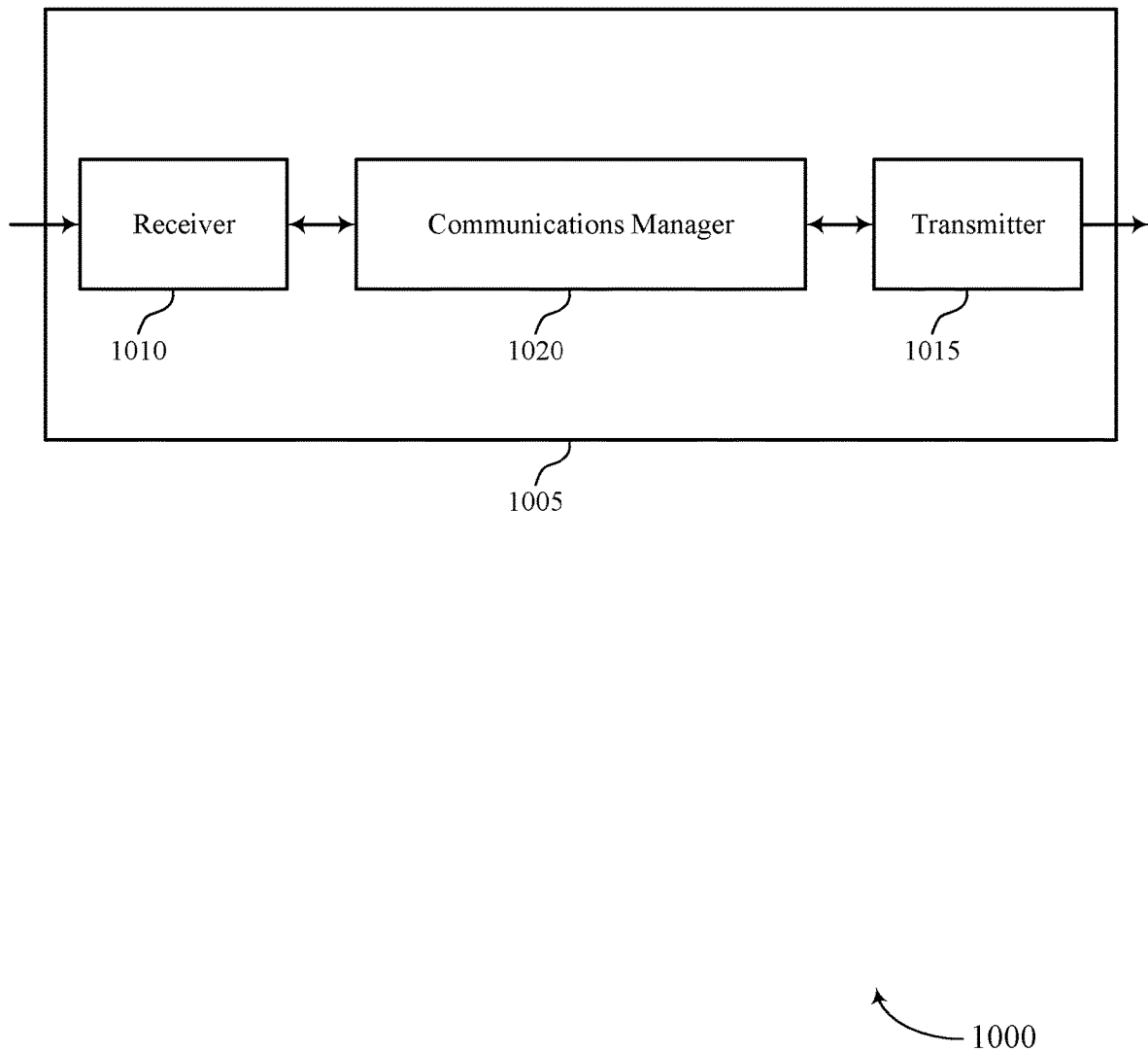
FIGS. 10 and 11 show block diagrams of devices that support techniques for adapting scheduling timelines to processing grids in accordance with aspects of the present disclosure.

FIG. 10 shows a block diagram 1000 of a device 1005 that supports techniques for adapting scheduling timelines to processing grids in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for adapting scheduling timelines to processing grids). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for adapting scheduling timelines to processing grids). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for adapting scheduling timelines to processing grids as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving, from a UE, a capability report indicating a capability of the UE to support multi-TTI scheduling. The communications manager 1020 may be configured as or otherwise support a means for transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The communications manager 1020 may be configured as or otherwise support a means for transmitting, to the UE, an indication to apply the first processing mode or the second processing mode. The communications manager 1020 may be configured as or otherwise support a means for communicating with the UE based on the indication.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improved scheduling of wireless communications for both single-TTI scheduling (e.g., single-slot scheduling) and multi-TTI scheduling (e.g., multi-slot scheduling). In particular, by enabling a UE 115 to inform the network (e.g., base station 105) its capability to support a single-slot processing mode and/or a multi-slot processing mode, techniques described herein may enable the network to communicate with the UE 115 using single-slot scheduling and/or multi-slot scheduling depending on the characteristics of the network (e.g., quantity of data traffic, noise) as well as the capabilities of the UE 115. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115 may be reduced, leading to improved battery performance and battery life.

Figure 11:
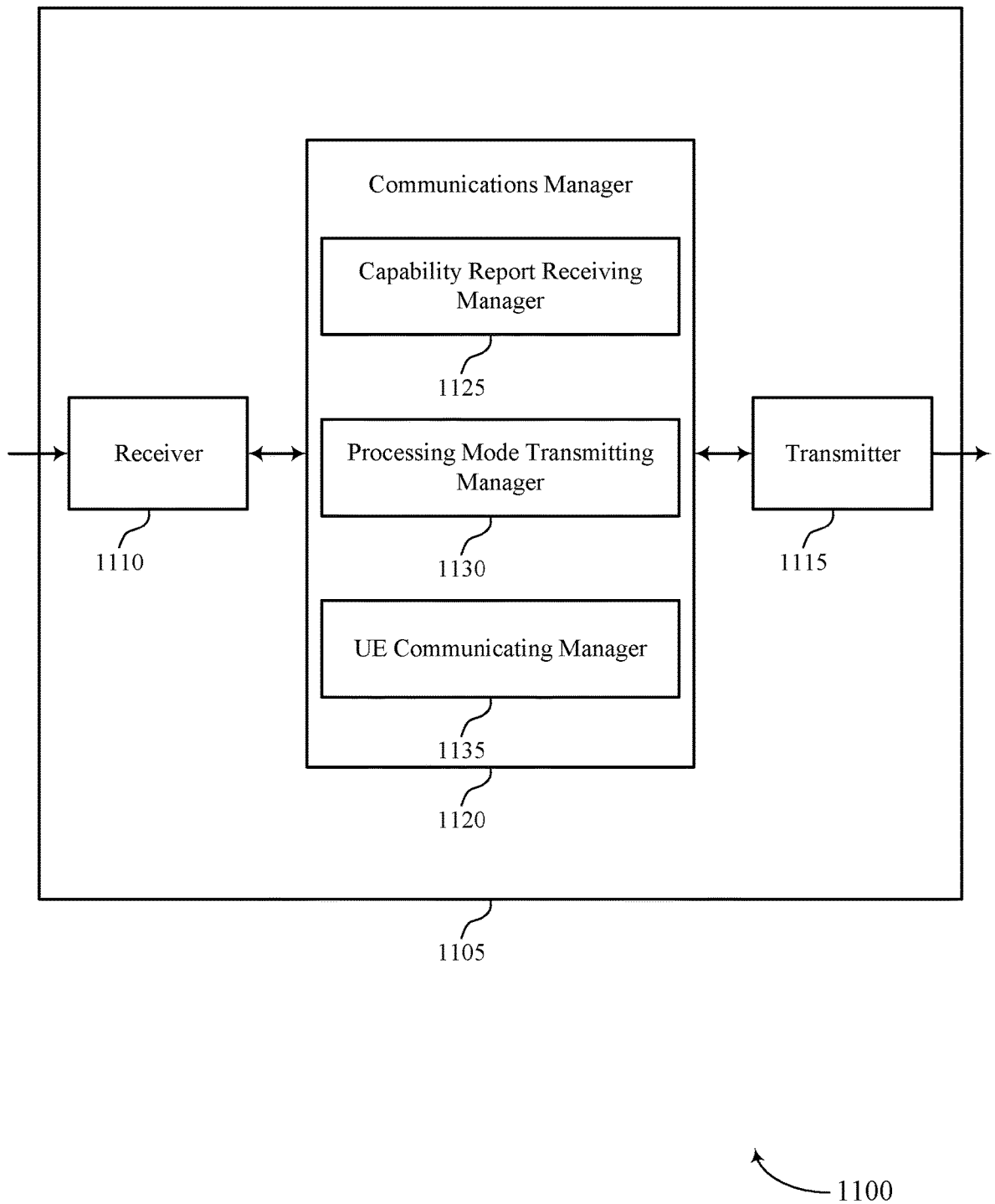

FIG. 11 shows a block diagram 1100 of a device 1105 that supports techniques for adapting scheduling timelines to processing grids in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for adapting scheduling timelines to processing grids). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for adapting scheduling timelines to processing grids). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for adapting scheduling timelines to processing grids as described herein. For example, the communications manager 1120 may include a capability report receiving manager 1125, a processing mode transmitting manager 1130, a UE communicating manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The capability report receiving manager 1125 may be configured as or otherwise support a means for receiving, from a UE, a capability report indicating a capability of the UE to support multi-TTI scheduling. The processing mode transmitting manager 1130 may be configured as or otherwise support a means for transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The processing mode transmitting manager 1130 may be configured as or otherwise support a means for transmitting, to the UE, an indication to apply the first processing mode or the second processing mode. The UE communicating manager 1135 may be configured as or otherwise support a means for communicating with the UE based on the indication.

Figure 12:
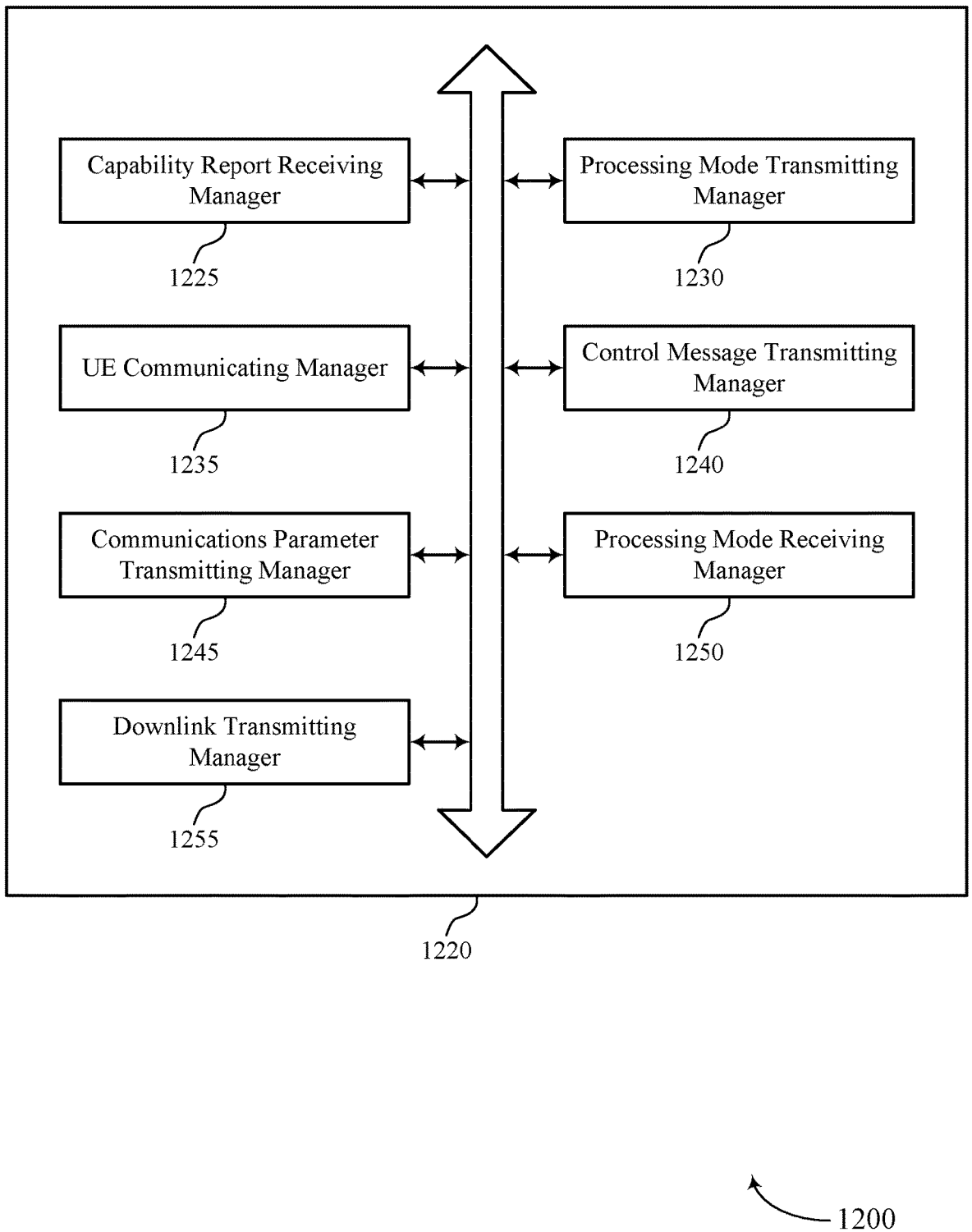
FIG. 12 shows a block diagram of a communications manager that supports techniques for adapting scheduling timelines to processing grids in accordance with aspects of the present disclosure.

FIG. 12 shows a block diagram 1200 of a communications manager 1220 that supports techniques for adapting scheduling timelines to processing grids in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for adapting scheduling timelines to processing grids as described herein. For example, the communications manager 1220 may include a capability report receiving manager 1225, a processing mode transmitting manager 1230, a UE communicating manager 1235, a control message transmitting manager 1240, a communications parameter transmitting manager 1245, a processing mode receiving manager 1250, a downlink transmitting manager 1255, or any combination thereof. Each of these components may communicate, directly or indirectly, with one another (e.g., via one or more buses).

The communications manager 1220 may support wireless communications at a base station in accordance with examples as disclosed herein. The capability report receiving manager 1225 may be configured as or otherwise support a means for receiving, from a UE, a capability report indicating a capability of the UE to support multi-TTI scheduling. The processing mode transmitting manager 1230 may be configured as or otherwise support a means for transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. In some examples, the processing mode transmitting manager 1230 may be configured as or otherwise support a means for transmitting, to the UE, an indication to apply the first processing mode or the second processing mode. The UE communicating manager 1235 may be configured as or otherwise support a means for communicating with the UE based on the indication.

In some examples, the capability report receiving manager 1225 may be configured as or otherwise support a means for receiving, from the UE via the capability report, an indication of a processing capability of the UE associated with one or more subcarrier spacings, where transmitting the first configuration, the second configuration, or both, is based on the indication of the processing capability.

In some examples, to support transmitting the second configuration, the communications parameter transmitting manager 1245 may be configured as or otherwise support a means for transmitting, to the UE based on the indication of the processing capability, an indication of a subcarrier spacing, a TTI length, or both, where communicating with the UE is based on the subcarrier spacing, the TTI length, or both.

In some examples, the capability report receiving manager 1225 may be configured as or otherwise support a means for receiving, from the UE via the capability report, an indication of a quantity of CCEs and/or control channel candidates (e.g., PDCCH candidates) for blind decoding within the scheduling interval, where the second configuration configures the UE to monitor a first quantity of CCEs and/or control channel candidates in the scheduling interval based on the indication of the quantity of CCEs and/or control channel candidates for blind decoding.

In some examples, the capability report receiving manager 1225 may be configured as or otherwise support a means for receiving, from the UE via the capability report, an indication of a quantity of control channel monitoring occasions within the scheduling interval, where the second configuration configures the UE to monitor a first quantity of control channel monitoring occasions in the scheduling interval based on the indication of the quantity of control channel monitoring occasions within the scheduling interval.

In some examples, the capability report receiving manager 1225 may be configured as or otherwise support a means for receiving, from the UE via the capability report, an indication of a search space set periodicity associated with the scheduling interval, where the second configuration configures the UE to monitor a first search space set periodicity corresponding to the scheduling interval based on the indication of the search space set periodicity associated with the scheduling interval.

In some examples, the capability report receiving manager 1225 may be configured as or otherwise support a means for receiving, from the UE via the capability report, an indication of a time interval between a first time in which the UE receives a grant and a second time in which the UE is capable of acting in accordance with the grant, where communicating with the UE is based on the indication of the time interval.

In some examples, the downlink transmitting manager 1255 may be configured as or otherwise support a means for transmitting, to the UE based on the indication of the time interval, a physical downlink control channel message during a first TTI of the set of multiple TTIs of the scheduling interval that schedules an uplink transmission, a downlink transmission, or both, within one or more TTIs of the set of multiple TTIs of the scheduling interval.

In some examples, the capability report receiving manager 1225 may be configured as or otherwise support a means for receiving, from the UE via the capability report, an indication of a capability to perform beam switching at the UE between adjacent scheduling intervals, where the UE communicates with the base station using a first beam during a first scheduling interval and a second beam during a second scheduling interval based on the indication of the capability to perform beam switching.

In some examples, to support communicating with the UE, the UE communicating manager 1235 may be configured as or otherwise support a means for communicating with the UE using a first set of hardware characteristics of the UE during a first scheduling interval. In some examples, to support communicating with the UE, the UE communicating manager 1235 may be configured as or otherwise support a means for communicating with the UE using a second set of hardware characteristics of the UE during a second scheduling interval, the second set of hardware characteristics different from the first set of hardware characteristics.

In some examples, the first set of hardware characteristics, the second set of hardware characteristics, or both, includes a first characteristic associated with an antenna array of the UE, a second characteristic associated with a baseband component of the UE, a third characteristic associated with a BWP at the UE, a fourth characteristic associated with a transmission timing parameter at the UE, a sixth characteristic associated with a reception timing parameter at the UE, or any combination thereof.

In some examples, the first set of hardware characteristics, the second set of hardware characteristics, or both, includes a first characteristic associated with a transmission power metric for transmission performed by the UE, a second characteristic associated with a DRX cycle of the UE, a third characteristic associated with MAC-CE application timing, or any combination thereof.

In some examples, to support transmitting the second configuration, the control message transmitting manager 1240 may be configured as or otherwise support a means for transmitting, to the UE based on the capability report, a control message that includes an indication of a quantity of TTIs associated with the scheduling interval, where communicating with the UE using the second processing mode is based on the indicated quantity of TTIs.

In some examples, transmitting, to the UE, one or more configuration parameter values that are different for the first processing mode and the second processing mode, the one or more configuration parameter values that are different including a search space set periodicity, a TDRA table, a PUCCH resource, or a combination thereof.

In some examples, at least one of the one or more configuration parameter values are shared between the first processing mode and the second processing mode.

In some examples, the UE communicating manager 1235 may be configured as or otherwise support a means for determining one or more configuration parameter values for the second processing mode based on a quantity of TTIs of the set of multiple TTIs associated with the scheduling interval.

In some examples, the processing mode receiving manager 1250 may be configured as or otherwise support a means for receiving, from the UE, a second indication to transition from the indicated processing mode to a different processing mode. In some examples, the UE communicating manager 1235 may be configured as or otherwise support a means for communicating with the UE based on the second indication. In some examples, a TTI includes a slot, a subframe, a symbol group, or any combination thereof.

Figure 13:
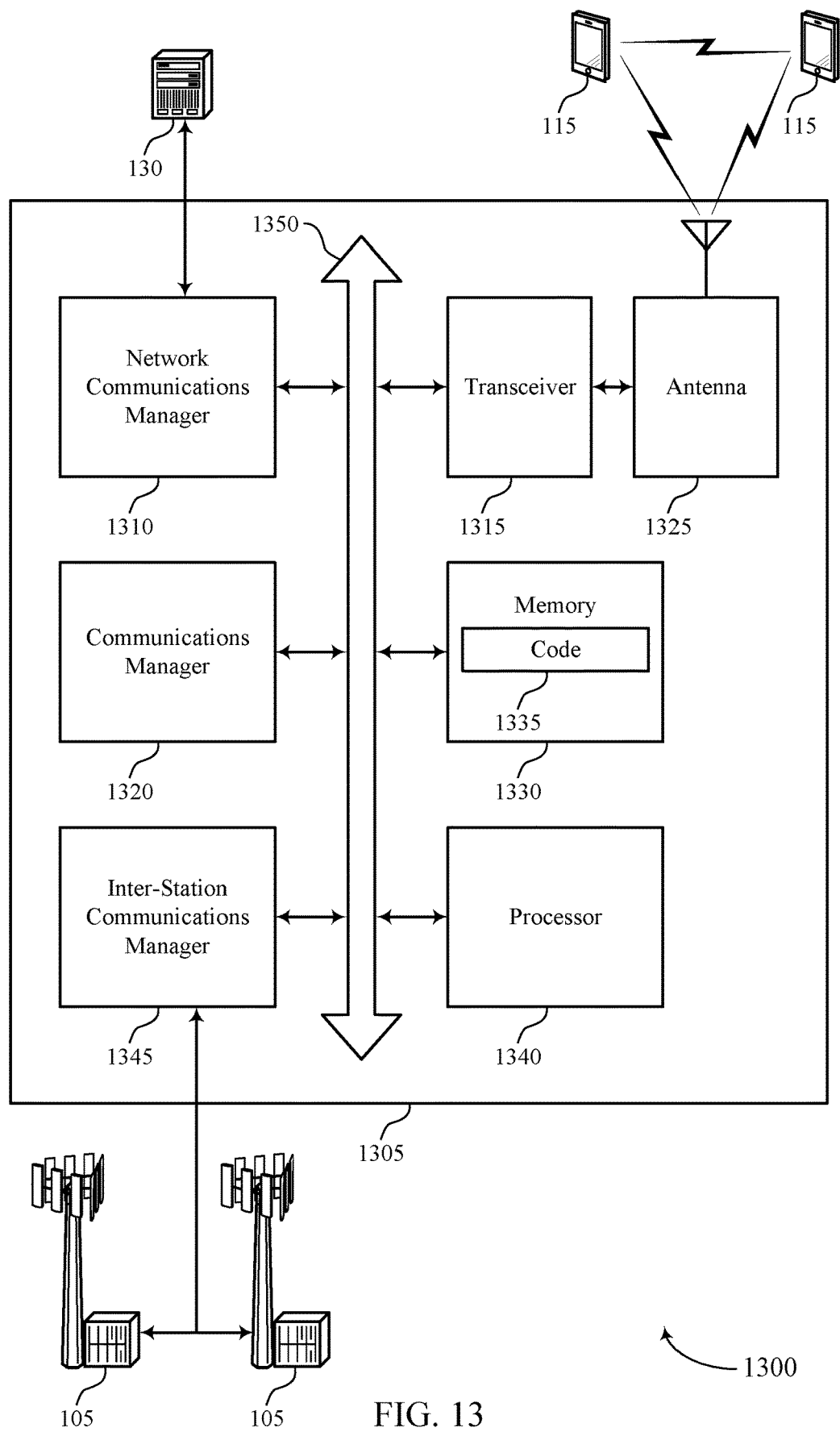
FIG. 13 shows a diagram of a system including a device that supports techniques for adapting scheduling timelines to processing grids in accordance with aspects of the present disclosure.

FIG. 13 shows a diagram of a system 1300 including a device 1305 that supports techniques for adapting scheduling timelines to processing grids in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for adapting scheduling timelines to processing grids). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving, from a UE, a capability report indicating a capability of the UE to support multi-TTI scheduling. The communications manager 1320 may be configured as or otherwise support a means for transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The communications manager 1320 may be configured as or otherwise support a means for transmitting, to the UE, an indication to apply the first processing mode or the second processing mode. The communications manager 1320 may be configured as or otherwise support a means for communicating with the UE based on the indication.

By including or configuring the communications manager 1320 in accordance with examples as described herein, the device 1305 may support techniques for improved scheduling of wireless communications for both single-TTI scheduling (e.g., single-slot scheduling) and multi-TTI scheduling (e.g., multi-slot scheduling). In particular, by enabling a UE 115 to inform the network (e.g., base station 105) its capability to support a single-slot processing mode and/or a multi-slot processing mode, techniques described herein may enable the network to communicate with the UE 115 using single-slot scheduling and/or multi-slot scheduling depending on the characteristics of the network (e.g., quantity of data traffic, noise) as well as the capabilities of the UE 115. Thus, techniques described herein may enable more widespread use of multi-slot scheduling within a wireless communications system thereby alleviating processing limitations at the UE 115 and allowing for higher-frequency wireless communications (e.g., FR3, FR4). Moreover, by enabling more widespread use of multi-slot scheduling, power consumption at the UE 115 may be reduced, leading to improved battery performance and battery life.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for adapting scheduling timelines to processing grids as described herein, or the processor 1340 and the memory 1330 may be otherwise configured to perform or support such operations.

Figure 14:
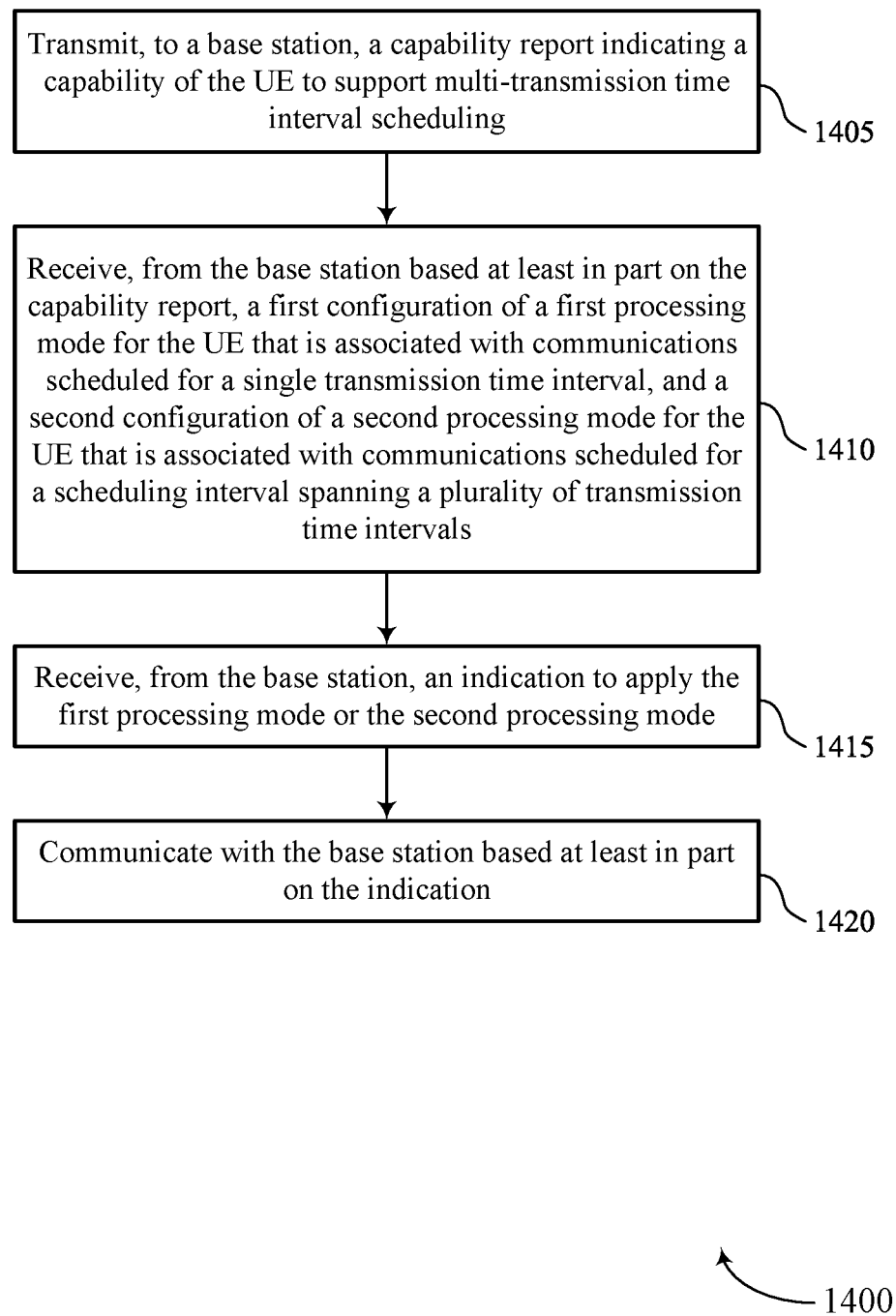
FIGS. 14 through 17 show flowcharts illustrating methods that support techniques for adapting scheduling timelines to processing grids in accordance with aspects of the present disclosure.

FIG. 14 shows a flowchart illustrating a method 1400 that supports techniques for adapting scheduling timelines to processing grids in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a capability report indicating a capability of the UE to support multi-TTI scheduling. The operations of 1405 may be performed in accordance with examples as disclosed herein. In some examples, aspects of the operations of 1405 may be performed by a capability report transmitting manager 825 as described with reference to FIG. 8.

At 1410, the method may include receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The operations of 1410 may be performed in accordance with examples as disclosed herein. In some examples, aspects of the operations of 1410 may be performed by a processing mode receiving manager 830 as described with reference to FIG. 8.

At 1415, the method may include receiving, from the base station, an indication to apply the first processing mode or the second processing mode. The operations of 1415 may be performed in accordance with examples as disclosed herein. In some examples, aspects of the operations of 1415 may be performed by a processing mode receiving manager 830 as described with reference to FIG. 8.

At 1420, the method may include communicating with the base station based on the indication. The operations of 1420 may be performed in accordance with examples as disclosed herein. In some examples, aspects of the operations of 1420 may be performed by a base station communicating manager 835 as described with reference to FIG. 8.

Figure 15:
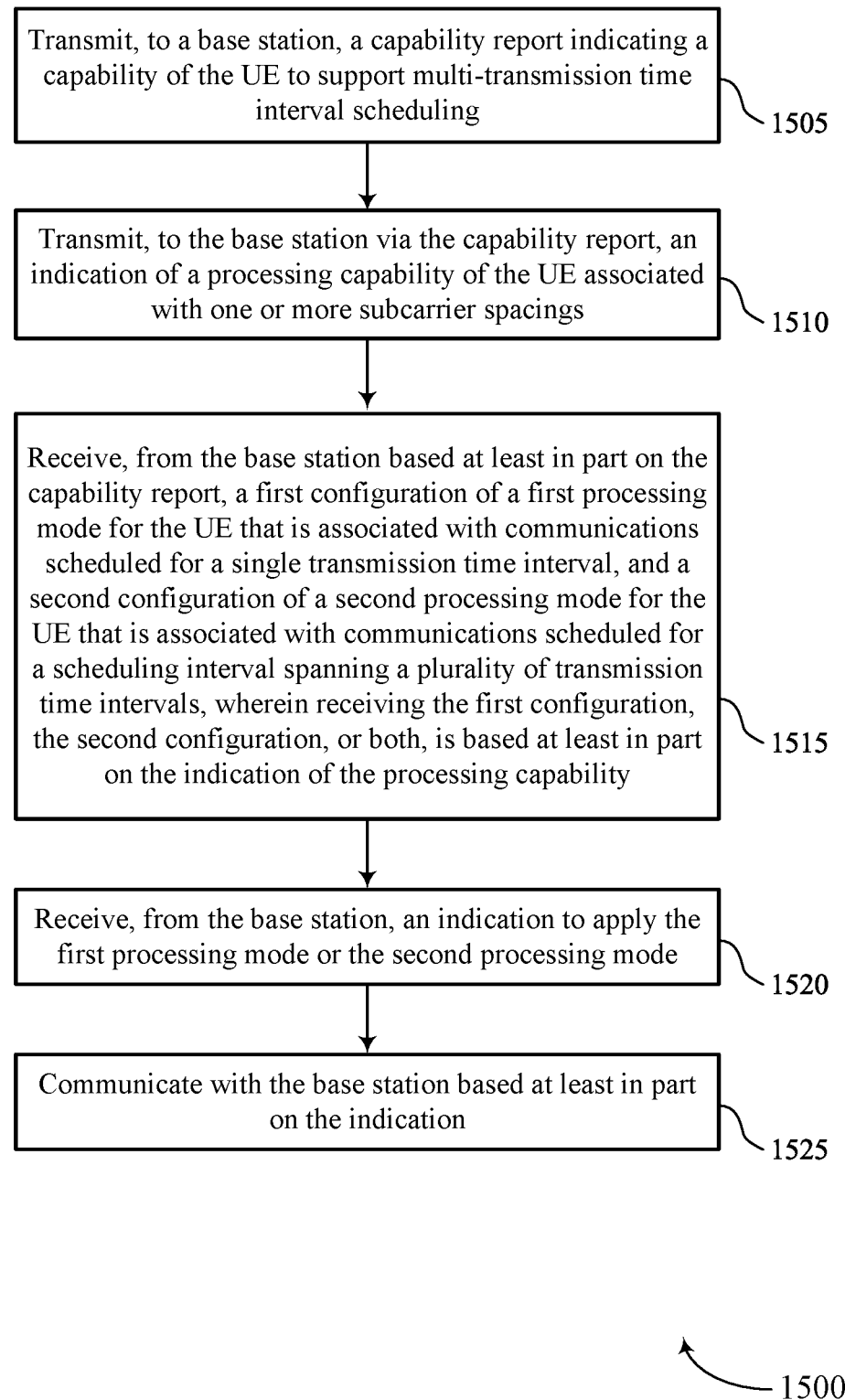

FIG. 15 shows a flowchart illustrating a method 1500 that supports techniques for adapting scheduling timelines to processing grids in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a capability report indicating a capability of the UE to support multi-TTI scheduling. The operations of 1505 may be performed in accordance with examples as disclosed herein. In some examples, aspects of the operations of 1505 may be performed by a capability report transmitting manager 825 as described with reference to FIG. 8.

At 1510, the method may include transmitting, to the base station via the capability report, an indication of a processing capability of the UE associated with one or more subcarrier spacings. The operations of 1510 may be performed in accordance with examples as disclosed herein. In some examples, aspects of the operations of 1510 may be performed by a capability report transmitting manager 825 as described with reference to FIG. 8.

At 1515, the method may include receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, where receiving the first configuration, the second configuration, or both, is based on the indication of the processing capability. The operations of 1515 may be performed in accordance with examples as disclosed herein. In some examples, aspects of the operations of 1515 may be performed by a processing mode receiving manager 830 as described with reference to FIG. 8.

At 1520, the method may include receiving, from the base station, an indication to apply the first processing mode or the second processing mode. The operations of 1520 may be performed in accordance with examples as disclosed herein. In some examples, aspects of the operations of 1520 may be performed by a processing mode receiving manager 830 as described with reference to FIG. 8.

At 1525, the method may include communicating with the base station based on the indication. The operations of 1525 may be performed in accordance with examples as disclosed herein. In some examples, aspects of the operations of 1525 may be performed by a base station communicating manager 835 as described with reference to FIG. 8.

Figure 16:
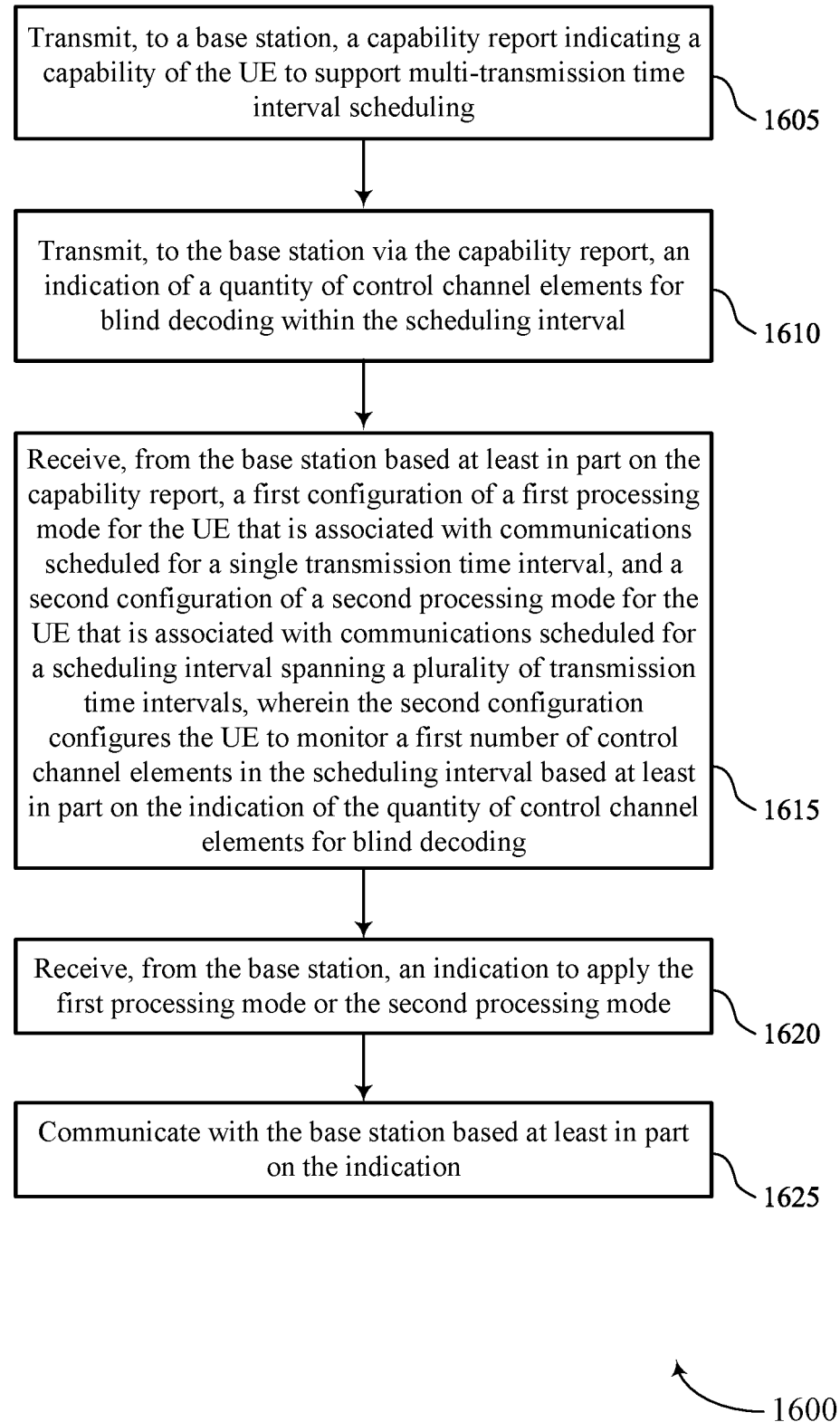

FIG. 16 shows a flowchart illustrating a method 1600 that supports techniques for adapting scheduling timelines to processing grids in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a capability report indicating a capability of the UE to support multi-TTI scheduling. The operations of 1605 may be performed in accordance with examples as disclosed herein. In some examples, aspects of the operations of 1605 may be performed by a capability report transmitting manager 825 as described with reference to FIG. 8.

At 1610, the method may include transmitting, to the base station via the capability report, an indication of a quantity of CCEs for blind decoding within the scheduling interval. The operations of 1610 may be performed in accordance with examples as disclosed herein. In some examples, aspects of the operations of 1610 may be performed by a capability report transmitting manager 825 as described with reference to FIG. 8.

At 1615, the method may include receiving, from the base station based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs, where the second configuration configures the UE to monitor a first quantity of CCEs in the scheduling interval based on the indication of the quantity of CCEs for blind decoding. The operations of 1615 may be performed in accordance with examples as disclosed herein. In some examples, aspects of the operations of 1615 may be performed by a processing mode receiving manager 830 as described with reference to FIG. 8.

At 1620, the method may include receiving, from the base station, an indication to apply the first processing mode or the second processing mode. The operations of 1620 may be performed in accordance with examples as disclosed herein. In some examples, aspects of the operations of 1620 may be performed by a processing mode receiving manager 830 as described with reference to FIG. 8.

At 1625, the method may include communicating with the base station based on the indication. The operations of 1625 may be performed in accordance with examples as disclosed herein. In some examples, aspects of the operations of 1625 may be performed by a base station communicating manager 835 as described with reference to FIG. 8.

Figure 17:
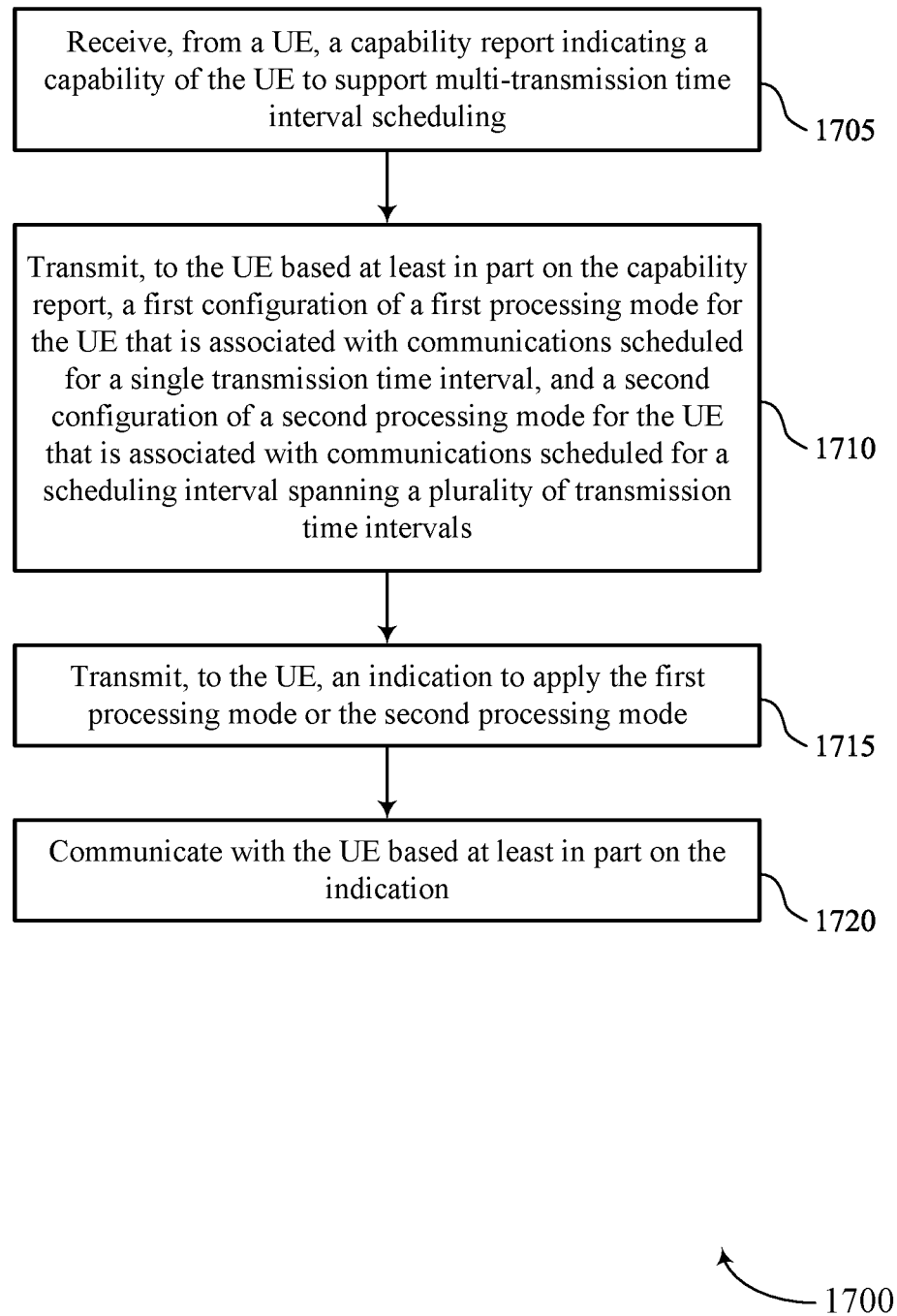

FIG. 17 shows a flowchart illustrating a method 1700 that supports techniques for adapting scheduling timelines to processing grids in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a capability report indicating a capability of the UE to support multi-TTI scheduling. The operations of 1705 may be performed in accordance with examples as disclosed herein. In some examples, aspects of the operations of 1705 may be performed by a capability report receiving manager 1225 as described with reference to FIG. 12.

At 1710, the method may include transmitting, to the UE based on the capability report, a first configuration of a first processing mode for the UE that is associated with communications scheduled for a single TTI, and a second configuration of a second processing mode for the UE that is associated with communications scheduled for a scheduling interval spanning a set of multiple TTIs. The operations of 1710 may be performed in accordance with examples as disclosed herein. In some examples, aspects of the operations of 1710 may be performed by a processing mode transmitting manager 1230 as described with reference to FIG. 12.

At 1715, the method may include transmitting, to the UE, an indication to apply the first processing mode or the second processing mode. The operations of 1715 may be performed in accordance with examples as disclosed herein. In some examples, aspects of the operations of 1715 may be performed by a processing mode transmitting manager 1230 as described with reference to FIG. 12.

At 1720, the method may include communicating with the UE based on the indication. The operations of 1720 may be performed in accordance with examples as disclosed herein. In some examples, aspects of the operations of 1720 may be performed by a UE communicating manager 1235 as described with reference to FIG. 12.

The following provides an overview of aspects of the present disclosure:

Aspect 1: A method for wireless communications at a UE, comprising: transmitting, to a base station, a capability report indicating a capability of the UE to support multi-TTI scheduling; receiving, from the base station based at least in part on the capability report, a first configuration of a first processing mode for the UE that is associated with communications scheduled for a single TTI, and a second configuration of a second processing mode for the UE that is associated with communications scheduled for a scheduling interval spanning a plurality of TTIs; receiving, from the base station, an indication to apply the first processing mode or the second processing mode; and communicating with the base station based at least in part on the indication.

Aspect 2: The method of aspect 1, further comprising: transmitting, to the base station via the capability report, an indication of a processing capability of the UE associated with one or more SCSs, wherein receiving the first configuration, the second configuration, or both, is based at least in part on the indication of the processing capability.

Aspect 3: The method of aspect 2, wherein receiving the second configuration comprises: receiving, from the base station based at least in part on the indication of the processing capability, an indication of a SCS, a TTI length, or both, wherein communicating with the base station is based at least in part on the SCS, the TTI length, or both.

Aspect 4: The method of any of aspects 1 through 3, further comprising: transmitting, to the base station via the capability report, an indication of a quantity of CCEs for blind decoding within the scheduling interval, a quantity of control channel candidates for blind decoding within the scheduling interval, or both, wherein the second configuration configures the UE to monitor a first quantity of CCEs in the scheduling interval, a first quantity of control channel candidates in the scheduling interval, or both, based at least in part on the indication of the quantity of CCEs for blind decoding, the quantity of control channel candidates for blind decoding, or both.

Aspect 5: The method of any of aspects 1 through 4, further comprising: transmitting, to the base station via the capability report, an indication of a quantity of control channel monitoring occasions within the scheduling interval, wherein the second configuration configures the UE to monitor a first quantity of control channel monitoring occasions in the scheduling interval based at least in part on the indication of the quantity of control channel monitoring occasions within the scheduling interval.

Aspect 6: The method of any of aspects 1 through 5, further comprising: transmitting, to the base station via the capability report, an indication of a search space set periodicity associated with the scheduling interval, wherein the second configuration configures the UE to monitor a first search space set periodicity corresponding to the scheduling interval based at least in part on the indication of the search space set periodicity associated with the scheduling interval.

Aspect 7: The method of any of aspects 1 through 6, further comprising: transmitting, to the base station via the capability report, an indication of a time interval between a first time in which the UE receives a grant and a second time in which the UE is capable of acting in accordance with the grant, wherein communicating with the base station is based at least in part on the indication of the time interval.

Aspect 8: The method of aspect 7, further comprising: receiving, from the base station based at least in part on the indication of the time interval, a PDCCH message during a first TTI of the plurality of TTIs of the scheduling interval that schedules an uplink transmission, a downlink transmission, or both, within one or more TTIs of the plurality of TTIs of the scheduling interval.

Aspect 9: The method of any of aspects 1 through 8, further comprising: transmitting, to the base station via the capability report, an indication of a capability to perform beam switching at the UE between adjacent scheduling intervals, wherein the UE communicates with the base station using a first beam during a first scheduling interval and a second beam during a second scheduling interval based at least in part on the indication of the capability to perform beam switching.

Aspect 10: The method of any of aspects 1 through 9, wherein communicating with the base station comprises: communicating with the base station using a first set of hardware characteristics during a first scheduling interval; and communicating with the base station using a second set of hardware characteristics during a second scheduling interval, the second set of hardware characteristics different from the first set of hardware characteristics.

Aspect 11: The method of aspect 10, further comprising: modifying one or more hardware characteristics of the first set of hardware characteristics at a boundary of the first scheduling interval and the second scheduling interval, wherein communicating with the base station using the second set of hardware characteristics during the second scheduling interval is based at least in part on the modifying.

Aspect 12: The method of any of aspects 10 through 11, wherein the first set of hardware characteristics, the second set of hardware characteristics, or both, comprises a first characteristic associated with an antenna array of the UE, a second characteristic associated with a baseband component of the UE, a third characteristic associated with a bandwidth part at the UE, a fourth characteristic associated with a transmission timing parameter at the UE, a sixth characteristic associated with a reception timing parameter at the UE, or any combination thereof.

Aspect 13: The method of any of aspects 10 through 12, wherein the first set of hardware characteristics, the second set of hardware characteristics, or both, comprises a first characteristic associated with a transmission power metric for transmission performed by the UE, a second characteristic associated with a DRX cycle of the UE, a third characteristic associated with MAC-CE application timing, or any combination thereof.

Aspect 14: The method of any of aspects 1 through 13, wherein receiving the second configuration comprises: receiving, from the base station based at least in part on the capability report, a control message that includes an indication of a quantity of TTIs associated with the scheduling interval, wherein communicating with the base station using the second processing mode is based at least in part on the indicated quantity of TTIs.

Aspect 15: The method of any of aspects 1 through 14, wherein receiving the first configuration and the second configuration comprise receiving, from the base station, one or more configuration parameter values that are different for the first processing mode and the second processing mode, the one or more configuration parameter values that are different comprising a search space set periodicity, a TDRA table, a PUCCH resource, or a combination thereof.

Aspect 16: The method of aspect 15, wherein at least one of the one or more configuration parameter values are shared between the first processing mode and the second processing mode.

Aspect 17: The method of any of aspects 1 through 16, further comprising: determining one or more configuration parameter values for the second processing mode based at least in part on a quantity of TTIs of the plurality of TTIs associated with the scheduling interval.

Aspect 18: The method of any of aspects 1 through 17, further comprising: transmitting, to the base station, a second indication to transition from the indicated processing mode to a different processing mode; and communicating with the base station based at least in part on the second indication.

Aspect 19: The method of any of aspects 1 through 18, wherein a TTI comprises a slot, a subframe, a symbol group, or any combination thereof.

Aspect 20: A method for wireless communications at a base station, comprising: receiving, from a UE, a capability report indicating a capability of the UE to support multi-TTI scheduling; transmitting, to the UE based at least in part on the capability report, a first configuration of a first processing mode for the UE that is associated with communications scheduled for a single TTI, and a second configuration of a second processing mode for the UE that is associated with communications scheduled for a scheduling interval spanning a plurality of TTIs; transmitting, to the UE, an indication to apply the first processing mode or the second processing mode; and communicating with the UE based at least in part on the indication.

Aspect 21: The method of aspect 20, further comprising: receiving, from the UE via the capability report, an indication of a processing capability of the UE associated with one or more SCSs, wherein transmitting the first configuration, the second configuration, or both, is based at least in part on the indication of the processing capability.

Aspect 22: The method of aspect 21, wherein transmitting the second configuration comprises: transmitting, to the UE based at least in part on the indication of the processing capability, an indication of a SCS, a TTI length, or both, wherein communicating with the UE is based at least in part on the SCS, the TTI length, or both.

Aspect 23: The method of any of aspects 20 through 22, further comprising: receiving, from the UE via the capability report, an indication of a quantity of CCEs for blind decoding within the scheduling interval, a quantity of control channel candidates for blind decoding within the scheduling interval, or both, wherein the second configuration configures the UE to monitor a first quantity of CCEs in the scheduling interval, a first quantity of control channel candidates in the scheduling interval, or both, based at least in part on the indication of the quantity of CCEs for blind decoding, the quantity of control channel candidates for blind decoding, or both.

Aspect 24: The method of any of aspects 20 through 23, further comprising: receiving, from the UE via the capability report, an indication of a quantity of control channel monitoring occasions within the scheduling interval, wherein the second configuration configures the UE to monitor a first quantity of control channel monitoring occasions in the scheduling interval based at least in part on the indication of the quantity of control channel monitoring occasions within the scheduling interval.

Aspect 25: The method of any of aspects 20 through 24, further comprising: receiving, from the UE via the capability report, an indication of a search space set periodicity associated with the scheduling interval, wherein the second configuration configures the UE to monitor a first search space set periodicity corresponding to the scheduling interval based at least in part on the indication of the search space set periodicity associated with the scheduling interval.

Aspect 26: The method of any of aspects 20 through 25, further comprising: receiving, from the UE via the capability report, an indication of a time interval between a first time in which the UE receives a grant and a second time in which the UE is capable of acting in accordance with the grant, wherein communicating with the UE is based at least in part on the indication of the time interval.

Aspect 27: The method of aspect 26, further comprising: transmitting, to the UE based at least in part on the indication of the time interval, a PDCCH message during a first TTI of the plurality of TTIs of the scheduling interval that schedules an uplink transmission, a downlink transmission, or both, within one or more TTIs of the plurality of TTIs of the scheduling interval.

Aspect 28: The method of any of aspects 20 through 27, further comprising: receiving, from the UE via the capability report, an indication of a capability to perform beam switching at the UE between adjacent scheduling intervals, wherein the UE communicates with the base station using a first beam during a first scheduling interval and a second beam during a second scheduling interval based at least in part on the indication of the capability to perform beam switching.

Aspect 29: The method of any of aspects 20 through 28, wherein communicating with the UE comprises: communicating with the UE using a first set of hardware characteristics of the UE during a first scheduling interval; and communicating with the UE using a second set of hardware characteristics of the UE during a second scheduling interval, the second set of hardware characteristics different from the first set of hardware characteristics.

Aspect 30: The method of aspect 29, wherein the first set of hardware characteristics, the second set of hardware characteristics, or both, comprises a first characteristic associated with an antenna array of the UE, a second characteristic associated with a baseband component of the UE, a third characteristic associated with a bandwidth part at the UE, a fourth characteristic associated with a transmission timing parameter at the UE, a sixth characteristic associated with a reception timing parameter at the UE, or any combination thereof.

Aspect 31: The method of any of aspects 29 through 30, wherein the first set of hardware characteristics, the second set of hardware characteristics, or both, comprises a first characteristic associated with a transmission power metric for transmission performed by the UE, a second characteristic associated with a DRX cycle of the UE, a third characteristic associated with MAC-CE application timing, or any combination thereof.

Aspect 32: The method of any of aspects 20 through 31, wherein transmitting the second configuration comprises: transmitting, to the UE based at least in part on the capability report, a control message that includes an indication of a quantity of TTIs associated with the scheduling interval, wherein communicating with the UE using the second processing mode is based at least in part on the indicated quantity of TTIs.

Aspect 33: The method of any of aspects 20 through 32, wherein transmitting the first configuration and the second configuration comprise transmitting, to the UE, one or more configuration parameter values that are different for the first processing mode and the second processing mode, the one or more configuration parameter values that are different comprising a search space set periodicity, a TDRA table, a PUCCH resource, or a combination thereof.

Aspect 34: The method of aspect 33, wherein at least one of the one or more configuration parameter values are shared between the first processing mode and the second processing mode.

Aspect 35: The method of any of aspects 20 through 34, further comprising: determining one or more configuration parameter values for the second processing mode based at least in part on a quantity of TTIs of the plurality of TTIs associated with the scheduling interval.

Aspect 36: The method of any of aspects 20 through 35, further comprising: receiving, from the UE, a second indication to transition from the indicated processing mode to a different processing mode; and communicating with the UE based at least in part on the second indication.

Aspect 37: The method of any of aspects 20 through 36, wherein a TTI comprises a slot, a subframe, a symbol group, or any combination thereof.

Aspect 38: An apparatus for wireless communications at a UE, comprising a processor; memory coupled with the processor; and instructions stored in the memory and executable by the processor to cause the apparatus to perform a method of any of aspects 1 through 19.

Aspect 39: An apparatus for wireless communications at a UE, comprising at least one means for performing a method of any of aspects 1 through 19.

Aspect 40: A non-transitory computer-readable medium storing code for wireless communications at a UE, the code comprising instructions executable by a processor to perform a method of any of aspects 1 through 19.

Aspect 41: An apparatus for wireless communications at a base station, comprising a processor; memory coupled with the processor; and instructions stored in the memory and executable by the processor to cause the apparatus to perform a method of any of aspects 20 through 37.

Aspect 42: An apparatus for wireless communications at a base station, comprising at least one means for performing a method of any of aspects 20 through 37.

Aspect 43: A non-transitory computer-readable medium storing code for wireless communications at a base station, the code comprising instructions executable by a processor to perform a method of any of aspects 20 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a network entity, a capability report indicating a capability of the UE to support multi-transmission time interval scheduling, the capability report comprising an indication of a quantity of control channel monitoring occasions within a scheduling interval for multi-transmission time interval scheduling;
   receiving, from the network entity based at least in part on the capability report, a first configuration of a first processing mode for the UE that is associated with communications scheduled for a single transmission time interval, and a second configuration of a second processing mode for the UE that is associated with communications scheduled for the scheduling interval spanning a plurality of transmission time intervals, wherein the second configuration indicates that the UE is to monitor a first quantity of control channel monitoring occasions within the scheduling interval based at least in part on the indication of the quantity of control channel monitoring occasions within the scheduling interval;
   receiving, from the network entity, an indication to apply the first processing mode or the second processing mode; and
   communicating with the network entity based at least in part on the indication.

2. The method of claim 1, further comprising:
   transmitting, to the network entity via the capability report, an indication of a processing capability of the UE associated with one or more subcarrier spacings, wherein receiving the first configuration, the second configuration, or both, is based at least in part on the indication of the processing capability.

3. The method of claim 2, wherein receiving the second configuration comprises:
   receiving, from the network entity based at least in part on the indication of the processing capability, an indication of a subcarrier spacing, a transmission time interval length, or both, wherein communicating with the network entity is based at least in part on the subcarrier spacing, the transmission time interval length, or both.

4. The method of claim 1, further comprising:
   transmitting, to the network entity via the capability report, an indication of a quantity of control channel elements for blind decoding within the scheduling interval, a quantity of control channel candidates for blind decoding within the scheduling interval, or both, wherein the second configuration configures the UE to monitor a first quantity of control channel elements in the scheduling interval, a second quantity of control channel candidates for blind decoding in the scheduling interval, or both, based at least in part on the indication of the quantity of control channel elements for blind decoding, the quantity of control channel candidates for blind decoding, or both.

5. The method of claim 1, further comprising:
   transmitting, to the network entity via the capability report, the indication of the quantity of control channel monitoring occasions that the UE is able to monitor within the scheduling interval for multi-transmission time interval scheduling, and a second indication of a second quantity of control channel monitoring occasions that the UE is able to monitor within a single transmission time interval for single-transmission time interval scheduling.

6. The method of claim 1, further comprising:
   transmitting, to the network entity via the capability report, an indication of a search space set periodicity associated with the scheduling interval, wherein the second configuration configures the UE to monitor a first search space set periodicity corresponding to the scheduling interval based at least in part on the indication of the search space set periodicity associated with the scheduling interval.

7. The method of claim 1, further comprising:
   transmitting, to the network entity via the capability report, an indication of a time interval between a first time in which the UE receives a grant and a second time in which the UE is capable of acting in accordance with the grant, wherein communicating with the network entity is based at least in part on the indication of the time interval.

8. The method of claim 7, further comprising:
   receiving, from the network entity based at least in part on the indication of the time interval, a physical downlink control channel message during a first transmission time interval of the plurality of transmission time intervals of the scheduling interval that schedules an uplink transmission, a downlink transmission, or both, within one or more transmission time intervals of the plurality of transmission time intervals of the scheduling interval.

9. The method of claim 1, further comprising:
   transmitting, to the network entity via the capability report, an indication of a capability to perform beam switching at the UE between adjacent scheduling intervals, wherein the UE communicates with the network entity using a first beam during a first scheduling interval and a second beam during a second scheduling interval based at least in part on the indication of the capability to perform beam switching.

10. The method of claim 1, wherein communicating with the network entity comprises:
    communicating with the network entity using a first set of hardware characteristics during a first scheduling interval; and
    communicating with the network entity using a second set of hardware characteristics during a second scheduling interval, the second set of hardware characteristics different from the first set of hardware characteristics.

11. The method of claim 10, further comprising:
    modifying one or more hardware characteristics of the first set of hardware characteristics at a boundary of the first scheduling interval and the second scheduling interval, wherein communicating with the network entity using the second set of hardware characteristics during the second scheduling interval is based at least in part on the modifying.

12. The method of claim 10, wherein the first set of hardware characteristics, the second set of hardware characteristics, or both, comprises a first characteristic associated with an antenna array of the UE, a second characteristic associated with a baseband component of the UE, a third characteristic associated with a bandwidth part at the UE, a fourth characteristic associated with a transmission timing parameter at the UE, a sixth characteristic associated with a reception timing parameter at the UE, or any combination thereof.

13. The method of claim 10, wherein the first set of hardware characteristics, the second set of hardware characteristics, or both, comprises a first characteristic associated with a transmission power metric for transmission performed by the UE, a second characteristic associated with a discontinuous reception cycle of the UE, a third characteristic associated with MAC-CE application timing, or any combination thereof.

14. The method of claim 1, wherein receiving the second configuration comprises:
receiving, from the network entity based at least in part on the capability report, a control message that includes an indication of a quantity of transmission time intervals associated with the scheduling interval, wherein communicating with the network entity using the second processing mode is based at least in part on the indication of the quantity of transmission time intervals.

15. The method of claim 1, wherein receiving the first configuration and the second configuration comprise receiving, from the network entity, one or more configuration parameter values that are different for the first processing mode and the second processing mode, the one or more configuration parameter values that are different comprising a search space set periodicity, a time domain resource allocation table, a physical uplink control channel resource, or a combination thereof.

16. The method of claim 15, wherein at least one of the one or more configuration parameter values are shared between the first processing mode and the second processing mode.

17. The method of claim 1, further comprising:
determining one or more configuration parameter values for the second processing mode based at least in part on a quantity of transmission time intervals of the plurality of transmission time intervals associated with the scheduling interval.

18. The method of claim 1, further comprising:
transmitting, to the network entity, a second indication to transition from the indicated processing mode to a different processing mode; and
communicating with the network entity based at least in part on the second indication.

19. The method of claim 1, wherein a transmission time interval comprises a slot, a subframe, a symbol group, or any combination thereof.

20. A method for wireless communications at a network entity, comprising:
receiving, from a user equipment (UE), a capability report indicating a capability of the UE to support multi-transmission time interval scheduling, the capability report comprising an indication of a quantity of control channel monitoring occasions within a scheduling interval for multi-transmission time interval scheduling;
transmitting, to the UE based at least in part on the capability report, a first configuration of a first processing mode for the UE that is associated with communications scheduled for a single transmission time interval, and a second configuration of a second processing mode for the UE that is associated with communications scheduled for the scheduling interval spanning a plurality of transmission time intervals, wherein the second configuration indicates that the UE is to monitor a first quantity of control channel monitoring occasions within the scheduling interval based at least in part on the indication of the quantity of control channel monitoring occasions within the scheduling interval;
transmitting, to the UE, an indication to apply the first processing mode or the second processing mode; and
communicating with the UE based at least in part on the indication.

21. The method of claim 20, further comprising:
receiving, from the UE via the capability report, an indication of a processing capability of the UE associated with one or more subcarrier spacings, wherein transmitting the first configuration, the second configuration, or both, is based at least in part on the indication of the processing capability.

22. The method of claim 21, wherein transmitting the second configuration comprises:
transmitting, to the UE based at least in part on the indication of the processing capability, an indication of a subcarrier spacing, a transmission time interval length, or both, wherein communicating with the UE is based at least in part on the subcarrier spacing, the transmission time interval length, or both.

23. The method of claim 20, further comprising:
receiving, from the UE via the capability report, an indication of a quantity of control channel elements for blind decoding within the scheduling interval, a quantity of control channel candidates for blind decoding within the scheduling interval, or both, wherein the second configuration configures the UE to monitor a first quantity of control channel elements in the scheduling interval, a first quantity of control channel candidates in the scheduling interval, or both, based at least in part on the indication of the quantity of control channel elements for blind decoding, the quantity of control channel candidates for blind decoding, or both.

24. The method of claim 20, further comprising:
receiving, from the UE via the capability report, the indication of the quantity of control channel monitoring occasions that the UE is able to monitor within the scheduling interval for multi-transmission time interval scheduling, and a second indication of a second quantity of control channel monitoring occasions that the UE is able to monitor within a single transmission time interval for single-transmission time interval scheduling.

25. The method of claim 20, further comprising:
receiving, from the UE via the capability report, an indication of a search space set periodicity associated with the scheduling interval, wherein the second configuration configures the UE to monitor a first search space set periodicity corresponding to the scheduling interval based at least in part on the indication of the search space set periodicity associated with the scheduling interval.

26. The method of claim 20, wherein transmitting the second configuration comprises:
transmitting, to the UE based at least in part on the capability report, a control message that includes an indication of a quantity of transmission time intervals associated with the scheduling interval, wherein communicating with the UE using the second processing mode is based at least in part on the indication of the quantity of transmission time intervals.

27. The method of claim 20, further comprising:
determining one or more configuration parameter values for the second processing mode based at least in part on a quantity of transmission time intervals of the plurality of transmission time intervals associated with the scheduling interval.

28. The method of claim 20, further comprising:
receiving, from the UE, a second indication to transition from the indicated processing mode to a different processing mode; and
communicating with the UE based at least in part on the second indication.

29. An apparatus for wireless communications at a user equipment (UE), comprising:
a processor;
memory coupled with the processor; and
instructions stored in the memory and executable by the processor to cause the apparatus to:
transmit, to a network entity, a capability report indicating a capability of the UE to support multi-transmission time interval scheduling, the capability report comprising an indication of a quantity of control channel monitoring occasions within a scheduling interval for multi-transmission time interval scheduling;
receive, from the network entity based at least in part on the capability report, a first configuration of a first processing mode for the UE that is associated with communications scheduled for a single transmission time interval, and a second configuration of a second processing mode for the UE that is associated with communications scheduled for the scheduling interval spanning a plurality of transmission time intervals, wherein the second configuration indicates that the UE is to monitor a first quantity of control channel monitoring occasions within the scheduling interval based at least in part on the indication of the quantity of control channel monitoring occasions within the scheduling interval;
receive, from the network entity, an indication to apply the first processing mode or the second processing mode; and
communicate with the network entity based at least in part on the indication.

30. An apparatus for wireless communications at a network entity, comprising:
a processor;
memory coupled with the processor; and
instructions stored in the memory and executable by the processor to cause the apparatus to:
receive, from a user equipment (UE), a capability report indicating a capability of the UE to support multi-transmission time interval scheduling, the capability report comprising an indication of a quantity of control channel monitoring occasions within a scheduling interval for multi-transmission time interval scheduling;
transmit, to the UE based at least in part on the capability report, a first configuration of a first processing mode for the UE that is associated with communications scheduled for a single transmission time interval, and a second configuration of a second processing mode for the UE that is associated with communications scheduled for the scheduling interval spanning a plurality of transmission time intervals, wherein the second configuration indicates that the UE is to monitor a first quantity of control channel monitoring occasions within the scheduling interval based at least in part on the indication of the quantity of control channel monitoring occasions within the scheduling interval;
transmit, to the UE, an indication to apply the first processing mode or the second processing mode; and
communicate with the UE based at least in part on the indication.

* * * * *